(12) United States Patent
Shohfi et al.

(10) Patent No.: US 10,474,999 B2
(45) Date of Patent: *Nov. 12, 2019

(54) SYSTEM AND METHOD FOR VISUAL COMMUNICATION BETWEEN BUYERS AND SELLERS

(71) Applicant: GLOBAL APPAREL NETWORK, INC., Los Angeles, CA (US)

(72) Inventors: Joseph Shohfi, New York, NY (US); Danette Gorman, New York, NY (US)

(73) Assignee: GLOBAL APPAREL NETWORK, INC., Los Angeles, CA (US)

( * ) Notice: Subject to any disclaimer, the term of this patent is extended or adjusted under 35 U.S.C. 154(b) by 258 days.

This patent is subject to a terminal disclaimer.

(21) Appl. No.: 15/284,533

(22) Filed: Oct. 3, 2016

(65) Prior Publication Data

US 2017/0249593 A1    Aug. 31, 2017

Related U.S. Application Data

(63) Continuation of application No. 15/043,469, filed on Feb. 12, 2016, which is a continuation of application
(Continued)

(51) Int. Cl.
*G06F 3/00* (2006.01)
*G06Q 10/10* (2012.01)
(Continued)

(52) U.S. Cl.
CPC ......... *G06Q 10/107* (2013.01); *G06F 3/0482* (2013.01); *G06F 3/0486* (2013.01);
(Continued)

(58) Field of Classification Search
CPC ...... G06Q 10/107; G06Q 30/04; H04L 51/10; H04L 51/34; G06F 3/0482; G06F 3/04845; G06F 3/0486
See application file for complete search history.

(56) References Cited

U.S. PATENT DOCUMENTS

| 5,309,555 A | 5/1994 | Akins et al. |
| 5,515,491 A | 5/1996 | Bates et al. |

(Continued)

OTHER PUBLICATIONS

International Search Report for International Application No. PCT/US03/24695 dated Mar. 25, 2004 (1 page).
(Continued)

*Primary Examiner* — Anil N Kumar
(74) *Attorney, Agent, or Firm* — Lewis Roca Rothgerber Christie LLP

(57) ABSTRACT

A visual communications (VC) tool enables visual communication over a data communications network. An email is sent to a recipient containing a link to a first visual arrangement generated by a sender. The first visual arrangement may include images of various products. The first visual arrangement is displayed via a web browser in a first display area of the VC tool in response to actuation of the link in the email message. The recipient then selects a first image in the first display area. The selection may include dragging and dropping the first image into a second display area of the VC tool. The selection triggers the generating of a second visual arrangement which includes a copy of the first image. The copy of the first image is displayed in a second display area concurrently with the display of the first image in the first display area.

30 Claims, 52 Drawing Sheets

Related U.S. Application Data

No. 14/083,424, filed on Nov. 18, 2013, now abandoned, which is a continuation of application No. 13/194,905, filed on Jul. 29, 2011, now abandoned, which is a continuation-in-part of application No. 12/012,279, filed on Feb. 1, 2008, now abandoned, which is a continuation of application No. 11/053,235, filed on Feb. 7, 2005, now Pat. No. 7,426,693, which is a continuation-in-part of application No. PCT/US03/24695, filed on Aug. 7, 2003.

(60) Provisional application No. 60/635,808, filed on Dec. 13, 2004, provisional application No. 60/401,806, filed on Aug. 7, 2002.

(51) Int. Cl.
*G06F 16/951* (2019.01)
*G06Q 30/04* (2012.01)
*H04L 12/58* (2006.01)
*G06F 3/0482* (2013.01)
*G06F 3/0484* (2013.01)
*G06F 3/0486* (2013.01)
*G06F 17/22* (2006.01)

(52) U.S. Cl.
CPC ........ *G06F 3/04845* (2013.01); *G06F 16/951* (2019.01); *G06F 17/2235* (2013.01); *G06Q 30/04* (2013.01); *H04L 51/10* (2013.01); *H04L 51/34* (2013.01)

(56) References Cited

U.S. PATENT DOCUMENTS

| | | | |
|---|---|---|---|
| 5,649,104 A | | 7/1997 | Carleton et al. |
| 5,694,544 A | | 12/1997 | Tanigawa et al. |
| 5,706,510 A | * | 1/1998 | Burgoon ................. G06F 16/10 |
| 5,872,924 A | | 2/1999 | Nakayama et al. |
| 6,018,774 A | | 1/2000 | Mayle et al. |
| 6,138,149 A | | 10/2000 | Ohmura |
| 6,317,722 B1 | | 11/2001 | Jacobi et al. |
| 6,466,918 B1 | | 10/2002 | Spiegel et al. |
| 6,525,747 B1 | | 2/2003 | Bezos |
| 6,901,379 B1 | * | 5/2005 | Balter ................. G06Q 30/06 434/395 |
| 6,917,965 B2 | * | 7/2005 | Gupta ................. G06F 17/241 709/206 |
| 7,185,290 B2 | * | 2/2007 | Cadiz ................. G06Q 10/107 715/744 |
| 7,237,009 B1 | | 6/2007 | Fung et al. |
| 7,281,215 B1 | | 10/2007 | Canfield et al. |
| 7,671,861 B1 | | 3/2010 | Ostermann et al. |
| 2002/0002515 A1 | | 1/2002 | Okazaki et al. |
| 2002/0040356 A1 | | 4/2002 | Gluck et al. |
| 2002/0049816 A1 | | 4/2002 | Costin, IV et al. |
| 2002/0049847 A1 | | 4/2002 | McArdle et al. |
| 2002/0063736 A1 | | 5/2002 | Sugimoto |
| 2002/0087601 A1 | | 7/2002 | Anderson et al. |
| 2002/0120581 A1 | | 8/2002 | Schiavone et al. |
| 2003/0009527 A1 | | 1/2003 | McIntyre et al. |
| 2003/0023684 A1 | | 1/2003 | Brown et al. |
| 2003/0055711 A1 | | 3/2003 | Doherty |
| 2003/0193994 A1 | * | 10/2003 | Stickler ................. G06F 16/40 375/150 |
| 2003/0234953 A1 | * | 12/2003 | Dawson ............. H04N 1/00244 358/1.15 |
| 2003/0236834 A1 | * | 12/2003 | Gottfried ............... G06Q 30/02 709/204 |
| 2004/0205494 A1 | | 10/2004 | Bernius et al. |

OTHER PUBLICATIONS

Roseman, et al., TeamRooms: Network Places for Collaboration, Proceedings of the 1996 ACM conference on Computer Supported Cooperative Work, 1996, pp. 352-333.

Chronaki, et al., 12Cnet medical image annotation service, Medical Informatics, Oct.-Dec. 1997, vol. 22, Issue 4, pp. 337-347.

Donath, Judith S., Casual Collaboration, Proceedings of the International Conference on Multimedia Computing and Systems (ICMCS), May 1994, 6 pages.

Kan, et al., An Internet virtual reality collaborative environment for effective product design, Computers in Industry, 2001, No. 45, pp. 197-213.

* cited by examiner

SYSTEM AND METHOD FOR VISUAL COMMUNICATION BETWEEN BUYERS AND SELLERS

CROSS-REFERENCE TO RELATED APPLICATIONS

This application is a continuation of U.S. patent application Ser. No. 15/043,469, filed on Feb. 12, 2016, which is a continuation application of Ser. No. 14/083,424, filed on Nov. 18, 2013, which is a continuation of U.S. application Ser. No. 13/194,905 filed on Jul. 29, 2011, which is a continuation-in-part of U.S. application Ser. No. 12/012,279, filed on Feb. 1, 2008, which is a continuation of U.S. application Ser. No. 11/053,235 filed on Feb. 7, 2005 (now U.S. Pat. No. 7,426,693), which claims priority to and the benefit of U.S. Provisional Application 60/635,808, filed on Dec. 13, 2004, and is a continuation-in-part of International Application No. PCT/US2003/024695, filed on Aug. 7, 2003, and International Application No. PCT/US2003/024695 which in turn claims the benefit of U.S. Provisional Application No. 60/401,806, filed on Aug. 7, 2002, the content of all of which is incorporated herein by reference.

BACKGROUND OF THE INVENTION

People in the fashion and lifestyle-driven industries often struggle to communicate their ideas with each other in an efficient and safe manner. The increase in the usage of electronic communication, such as, for example, electronic mail (e-mail) has somewhat helped their communication efforts. However, traditional e-mail is not catered to the fashion and lifestyle-driven industries where a lot of the information transmitted is visual information, such as pictures. This is because the application generating the pictures is separate from the e-mail application used for their transmission. Thus, the pictures are generally transmitted by the e-mail application in the form of an attachment.

The use of e-mails with attachments is undesirable for various reasons. First, any comment in the body of the e-mail about an attached image is separate from the attachment itself. This makes it difficult to maintain multiple comments received about the image correlated and organized with the image. Furthermore, people receiving an image attachment and responding with a comment on the image may not reattach the image to the responding e-mail, leaving it to the recipient to figure out which images go with which e-mails.

Second, some company networks do not allow employees to receive e-mails that contain attachments. Employees in such situations may have to utilize other mechanisms for receiving the attachments to which comments are desired.

Third, when changes are made to a presentation, it must generally be reattached to an e-mail and retransmitted to ensure that all recipient have the latest version of the presentation. During a development phase where there may be constant feedback and modification to the presentation, such retransmission of attachments puts a strain on a company's bandwidth.

Finally, there is currently no mechanism to prevent a person receiving a picture in the form of an attachment from reproducing and forwarding the attachment to others. Thus, the author of the picture runs a risk that this or her copyright rights for the picture may be violated by providing the picture in an attachment.

Current e-mail technology, even without attachments, also does not provide an efficient way to track comments about a given topic. A receiving person needs to make sure that the most recent e-mail about the topic is opened to make sure that he or she has the most recent comments. Also, when comments are transmitted concurrently by different people, the recipient generally has to open multiple e-mails to make sure that all of the comments are reviewed.

Traditional electronic mail, therefore, is difficult and frustrating to use for designers, suppliers, and retailers in the fashion and lifestyle-driven industries. Accordingly, what is desired is a visual communications tool catered to the fashion and lifestyle-driven industries where a majority of the information being communicated is visual information, and where there is constant feedback about the visual information that needs to be tracked and correlated to the visual information.

SUMMARY OF THE INVENTION

According to one embodiment, the present invention is directed to a method for visual communication over a data communications network. The method includes receiving from a recipient of an email message, actuation of a link included in the email message. The link is associated with a first visual arrangement generated by a sender, where the first visual arrangement includes a plurality of images for a plurality of products. The method further includes providing to the recipient a visual communications tool including a first display area and a second display area. The first visual arrangement is displayed in the first display area of the visual communications tool in response to receipt of the actuation of the link in the email message. When the recipient selects a first image in the first display area, a second visual arrangement is generated which includes a copy of the first image. The selection may include dragging and dropping the first image into the second display area. The copy of the first image is displayed in a second display area of the visual communications tool concurrently with the display of the first image in the first display area.

According to one embodiment of the invention, generating the second visual arrangement includes storing the copy of the first image in an image database, storing an association between the copy of the first image and the recipient, storing an association between the copy of the first image and the second visual arrangement, and storing an association between the second visual arrangement and the recipient. According to one embodiment, the associations are based on unique identifiers assigned to the recipient, to the images, and to the visual arrangements.

According to one embodiment of the invention, each of the plurality of images in the first visual arrangement is associated with information for a product depicted in the corresponding image. According to this embodiment, the generating of the second visual arrangement includes making a copy of the information for the product depicted in the first image, and storing an association between the copy of the information and the copy of the first image. According to one embodiment, the association is based on unique identifiers assigned to the copy of the information and the copy of the first image.

The copy of the information may be displayed in response to actuation of the copy of the first image. A modification may then be received for the displayed information, and identification one or more of other images in the second visual arrangement may be received for applying the modification to the displayed information and to the information for products depicted in the identified one or more of the other images.

According to one embodiment of the invention, a user command is received to replace the copy of the first image. The copy of the first image is replaced with a second image in response to the user command. The replacing of the first image occurs without replacing the information (metadata) for the product depicted in the first image.

According to one embodiment of the invention, a notes option is provided via the visual communications tool to enter notes for a particular image included in the first visual arrangement. Actuation of the notes option is received, and a window is displayed in response for entering notes for the particular image. When the notes entered for the particular image are received, the notes are associated to a copy of the particular image, and the copy is added to the second visual arrangement. The notes may be retrieved and displayed in response to selecting the copy of the particular image in the second visual arrangement.

According to one embodiment of the invention, a user selected display layout is identified, and a recipient of the second visual arrangement is also identified. The second visual arrangement is displayed for the recipient according to the selected layout.

According to one embodiment of the invention, a search term entered via the visual communications tool is received, and a search of images stored in one or more remote information sources is invoked based on the search term. One or more matching images are then displayed in the first display area of the visual communications tool. When user selection of one of the matching images is received, a copy of the selected image is added to the second visual arrangement, and the copy of the selected image is displayed in the second display area of the visual communications tool concurrently with the display of the selected image in the first display area. The user selection of the matching image may include dragging and dropping the matching image into the second display area.

According to one embodiment of the invention, a change associated with the first visual arrangement is received, and a snapshot of the first visual arrangement is taken including the change. The snapshot is stored in a database. The taking of the snapshot may include making a copy of information records associated with the first visual arrangement. The change may be adding a new image to the first visual arrangement, deleting one of the plurality of images included in the first visual arrangement, and/or modifying information of a product depicted in one of the plurality of images included in the first visual arrangement.

According to one embodiment of the invention, a user command is received to view a history of revisions associated with the first visual arrangement. A plurality of revision entries are displayed in response to the user command. User selection of one of the revision entries is received, and a first snapshot of the first visual arrangement associated with the selected revision entry is retrieved. A second snapshot of the first visual arrangement associated with a revision entry prior to the selected revision entry is also retrieved. The first snapshot and the second snapshot are compared, and differences in the first visual arrangement are identified between the first and second snapshots. A list of those differences are then displayed.

According to one embodiment of the invention, an order option is provided via the visual communications tool for placing an electronic order for a particular product depicted in an image included in the first visual arrangement. Actuation of the order option is received, an order pad is displayed for the particular product, and a quantity of the product to be ordered is received via the order pad. A visual order confirmation may then be provided including an image for each ordered product according to the group to which the image belongs.

According to one embodiment of the invention, the status of the email sent to the recipient is tracked, and a report is generated for the sender based on the tracked status. The tracking may include tracking whether the email was viewed by the recipient, and/or whether one or more of the plurality of the products was ordered by the recipient.

According to one embodiment, the invention is also directed to a computer apparatus adapted for visual communication over a data communications network. The computer apparatus includes a processor and a memory. The memory stores program instructions which are configured to be executed by the processor to provide the functionalities described above.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

FIG. 7 is a screen shot of a folio generated by the VC tool of FIG. 2 according to one embodiment of the invention;

FIG. 12 is an exemplary web page accessed by a non-VC tool recipient according to one embodiment of the invention;

FIG. 44 is a screen shot of detailed information about customers who have viewed vmails but have not placed orders according to one embodiment of the invention;

DETAILED DESCRIPTION

The various embodiments of the present invention are directed to a visual communications tool for creating visual arrangements and presenting the visual arrangements to others for feedback and comment in an efficient and secure manner. The comments received for the visual arrangements are tracked and automatically correlated to the arrangements, allowing them to be concurrently displayed on a single screen, using a single application.

Figure 1:
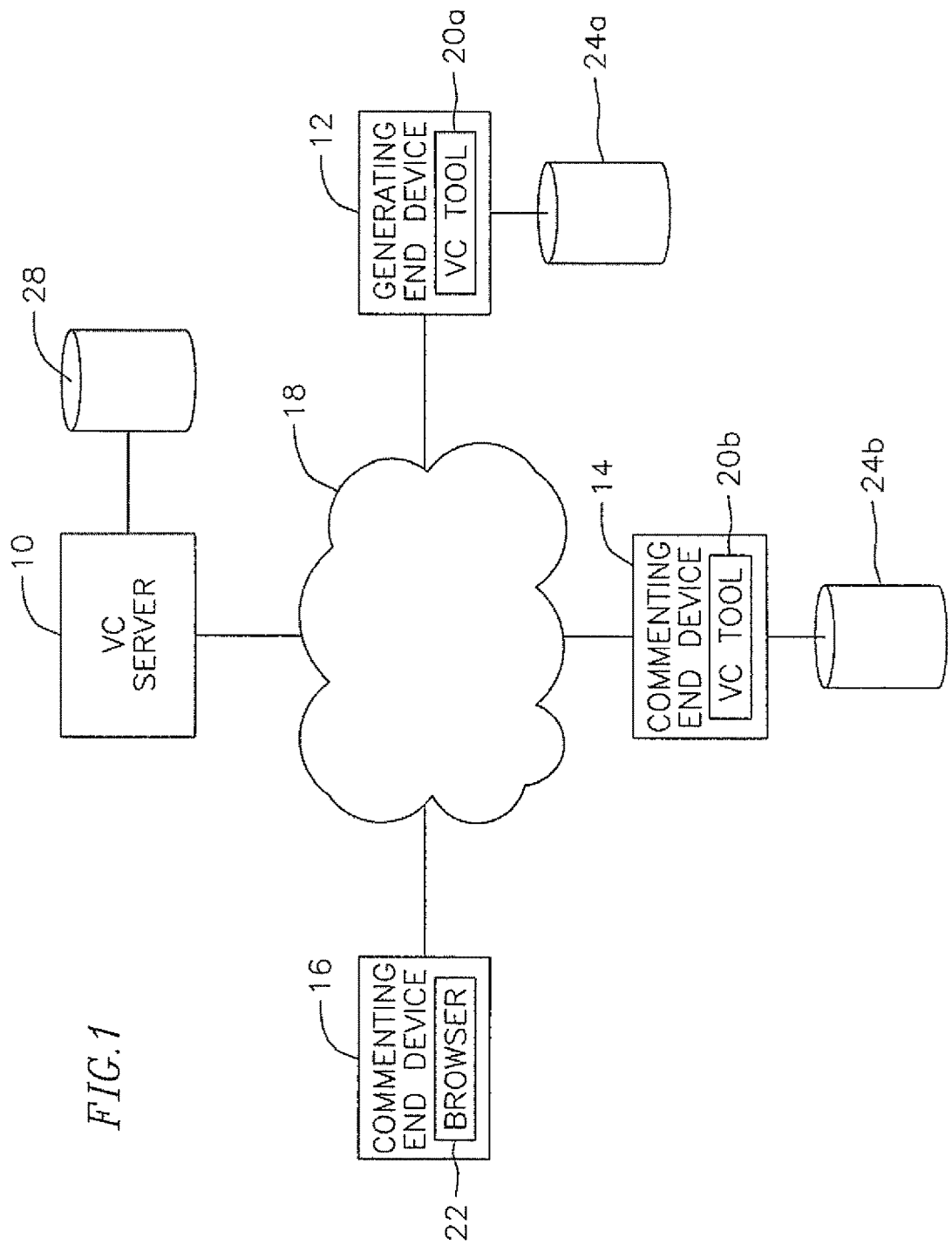
FIG. 1 is a block diagram of a visual communications system according to one embodiment of the invention.

FIG. 1 is a block diagram of a visual communications system according to one embodiment of the invention. The system includes a visual communications (VC) server 10 coupled to various end devices 12, 14, 16, over a data communications network 18. The data communications network may be a local area network, a private wide area network, public wide area network (e.g. the Internet), and the like, implemented via one or more known wired or wireless solutions. The end devices 12, 14, 16 may take the form of a personal computer, laptop, or consumer electronics device, or the like.

According to one embodiment of the invention, a generating end device 12 includes a VC tool 20a used for generating a visual arrangement and storing the visual arrangement in a local data store 24a. The generating end device 12 may obtain the VC tool 20 in any manner conventional in the art, such as, for example, by downloading the tool from the VC server 10. The generating end device 12 uses the VC tool 20 to further publish the generated visual arrangement to commenting end devices 14 and 16.

According to one embodiment of the invention, the commenting end device 14 also includes a copy of the VC tool 20b which is used to view the arrangement transmitted by the generating and device 12. If allowed by the generating end device 12, the images in the visual arrangement may be stored in the commenting end device's data store 24b, and reused in generating other visual arrangements via the VC tool 20b. The commenting end device 14 may further use the VC tool 20b to generate and transmit comments with respect to the arrangement. The comments may be transmitted to only the generating end device 12, or to both the generating end device and another commenting end device 16.

A commenting device need not include the VC tool to view and comment on a presented visual arrangement. For example, the commenting end device 16 may still view and comment on the arrangement even without the VC tool. This may be done, for example, via a web browser 22 or like software application used to access the VC server 10 and retrieve a web page of the visual arrangement. The VC server 10 provides an interface on the web page allowing the commenting end device 16 to add comments for the presented visual arrangement. The comments may be transmitted to only the generating end device 12, or to both the generating end device and the other commenting end device 14.

The images included in the visual arrangement may not be copied or re-used by the commenting end device 16 given that it is not equipped with a copy of the VC tool. Even with the VC tool, a commenting end device such as end device 14 may not copy or re-use the images unless the images are transmitted to the end device 14 in a "shared" mode.

According to one embodiment of the invention, all communication between the end devices 12, 14, 16 occur under the control of the VC server 10. According to one embodiment, all information associated with a new visual arrangement that is to be published to the commenting end device 14 and/or 16 is initially uploaded to the VC server 10 and stored in a central data store 28. A first time recipient of the visual arrangement equipped with a copy of the VC tool, such as the end device 14, initially downloads the images in the visual arrangement in its own local data store, such as data store 24b. Thereafter, if the recipient desires to transmit a comment on the visual arrangement back to the creating author, only the comment is transmitted to the VC server 10 along with a link or reference to the corresponding visual arrangement. The VC server 10 then forwards the comment and the link/reference to the author. According to one embodiment of the invention, the VC server 10 maintains a copy of the received comment in the central data store 28.

It should be appreciated that the actual images in the visual arrangement are not retransmitted after the initial uploading and downloading to the recipient(s). If, however, changes are made to the images included in the visual arrangement, the changed images are uploaded to the VC server 10 for updating the arrangement in the central data store 28, and the changed images then forwarded to the recipient(s) equipped with the VC tool.

Figure 2:
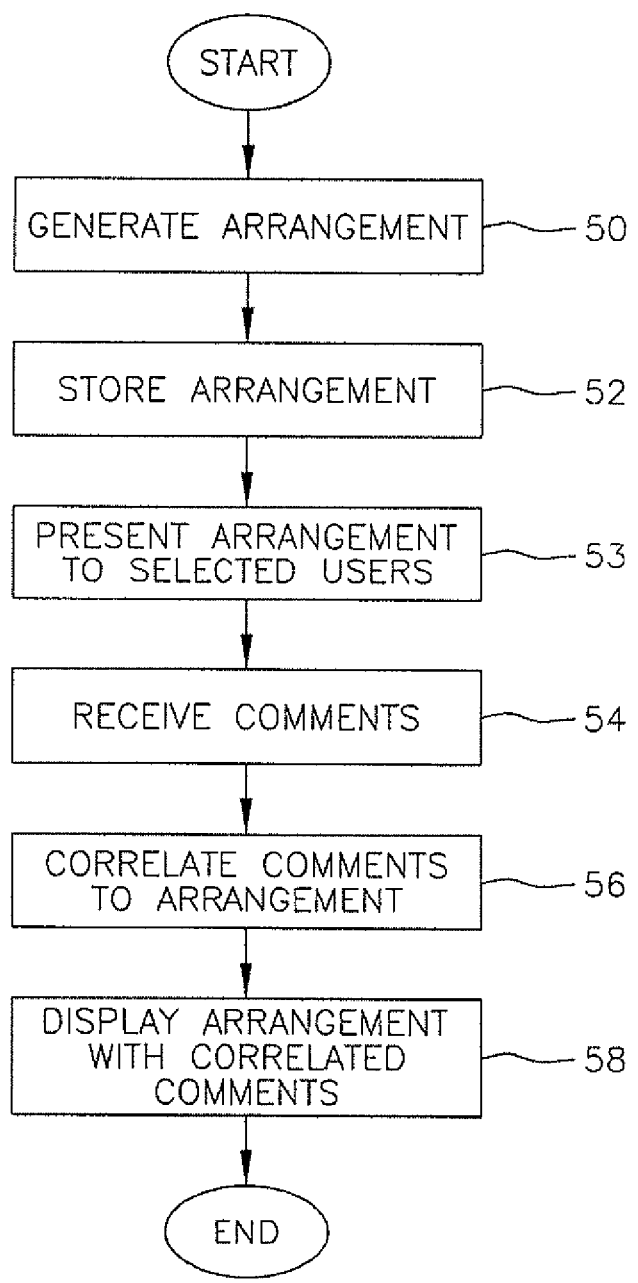
FIG. 2 is a flow diagram of a process implemented by a visual communications (VC) tool according to one embodiment of the invention.

FIG. 2 is a flow diagram of a process implemented by the visual communications (VC) tool 20a according to one embodiment of the invention. In step 50, the VC tool 20a generates a visual arrangement, and in step 52, stores the visual arrangement in the local data store 24a. The visual arrangement may be, for example, a folio organizing different types of pictures, sketches, swatches, and colors. The visual arrangement may also be a storyboard providing a collage of pictures, shapes, annotation, and text, for visualizing concepts and ideas. The visual arrangement may further be a slide show of pictures, folios, or storyboards, for communicating concepts and ideas in an organized manner.

Once generated, the visual arrangement is, in step 53, presented or published to the commenting end device 14 and/or 16 as desired by the author. In this regard, all information associated with the visual arrangement, including all images, descriptions, and comments, hereinafter simply referred to as the visual arrangement, are initially uploaded by the VC tool 20a to the VC server 10. The uploaded information is stored in the central data store 28, and a link or reference generated for the visual arrangement.

The VC server 10 then publishes the visual arrangement to the commenting end devices 14 and/or 16. The initial publication of the visual arrangement to the commenting end device 14 with the VC tool 20b involves the actual downloading of the arrangement by the commenting end device 14. The publication of the visual arrangement to the commenting end device 16 without the VC tool involves the transmission of a link to a web page generated for the visual arrangement. In either case, the recipient receives a notification that the visual arrangement has been published.

The users of the commenting end devices 14, 16 review the visual arrangement and provide comments in response. The comments are then received by the generating end device 12 in step 54. The comments from the commenting end device 14 include a reference to the portion of the visual arrangement to which the comment relates, but does not include the actual images in the visual arrangement. The comments and the link to the relevant portion of the visual arrangement are received by the VC server 10 and forwarded to the appropriate recipients.

In step 56, the VC tool 20a correlates a received comment to a relevant portion of a corresponding visual arrangement in the local data store 24a. The relevant portion of the corresponding visual arrangement may be identified via the link or reference that is transmitted with the comment. The identified visual arrangement is then updated based on the received comment.

In step 58, the VC tool 20a displays the visual arrangement with the correlated comment in response to a user command. The user command may be, for example, a single user action which opens a notification in the user's inbox that a comment has arrived.

The process described with respect to FIG. 2 allow comments to be kept together with the visual arrangement to which the comments are directed. Furthermore, the user need not manipulate different programs for concurrently viewing the visual arrangement and the associated comments. In addition, bandwidth savings may be achieved by avoiding constant re-transmission of the images in the visual arrangement.

Figure 3:
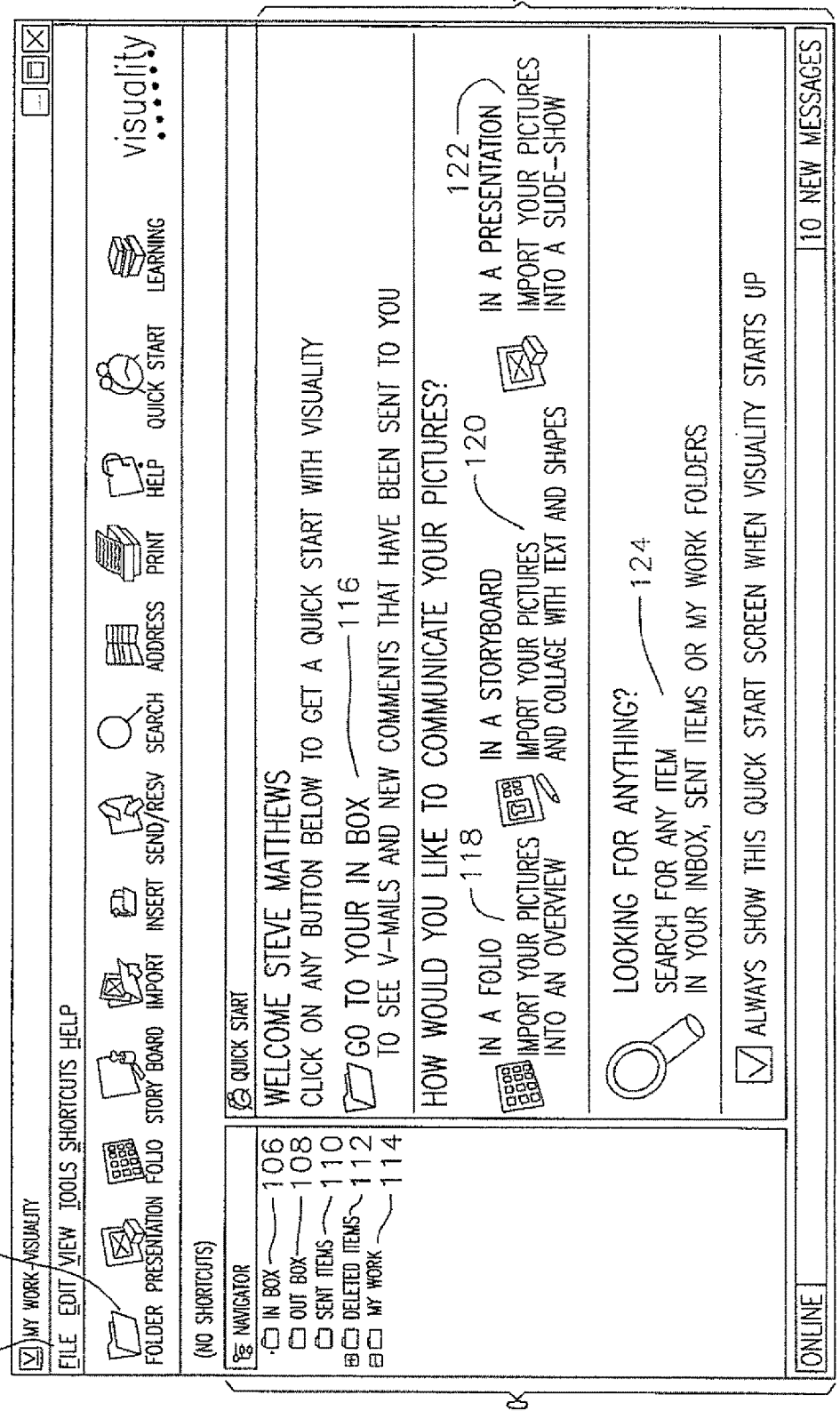
FIG. 3 is a screen shot of a graphical user interface provided by the VC tool of FIG. 2 according to one embodiment of the invention.

FIG. 3 is a screen shot of a graphical user interface provided by the VC tool 20a, 20b (collectively referred to as 20), according to one embodiment of the invention. The interface includes a navigator area 100, work area 102, menu bar 103, and main tool bar 104. The navigator area 100 includes a work folder 114 for storing imported pictures and visual arrangements generated by the author using the VC tool.

The navigator area 100 further includes an inbox folder 106, an outbox folder 108, a sent items folder 110, and a deleted items folder 112. The inbox folder 106 stores notifications that arrangements or comments have been published. The outbox folder 108 stores copies of arrangements or comments that are to be published by the VC tool 20, but have not yet been delivered to the VC server 10 due to, for example, a lack of connection to the server. The sent items folder 108 stores information on the visual arrangements and notifications that have been published by the VC tool 20. The deleted items folder 112 stores all pictures, arrangements, and notifications deleted by the VC tool. According to one embodiment of the invention, the various folders 106-112 may be integrated with similar folders used in typical e-mail application, such as, for example, Microsoft Outlook™.

The menu bar 103 contains menu items for accessing the various features provided by the VC tool 20. The more common tasks, such as, for example, the creating, opening, and editing of different types of visual arrangements, importing of pictures, sending/receiving of information related to the visual arrangements, and the like, may be accessed via one or more buttons incorporated into a main tool bar 104.

According to one embodiment of the invention, the work area 102 displays a quick start page when the VC tool is invoked. The quick start page provides the user with the following options: (1) option to view the contents in the inbox folder 116; (2) option to create a folio 118; (3) option to create a storyboard 120; (4) option to create a presentation 122; and (3) option to search 124 for an item in one of the folders listed in the navigator area.

Figure 4:
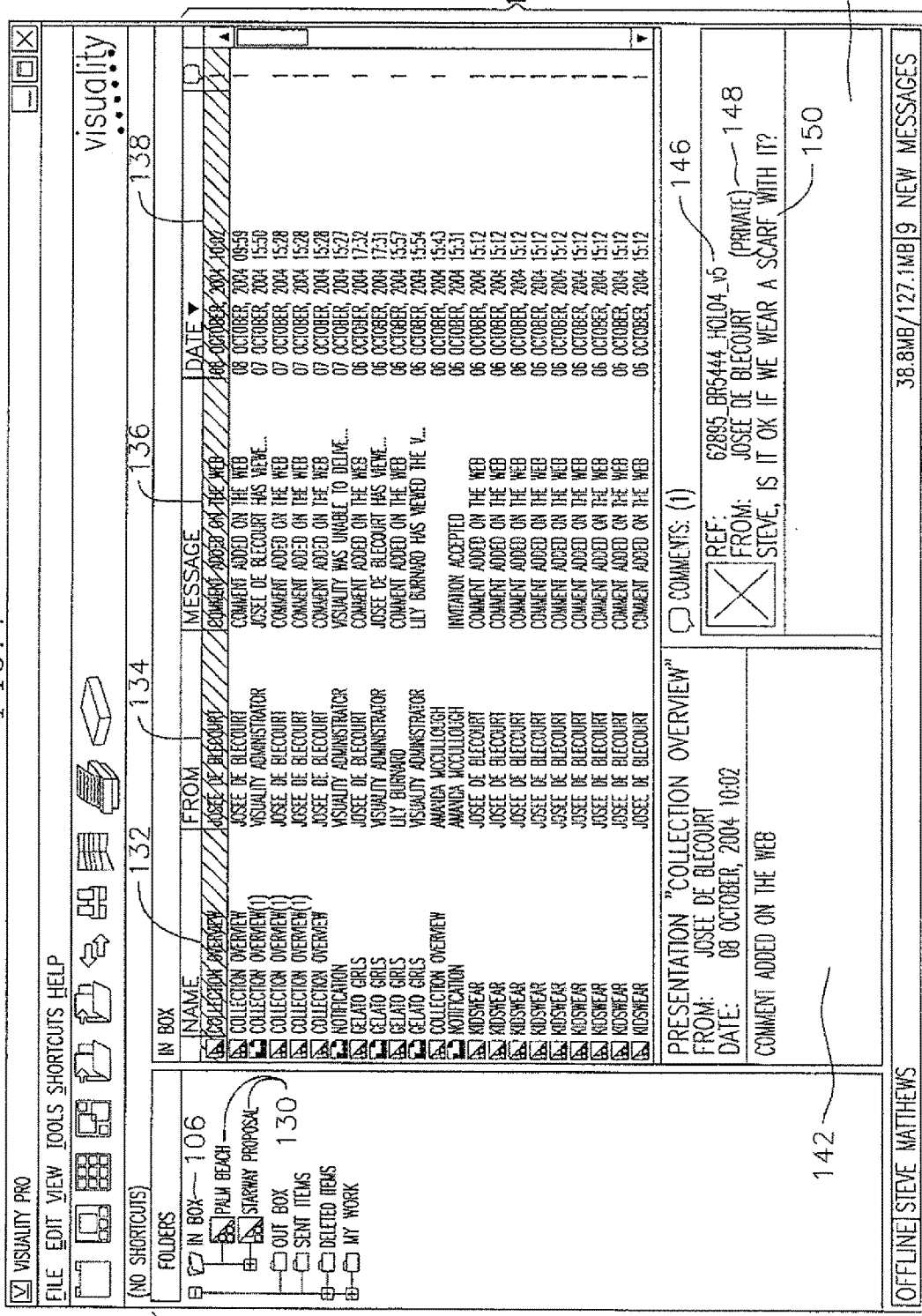
FIG. 4 is a screen shot of updated navigator and work areas upon user selection of an inbox folder according to one embodiment of the invention.

FIG. 4 is a screen shot of the updated navigator and work areas 100, 102 upon user selection of the inbox folder 106 according to one embodiment of the invention. The navigator area 100 is updated to include a list of the visual arrangements 130 that have been published to the VC tool by others.

The work area 102 is updated to include information on notifications received by the VC tool 20. According to one embodiment of the invention, the VC tool periodically contacts the VC server 10 for any new notifications while the VC tool is connected to the data communications network 18. Such notifications may include a name for the notification 132, a sender of the notification 134, a portion of the message 136, and a date 138. According to one embodiment of the invention, the name 132 identifies a visual arrangement if the notification is linked to the visual arrangement.

If the notification is not linked to a visual arrangement, it is simply a textual notification identified by a generic name. For example, the textual notification may be an invitation transmitted by the VC server 10 prior to publishing an arrangement to the VC tool for the first time. The invitation invites the user to accept or decline receipt of the arrangement.

According to one embodiment of the invention, a first type of selection of a notification (e.g. highlighting the notification) causes the display of a message that is delivered with the notification, on a portion 142 of the work area 102. The message may be a personal message provided by the sender, or a default message provided by the VC server 10. A default message may provide information, for example, as to when and who has viewed the visual arrangement published by the VC tool 20.

If the notification is for a published comment, the first type of selection of the notification further displays the text of the comment 150 on another portion 144 of the work area 102. Also displayed is a reference 146 to the portion of the visual arrangement to which the comment relates, and the person 148 publishing the comment. The reference 146 may be the name of the portion of the visual arrangement and/or one or more thumbnails of images to which the comment relates.

Figure 5:
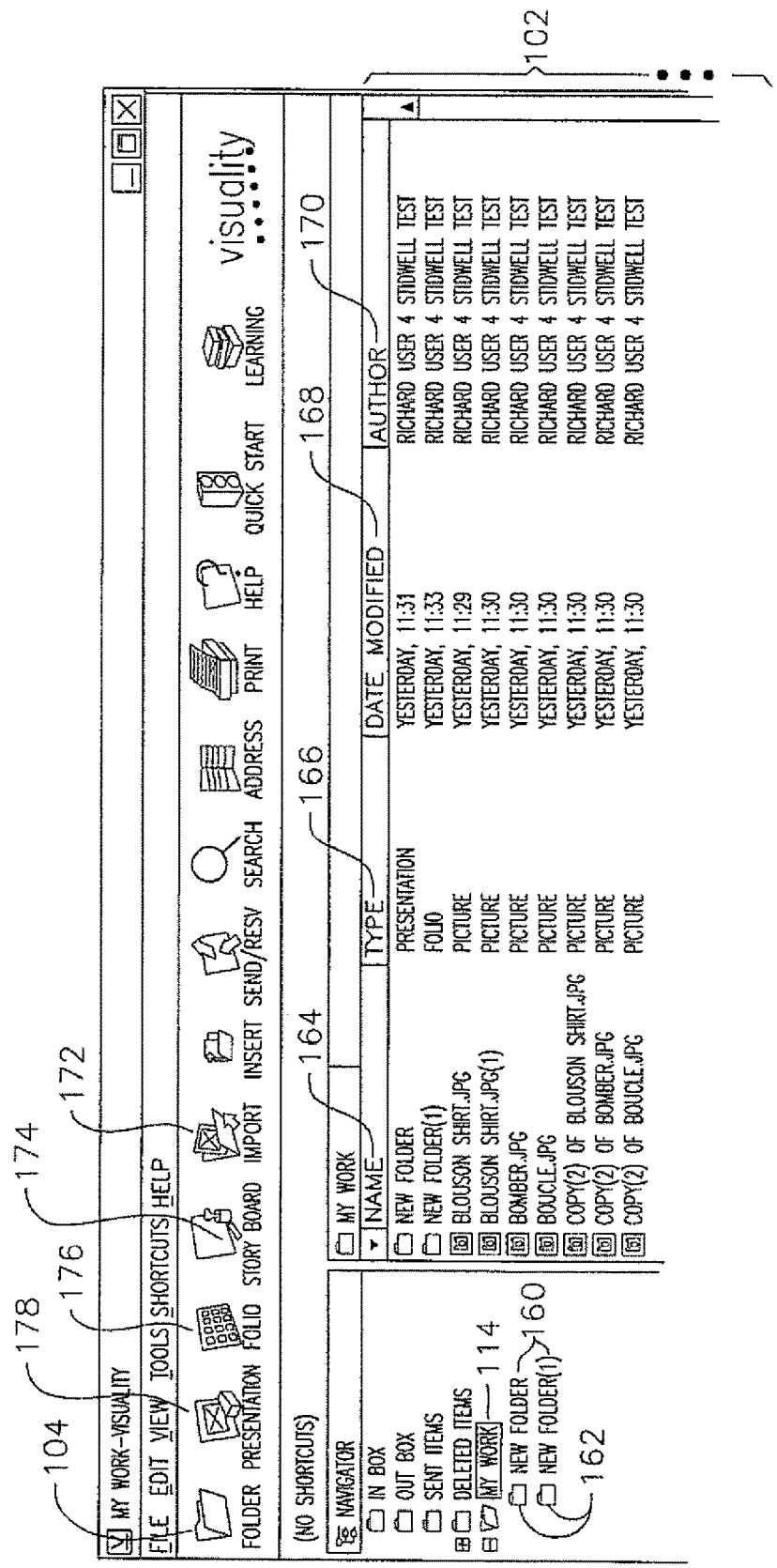
FIG. 5 is a screen shot of updated navigator and work areas upon user selection of a work folder according to one embodiment of the invention.

FIG. 5 is a screen shot of the updated navigator area 100 and work area 102 upon user selection of the work folder 114 according to one embodiment of the invention. The navigator area 100 is updated to include a list of folders 160 containing the visual arrangement generated via the VC tool 20. The name of each folder may indicate the name of the visual arrangement. Furthermore, different icons 162 may be used to easily identify the type of visual arrangement (e.g. a folio, storyboard, or presentation).

The work area 102 is updated to include information on current work stored in the local data store 24a, 24b (collectively referred to as 24). Such information includes, for example, a name 164 of the work, a type 166 of work, date 168 in which the work was modified, and an author 170 of the work.

According to one embodiment of the invention, only pictures that have been imported into the VC tool, or included in a visual arrangement shared with the VC tool may be used by the VC tool for generating the visual arrangements. A picture may be imported into the work folder 114 directly upon selection of an import button 172 from the main tool bar 104. Pictures may also be imported at any time during the creation of a visual arrangement. In this case, the pictures are imported directly in the particular folder 160 storing the visual arrangement. Selection of a particular folder causes the work area 102 to display a list of pictures and/or other visual arrangements included in the folder.

A user command to import a picture causes a display of a browser that the author may use to browse and select different picture files that are to be imported into the VC tool 20. According to one embodiment of the invention, the tool allows the importing of all types of images, including JPEG, GIF, PNG, TIFF, and PDF files. According to one embodiment of the invention, PDF files are first converted to JPEG images before importing into the VC tool. To get around the problem of low quality printouts from JPEG images converted from a PDF file, the VC tool provides a zoom option that allows the JPEG images to be viewed in more detail.

Figure 6:
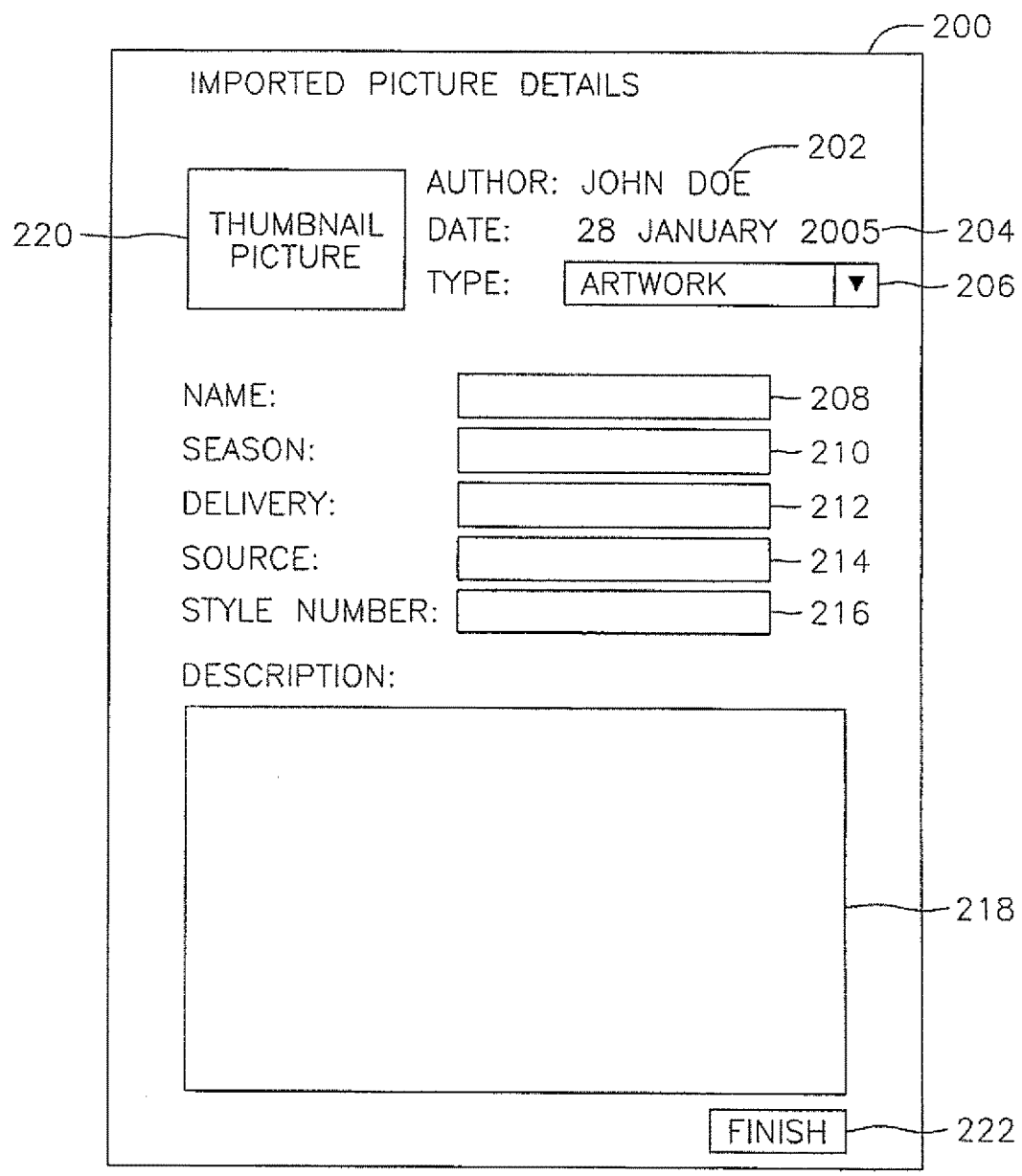
FIG. 6 is a screen shot of a picture information window according to one embodiment of the invention.

The author may provide additional information about the picture during the importing process. FIG. 6 is a screen shot of a picture information window 200 displayed during the importing process for allowing the author to provide information on an imported picture according to one embodiment of the invention. The picture information window 200 includes a thumbnail 220 of the picture, an author 202, and a current date 204, and prompts the user for a picture type 206, name 208, season 210, delivery 212, source 214, and/or style number 216 information. The user may further provide a free-text description of the picture in a description area 218. Selection of a finish button 222 causes the entered information to be stored in the local data store 24 in association with the picture.

Figure 7:
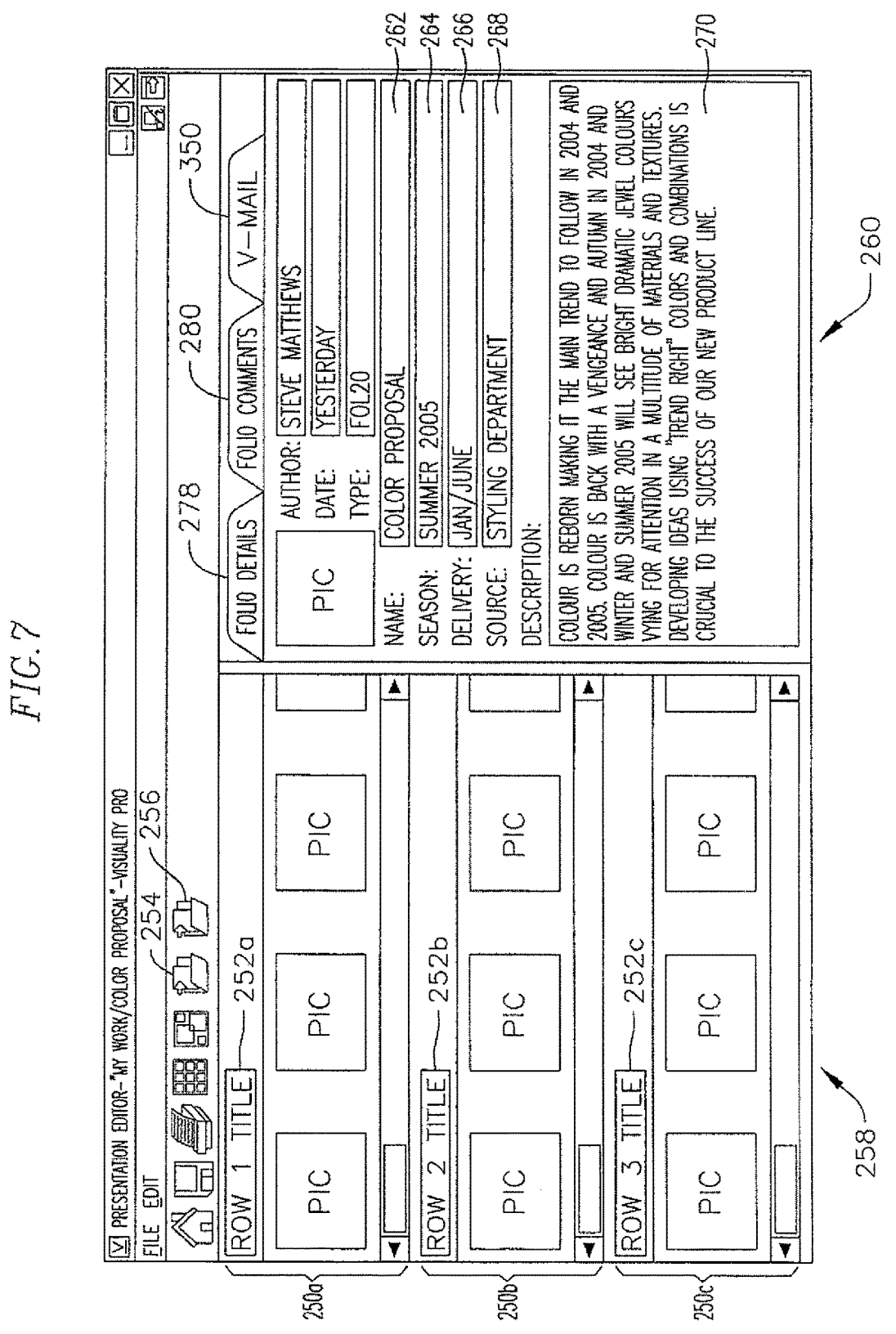

FIG. 7 is a screen shot of a folio generated by the VC tool 20 according to one embodiment of the invention. A new folio may be generated, for example, upon the selection of a folio button 176 (FIG. 5) from the main tool bar 104. Pictures may then imported into the folio by selecting an import button 254. Other visual arrangements (e.g. storyboards), pictures that have already been imported, or all or portions of visual arrangements shared by others may also be included in the folio by selecting an insert button 256.

Thumbnails of pictures included into the folio are displayed in a picture area 258 of the screen, and details about the folio or individual pictures in the folio are concurrently displayed in a details area 260 of the screen. The picture area 258 includes one or more rows 250a, 250b, 250c with each row identified by a user-entered row label 252a, 252b, 252c. The rows may be used, for example, to organize the picture thumbnails into particular categories. The pictures may be re-organized by clicking and dragging the pictures from one row to another. A new row may further be generated by clicking and dragging a picture into the picture area below the last row. The picture is then inserted into the newly generated row.

Double clicking on a particular thumbnail allows the associated picture to be displayed on a separate window in a picture editing mode. From this window, the author may crop, resize, rotate, and otherwise manipulate the picture. If the changes are saved, the changes are reflected in the picture thumbnail.

The details area 260 provides detailed information on the entire folio or individual pictures included into the folio. In the example screen shot of FIG. 7, the details area 260 displays detailed information on the entire folio under a folio details tab 278. Such details are provided by the user of the VC tool 20, and may include a name of the folio 262 as well as season 262, delivery 266, and source 268 information. The user may further provide a detailed description of the folio in a folio description section 270.

A user may also add or view comments with respect to the folio by selecting a folio comments tab 280. The feature of adding and viewing comments is described in further detail below with respect to FIG. 9. The user may then transmit the comments by selecting a mail tab 350. The mail feature is described in further detail below with respect to FIGS. 10 and 11.

As the user navigates from thumbnail to thumbnail, the user-entered picture information relevant to the selected thumbnail is displayed on the details area 260. The folio details tab 278 and the folio comments tab 280 are respectively replaced with a picture details tab (not shown) and a picture comments tab (not shown) when displaying picture details. The format of the picture details and comments may be same as the folio details and comments. In this manner, visual arrangements/pictures and the textual information describing such arrangements/pictures may be maintained together and concurrently displayed on a single screen.

The picture and details area 258, 260 contain similar information for other visual arrangements, such as a storyboard or presentation. The picture area 258 for a storyboard or presentation includes pictures or other visual arrangements included into the storyboard or presentation, and the details area 260 includes details on the storyboard or presentation. Furthermore, clicking on a particular picture or visual arrangement included into the storyboard or presentation causes details on the individual picture or arrangement to be displayed in the details area 260.

Figure 8:
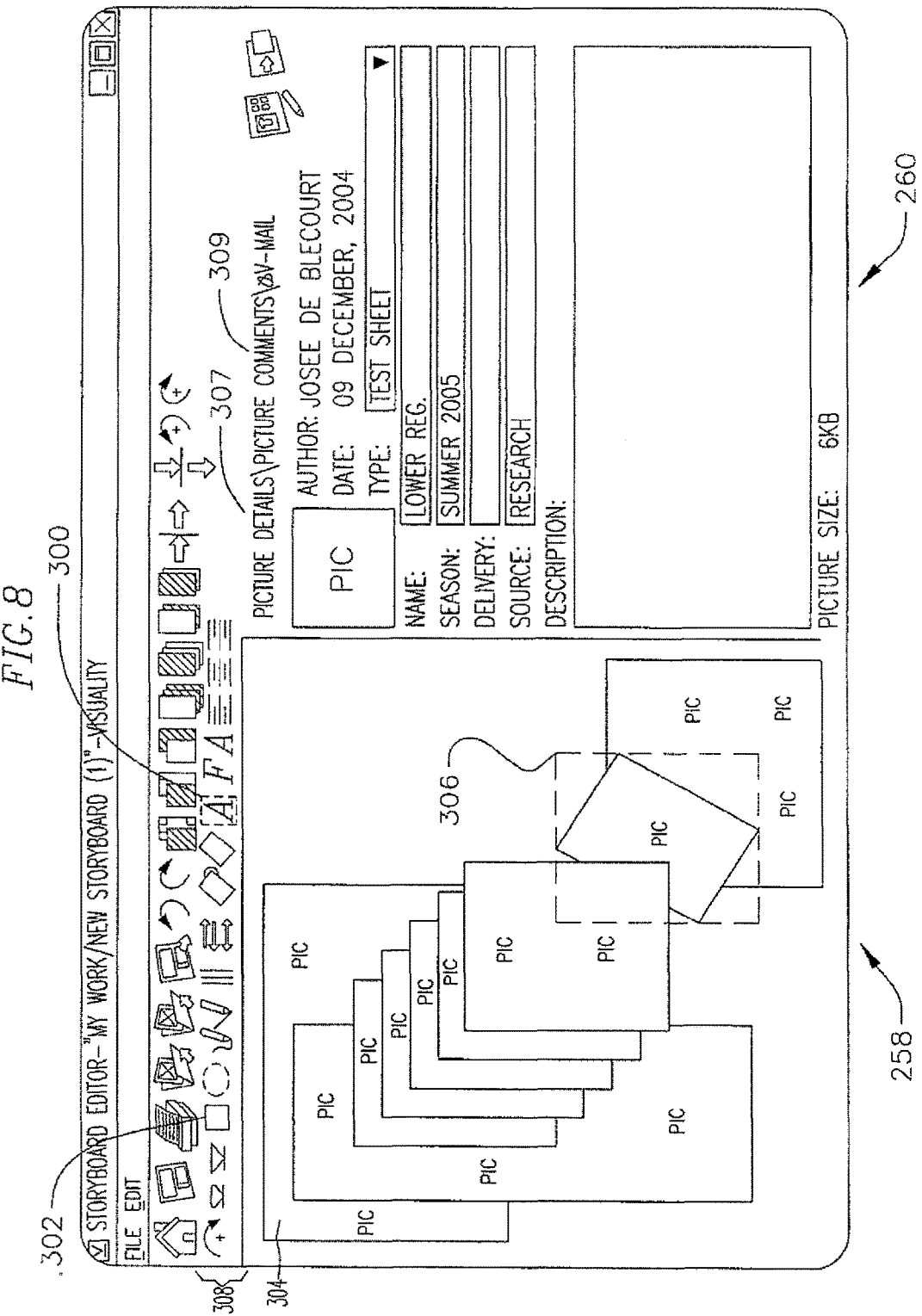
FIG. 8 is a screen shot of an exemplary storyboard generated by the VC tool of FIG. 2 according to one embodiment of the invention.

FIG. 8 is a screen shot of an exemplary storyboard according to one embodiment of the invention. A new storyboard may be generated, for example, upon the selection of a storyboard button 174 (FIG. 5) from the main tool bar 104. A storyboard may be used to combine and edit pictures for generating mood boards, product groups, fabric collections, and the like. As with a folio, pictures may be imported or inserted into the picture area 258. Unlike a folio, however, the pictures are not inserted into rows. Instead, a picture is first inserted into a corner 304 of the picture area, and may then be clicked and dragged to a new desired location within the picture area.

Clicking on a particular picture also displays the picture's boundary line 306, and may be manipulated to resize, rotate, or crop the picture. Text and shapes may also be inserted into the picture area 258 upon selection of text and shape icons 300, 302 in a secondary tool bar 308.

Clicking on a particular picture further causes the details area 260 to switch from displaying storyboard details to displaying details of the selected picture under a picture details tab 307. Comments on the selected picture may be viewed or added by selecting a picture comments tab 309.

Figure 9:
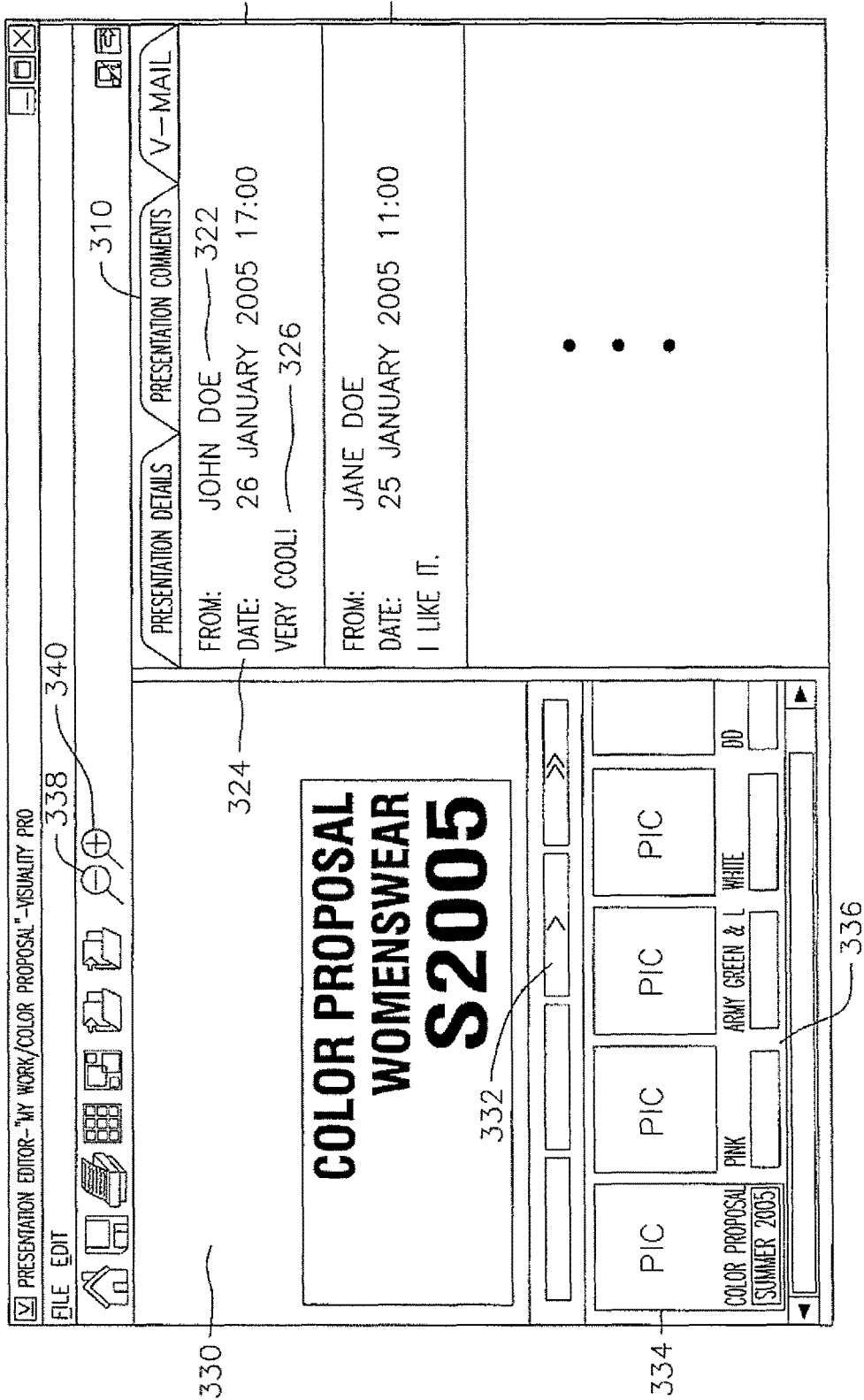
FIG. 9 is a screen shot of an exemplary presentation according to one embodiment of the invention.

FIG. 9 is a screen shot of an exemplary presentation according to one embodiment of the invention. A new presentation may be generated, for example, upon the selection of a presentation button 178 (FIG. 5) from the main tool bar 104. A presentation allows the author to generate a slideshow of pictures, folios, or storyboards that have been imported or inserted into the presentation. The slideshow is displayed on a slideshow area 330, and may include a customized cover page picture 334 and other pictures/arrangements 336 that have been imported or inserted into the presentation. An import cover page option allows the importing of a cover page. Unlike the importing of other pictures, importing of a cover page does not require detailed information about the cover page picture.

A viewer may move forward on the slideshow by selecting a forward button 332. Furthermore, view editors 338, 340 may be manipulated to zoom in and out of the pictures displayed on the slideshow area 330.

Selection of a presentation comments tab 310 allows the author to view, add, or delete comments 320 on the entire slideshow. Each comment includes information on the person 322 making the comment, the date and time 324 in which the comment was added 324, and the text 326 of the comment itself. A private comment directed to only the author is marked with a "private" label. Similar information is provided for comments provided for individual pictures upon the selection of a picture and a corresponding picture comments tab, such as, for example, the picture comments tab 309 of FIG. 8.

It should be appreciated that the comments 320 that are displayed, if not added by the user of the VC tool 20, are comments that have been transmitted by others in notifications received by the VC tool and stored in the inbox folder 106. As discussed above, such notifications do not include the actual picture or arrangement to which the comment relates, but a link to the picture or arrangement, allowing the VC tool to automatically associate the received comment to the corresponding picture or arrangement. Upon selection of the presentation comments tab 310, the VC tool automatically retrieves all comments that have been correlated to the current presentation and concurrently displays such comments on a single screen with the corresponding images.

Figure 10:
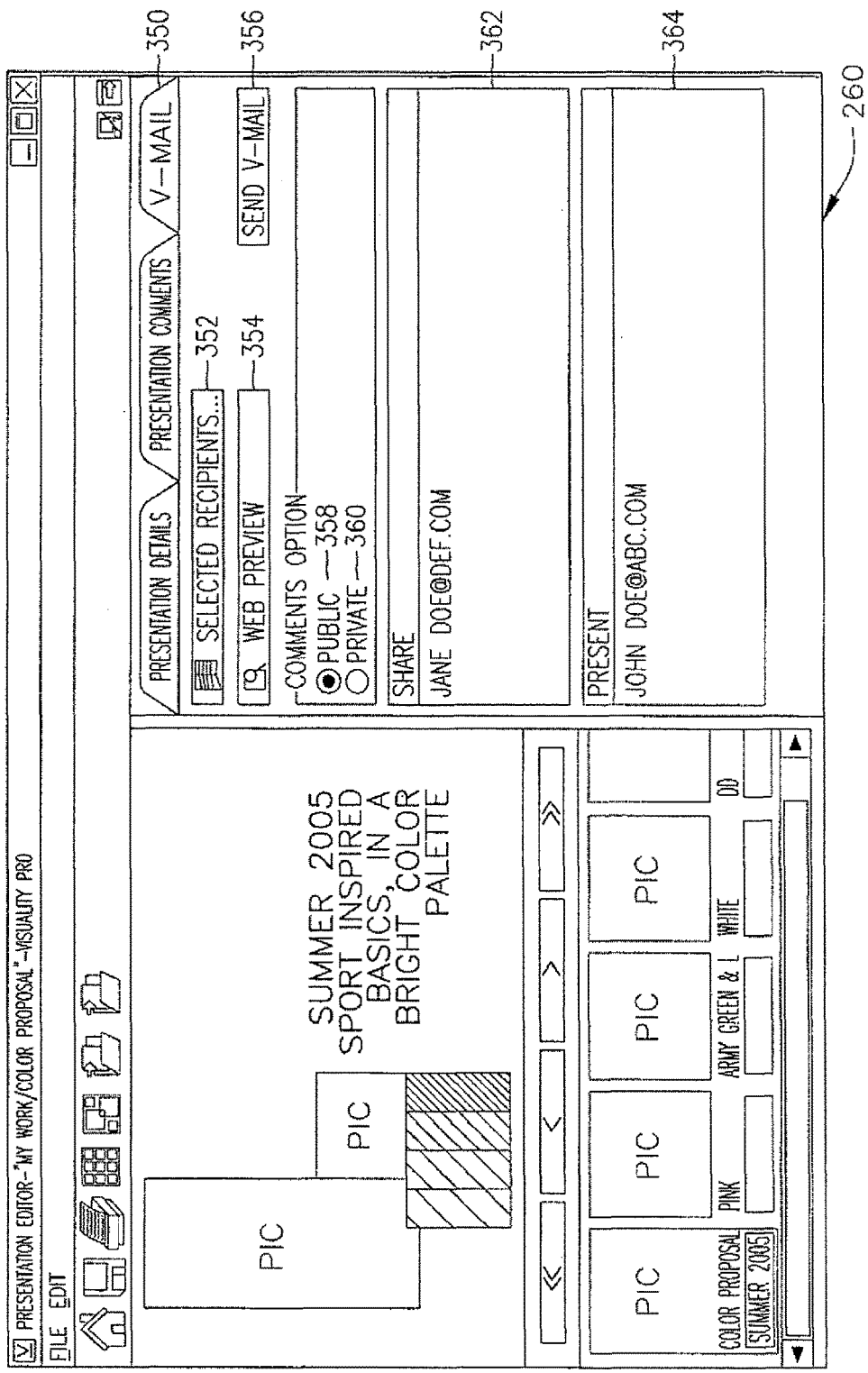
FIG. 10 is a screen shot of information displayed on a details area upon selection of a mail tab according to one embodiment of the invention.

The user of the VC tool 20 may make changes to a current visual arrangement, such as, for example, by changing the images, descriptions, or comments in the arrangement, and publish the modified arrangement to one or more recipients via a mail feature invoked upon selecting the mail tab 350. FIG. 10 is a screen shot of information displayed on the details area 260 upon selection of the mail tab 350 according to one embodiment of the invention.

Figure 11:
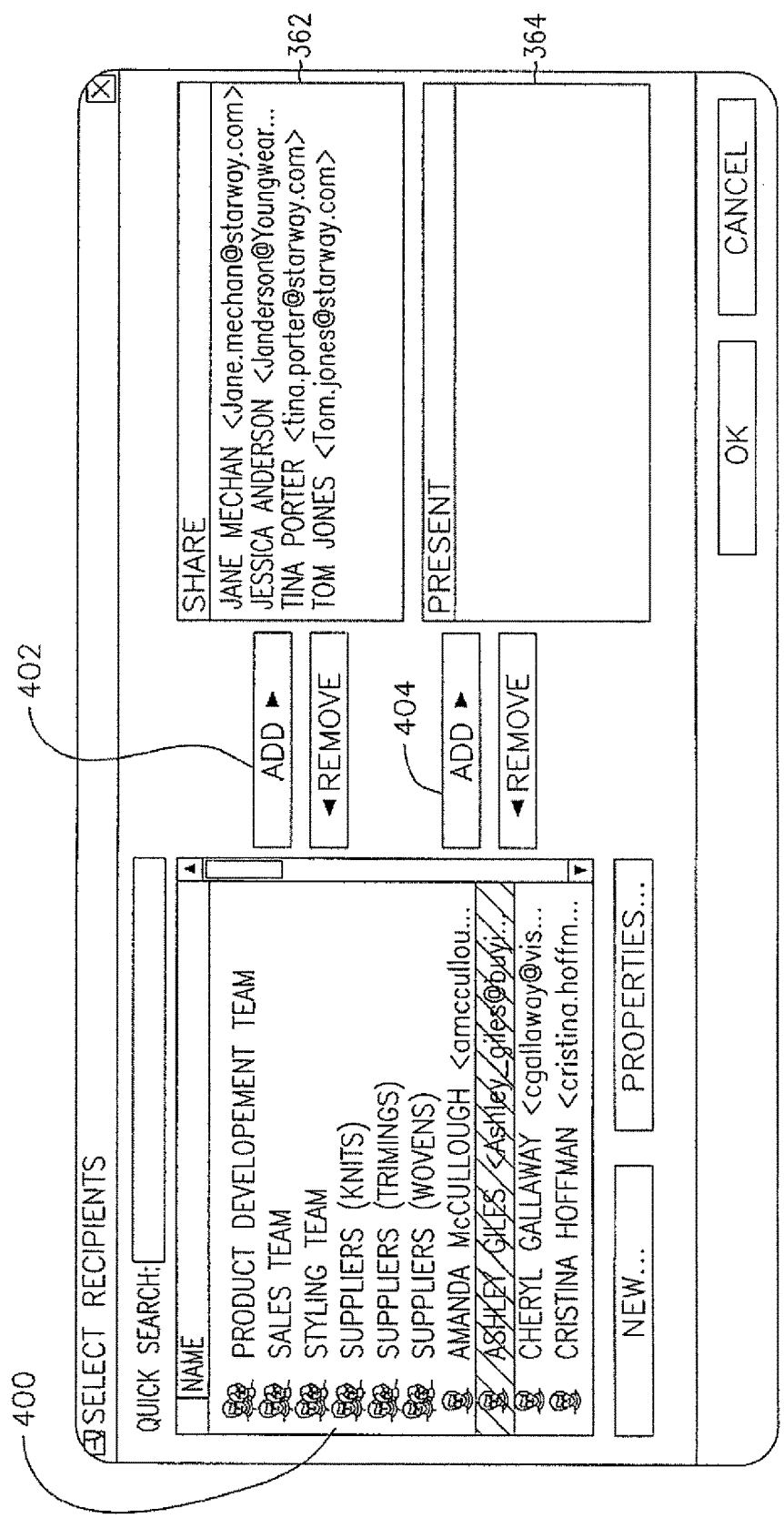
FIG. 11 is a screen shot of a contacts window according to one embodiment of the invention.

A selection recipients option 352 causes display of all contact information maintained by the VC tool in a separate contacts window, such as the window displayed on FIG. 11. The user of the VC tool 20 selects a desired recipient from a list of contacts 400, and adds the recipient to a share list 362 upon selecting add button 402, or to a present list 364 upon selecting add button 404. The recipients in the share list 362 may copy and re-use the pictures and arrangements published to such recipients, in their own work. According to one embodiment of the invention, only other VC tool users may be included as share recipients.

The recipients in the present list 364 may view and respond with comments, but may not copy the published pictures. Any person with an e-mail account may be included as a recipient in the present list. Such persons need not be VC tool users.

According to one embodiment of the invention, the author of the visual arrangement may set a comment preference as public 358 or private 360. Selection of the public preference causes response comments to be sent to all the recipients identified by the author. Selection of the private preference causes response comments to be only sent back to the author.

Prior to making a publication to a non-VC tool recipient who is to view the publication as a web page, the author may select a web preview icon 354 and receive a link to the web page in an e-mail to the author's e-mail account. Selection of the link allows the author to view the web page as it would be viewed by the non-VC tool recipient.

Once the author is ready to publish the visual arrangement or comments in response to a published visual arrangement, the author selects a send button 356. In response, the VC tool causes display of separate message window where the author may enter an optional message to be provided in the notification delivered to the VC tool recipient, or in the e-mail delivered to the non-VC tool recipient.

After entry of the optional message, the VC tool 20 stores a copy of the information to be published in the outbox folder 108 if the VC tool is in an offline mode, and transmits it the next time a connection is made to the VC server 10. If the VC tool is in an online mode, the information to be published is uploaded to the VC server 10 for presenting to the recipients.

Figure 12:
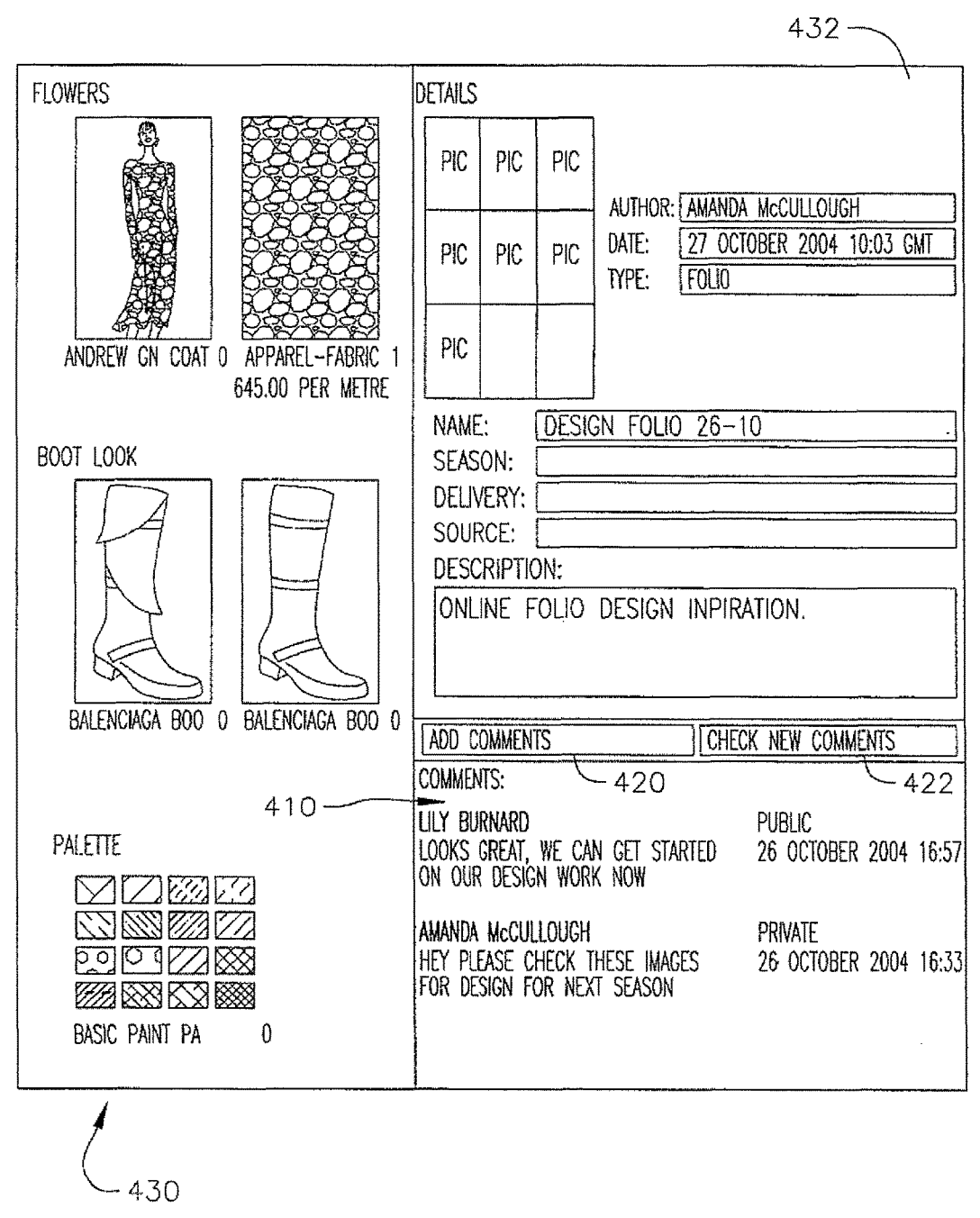

FIG. 12 is an exemplary web page accessed by a non-VC tool recipient according to one embodiment of the invention. The web page is accessed via a link provided by the VC server 10 in an e-mail addressed to the recipient's e-mail account. Upon selection of the link, the recipient may view the web page via the recipient's web browser, such as the web browser 22 of FIG. 1.

The web page displays the published images in a pictures area 430. Details on the images are displayed on a details area 432, and comments associated with the images displayed in a comments area 410. The recipient may add new comments by selecting an add comments button 420, or check for new comments by selecting a check new comments button 422.

Selection of the add comments button 420 causes display of a separate comments window (not shown) where the user may enter his or her comments and further select whether the entered comments are to be delivered to only the publishing author, or to all recipients designated by the publishing author.

Alternative Embodiment

There is also a need for a visual communications tool for use in business-to-business transactions that allows for efficient identification and organization of products to be sold/purchased, as well as conversations around images of those products to be sold and/or purchased. According to one embodiment of the invention, the VC tool is accessed via a web browser over the Internet. The browser-based VC tool allows end users to generate visual arrangements (also referred to as lookbooks) and share them with other end users without having to download a stand-alone copy of the VC tool. The visual arrangements are shared/published via email. Emails are generated with links to the visual arrangements which eliminates the need to send the visual arrangements as attachments. Such emails are hereinafter referred to as vmails (visual emails). The browser-based VC tool also allows end users to view the shared visual arrangements, transmit comments, make notes, generate new visual arrangements based on shared visual arrangements, and place orders for products depicted in the visual arrangements, all without downloading the VC tool on the end devices.

Figure 13:
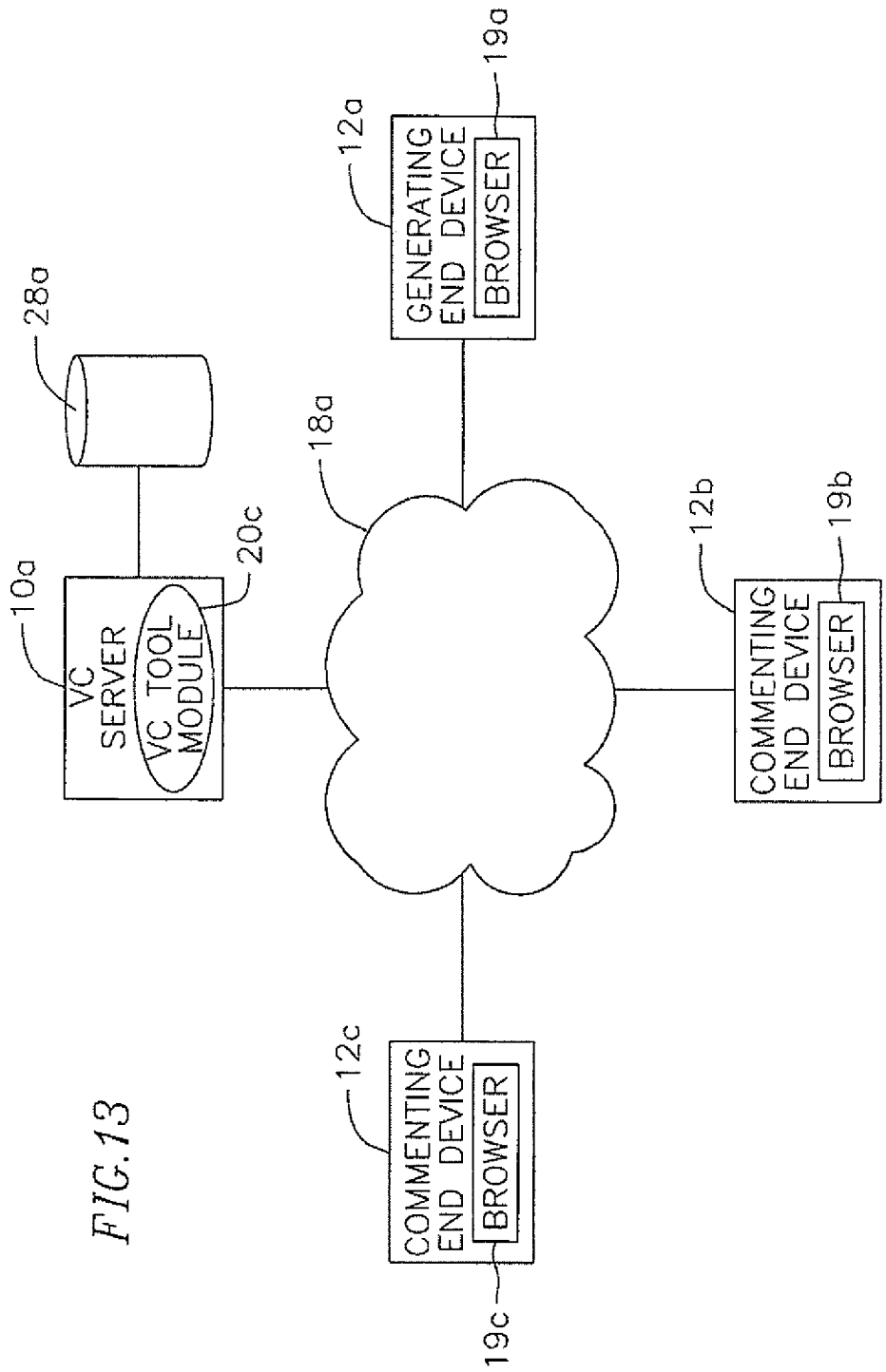
FIG. 13 is a block diagram of a visual communications system according to an embodiment of the present invention.

FIG. 13 is a block diagram of the visual communications system according to an embodiment of the present invention. The visual communications system of FIG. 13 is similar to the visual communications system of FIG. 1, except that none of the end user devices need to download the VC tool in order to take advantage of the various functionalities of the system. Of course, the tool can, be downloaded if desired as described above with respect to FIG. 1.

The visual communications system includes a VC server 10a which may be similar to the VC server 10 of FIG. 1. The VC server 10a includes an addressable memory for storing computer program instructions to be executed by a processor. The memory is implemented using standard memory devices such as a random access memory (RAM) and a read only memory (ROM). In one embodiment, the memory stores a number of software objects or modules including a VC tool module 20c. The VC tool module 20c is configured to provide a VC tool to end devices 12a-12c (collectively referred to as 12) over a data communications network 18a. The data communications network 18a may be similar to the data communications network of FIG. 1. According to one embodiment, the VC tool module 20c provides the VC tool as a web application that is accessed by the end devices via a web browser 19a-19c (collectively referred to as 19).

The end devices 12a-12c may be similar to the end devices 12, 14, and 18 of FIG. 1. Thus, like the end devices of FIG. 1, each of the end devices of FIG. 13 may be a personal computer, laptop, tablet computer, smart phone, or other consumer electronics device conventional in the art. Each of the end devices 12a-12c have a processor and memory including computer program instructions, which, when executed by the processor of the end device, causes the end device to achieve the visual communication functionalities of the system. The end devices are also equipped with one or more input devices (e.g. physical/onscreen keyboard, mouse, stylus, multi-touch screen, etc.) for receiving user inputs, and one or more output devices (e.g. display screen, printer, etc.) for providing user outputs.

According to one embodiment, the VC server 10a is coupled to a central data store 28a which may be similar to the central data store 28 of FIG. 1. The central data store 28a includes an image repository which stores all images uploaded to the server 10a by the end devices 12. The central data store 28a also includes a database of tables and records that stores information useful for implementation of the various visual communication functionalities of the system.

Figure 14:
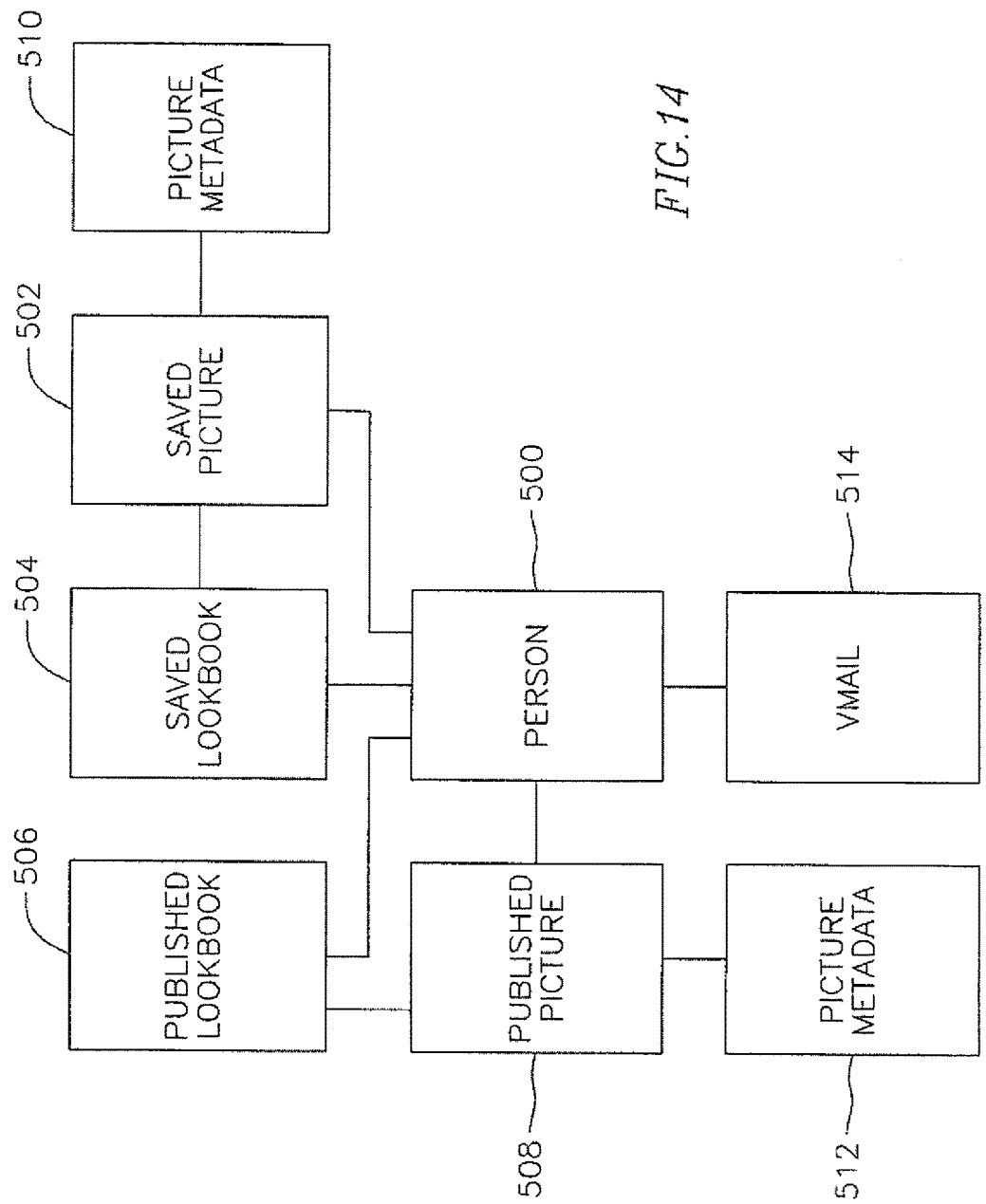
FIG. 14 is a schematic layout diagram of a database model for storing and organizing information in a database of a central data store according to one embodiment of the invention.

FIG. 14 is a schematic layout diagram of a database model for storing and organizing information in the database of the central data store 28a according to one embodiment of the invention. The database includes a person table 500 storing a person record for each end user who generates a visual arrangement.

The person table 500 is associated with a saved lookbook table 504 and a published lookbook table 506. The saved lookbook table 504 stores a saved lookbook record for each visual arrangement created and saved by a person in the person table. Each saved lookbook record is identified by a lookbook ID, and is associated with a saved picture record in a saved picture table 502. The saved picture record identifies an image included in the associated lookbook, via an image ID. The actual images are stored in the image repository. Metadata information about the images and products depicted in the images are stored in saved picture metadata records and associated with the corresponding saved picture records. The metadata records are stored in a saved picture metadata table 510.

Once the visual arrangement is published to a recipient in a vmail, a published lookbook record is created and stored in the published lookbook table 506 for the particular lookbook. Each published lookbook record includes a published lookbook ID and a revision number. The revision number is 0 for a first version of the visual arrangement published by the author. A published picture record is generated for each picture in the published lookbook, and stored in a published picture table 508 in association with the corresponding published lookbook record. Metadata information for each published picture is stored in a published picture metadata record and associated with the corresponding published picture record. The published picture metadata records are stored in a published picture metadata table 512.

Each time the particular lookbook is republished with content changes, the current record in the lookbook table 504 for the lookbook is saved into a history table (not shown), and the current record is replaced with an updated lookbook record reflecting the changes. The revision number in the updated lookbook record is increased by one relative to the revision number in the prior lookbook record. The revision number therefore identifies the number of times the particular lookbook has been republished with changes. In this manner, the published lookbook table 504 contains a single lookbook record for a lookbook with information on the most current revision published for the lookbook. On the other hand, the history table contains a lookbook record for each revision of the lookbook. Each lookbook record in the history table is uniquely identified by a combination of lookbook ID and revision number. In this manner, the history table maintains a snapshot of each revision of the lookbook allowing identification of the changes made from revision to revision.

A vmail table 514 stores a vmail record for each person with whom a lookbook is shared. Thus, each vmail record is a unique combination of a lookbook ID and a recipient ID. According to one embodiment, the vmail record contains data that helps control user level access to information contained in the associated lookbook.

Figure 15:
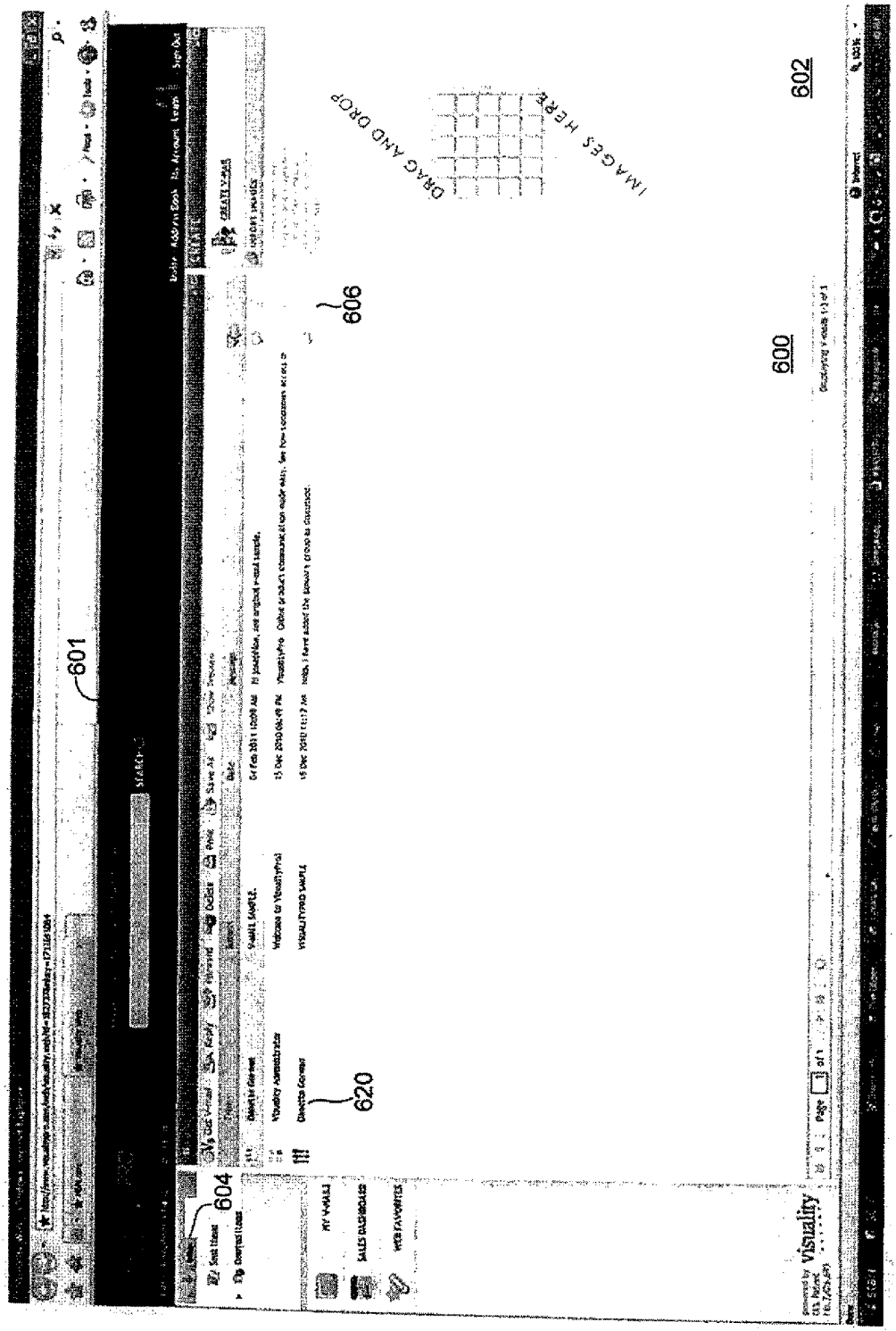
FIG. 15 is a screen shot of a VC tool according to one embodiment of the invention.

FIG. 15 is a screen shot of a VC tool 601 provided by the VC tool module 20c according to one embodiment of the invention. The VC tool is accessed and displayed by the web browser 19 on a display screen coupled to an accessing end device 12. According to one embodiment of the invention, the VC tool 601 includes a first display area 600 and a second display area 602. A list of vmails, replies, and notifications (e.g. view receipt notifications) transmitted to the user of the end device are displayed in the first display area 600 upon selection of an inbox icon 604. According to one embodiment, the vmails, replies, and notifications are transmitted and received via traditional email.

A recipient of a vmail may transmit his or comments in regards to a shared visual arrangement by transmitting a reply to the vmail. According to one embodiment, the database model includes a comments table (not shown) storing all comments transmitted for each published visual arrangement. By maintaining track of the comments, the VC tool can display a numerical alert 606 next to the vmail sharing the visual arrangement. The numerical alert indicates the total number of comments made for the visual arrangement.

Figure 16:
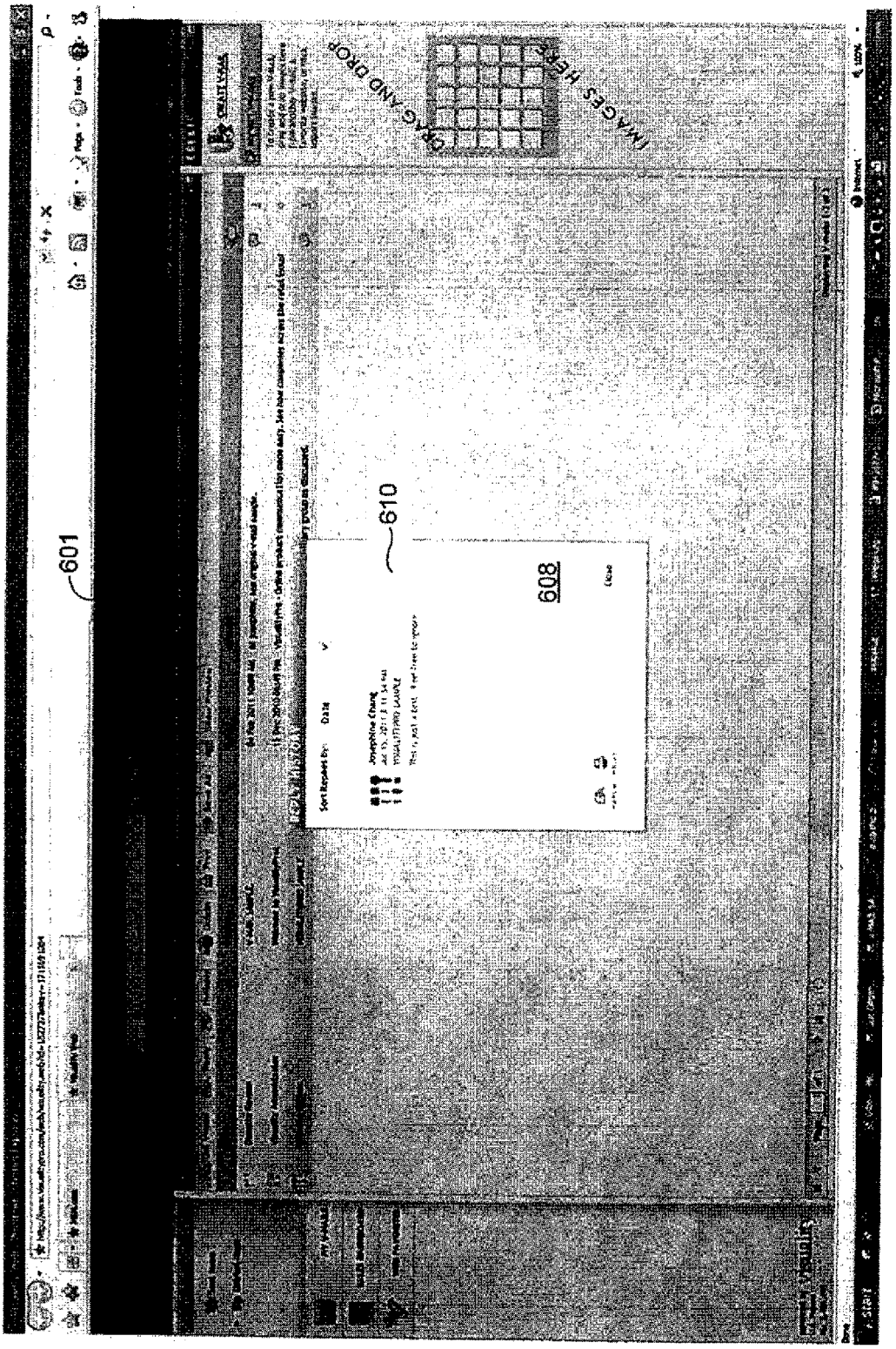
FIG. 16 is a screen shot of a VC tool displaying a reply history window according to one embodiment of the invention.

According to one embodiment, selection of the numerical alert 606 invokes a reply history window 608 such as the one depicted in the screen shot of FIG. 16. The reply history window includes a list of comments 610 published for the visual arrangement. Each comment in the list is identified by an author's name as well as a date of the comment. Selecting a particular comment from the reply history window allows a recipient of the comment to in turn reply directly to the sender. In this regard, each comment record in the comments table includes information of the commenting person. The comment record is generated when the commenting person sends the reply. The reply also causes increase of the numerical alert 606 reflecting the total reply count for the visual arrangement.

Figure 17:
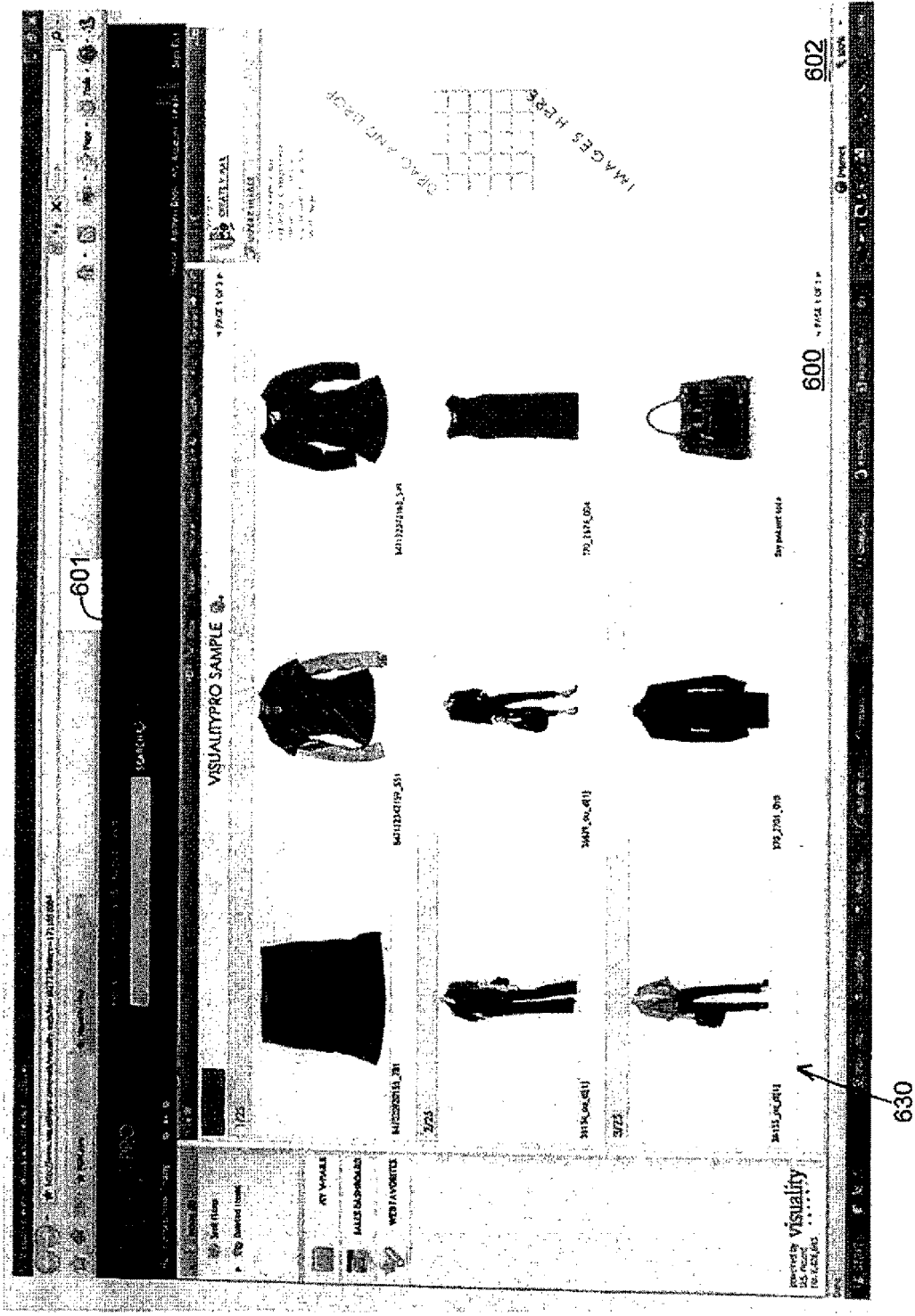
FIG. 17 is a screen shot of an exemplary visual arrangement published via a vmail that is displayed in a first display area of a VC tool according to one embodiment of the invention.

Referring again to FIG. 15, selection of a particular vmail 620 in the user's inbox causes a display of the visual arrangement shared by the vmail, in the first display area 600. FIG. 17 is a screen shot of an exemplary visual arrangement 630 that is displayed in the first display area 600. The shared visual arrangement may be the basis of one or more new visual arrangements generated by the recipient of the vmail 620. For example, a visual arrangement of suggested buys may be shared with a potential buyer via vmail. The buyer may select one or more of the suggested buys and generate-a new visual arrangement based on the selected items. For example, the buyer may wish to create a new visual arrangement containing only the items that he or she will purchase. Instead of going through the process described above of generating a folio, storyboard, or presentation, the buyer may simply click and drag the desired images in the shared visual arrangement, and drop those images in the second display area 602 to generate the new visual arrangement with the dropped images.

Figure 18:
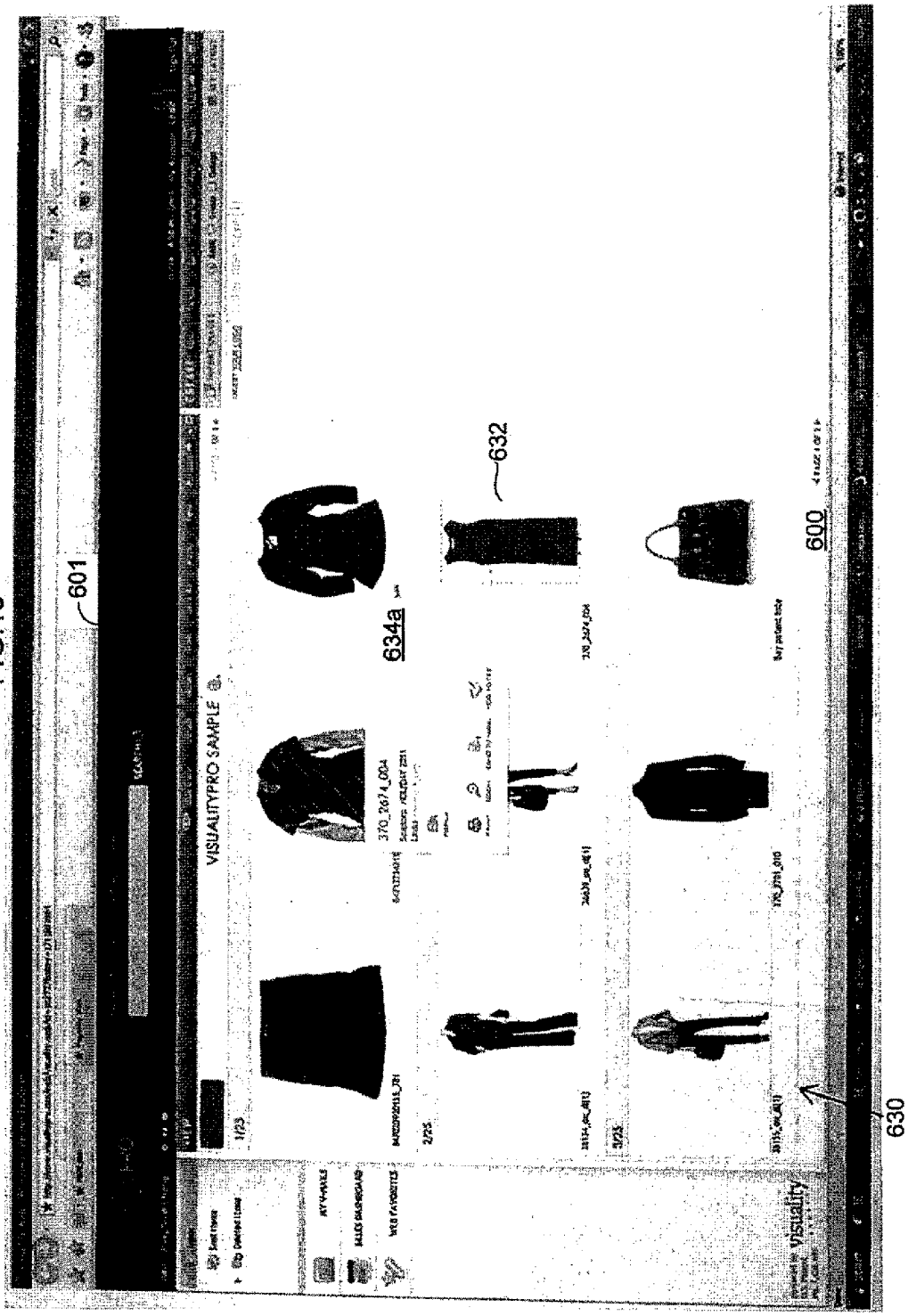
FIG. 18 is a screen shot of the exemplary visual arrangement of FIG. 17, showing a selection of an image published to the user via the vmail according to one embodiment of the invention.

FIG. 18 is a screen shot of the exemplary visual arrangement of FIG. 17, showing a selection of one of the images 632 published to the user via the vmail 620. Displayed adjacent to the image is a product information box 634a which provides metadata information about the product depicted in the image. The product information box 634a appears next to the image as soon as the user manipulates the user input device to hover over the image. According to one embodiment, the VC tool module 20c retrieves the metadata information from the published picture metadata record stored in the published picture metadata table 510.

According to one embodiment of the invention, the user drags and drops the image 632 into the second display area 602 in order to automatically create a new visual arrangement. In response to the image being dropped into the second display area 602, the VC tool module 20c creates the new visual arrangement including the dropped image. The second display area 602 thus functions as a template for generating new visual arrangements.

Figure 19:
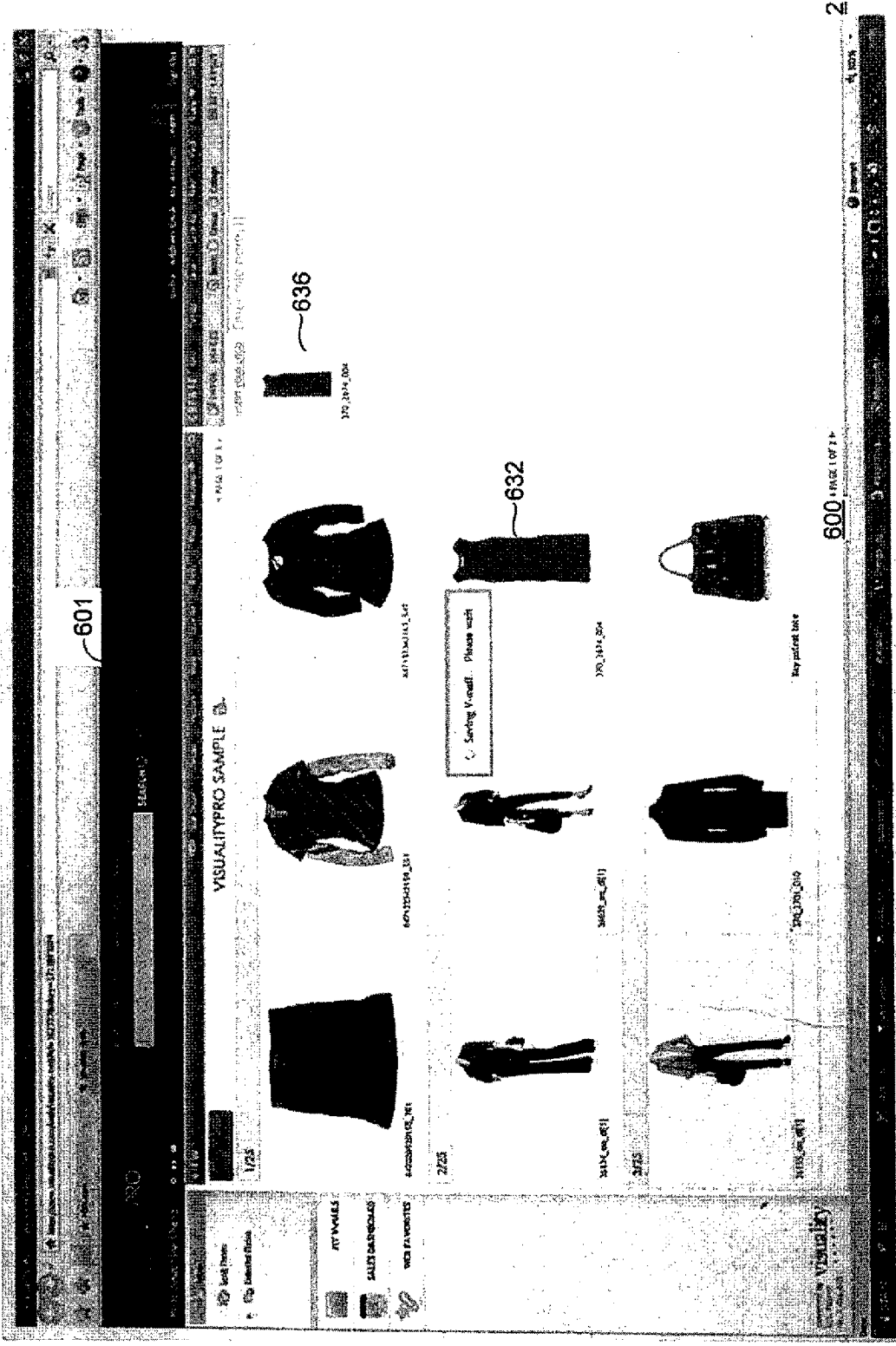
FIG. 19 is a screen shot of a VC tool showing a copy of the image selected in FIG. 18, in a second display area of the VC tool according to one embodiment of the invention.

FIG. 19 is a screen shot of the VC tool showing a dropped image 636 in the second display area 602. The dropped image is displayed concurrently with the image 632 in the first display area 600 that was published to the user via the particular vmail 620.

Figure 20:
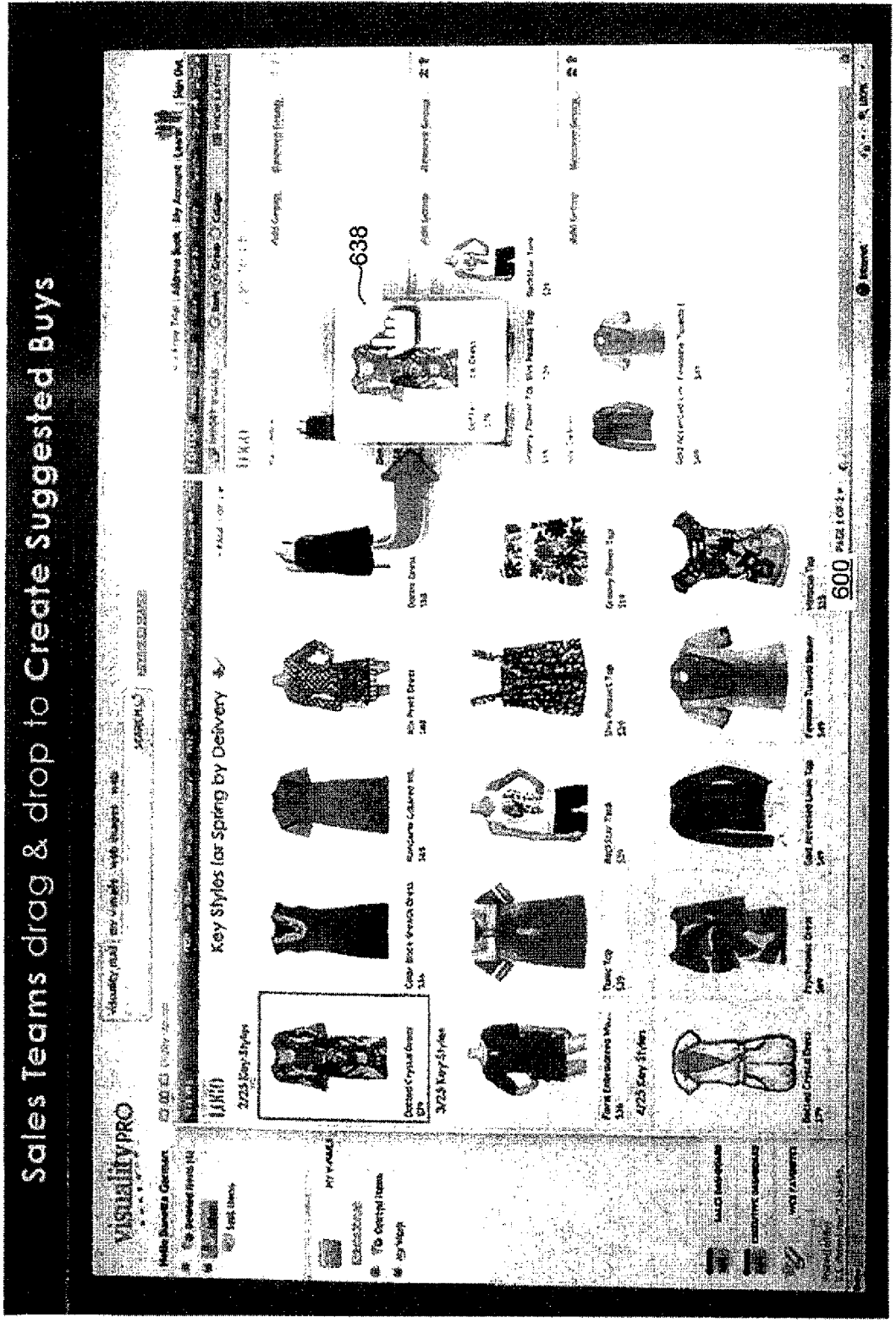
FIG. 20 is a screen shot of a VC tool depicting a dragging and dropping of an image from a first display area to a second display area of the VC tool according to one embodiment of the invention.

FIG. 20 is another screen shot of the VC tool depicting the dragging and dropping of an image 638 from the first display area to the second display area 602. A person of skill in the art should recognize that other selection mechanisms conventional in the art may also be employed, and the invention is not limited to dragging and dropping. For example, instead of dragging and dropping, a user may click on an image and select a "send to new" option to automatically transfer a copy of the image to the second display area 602.

Figure 21:
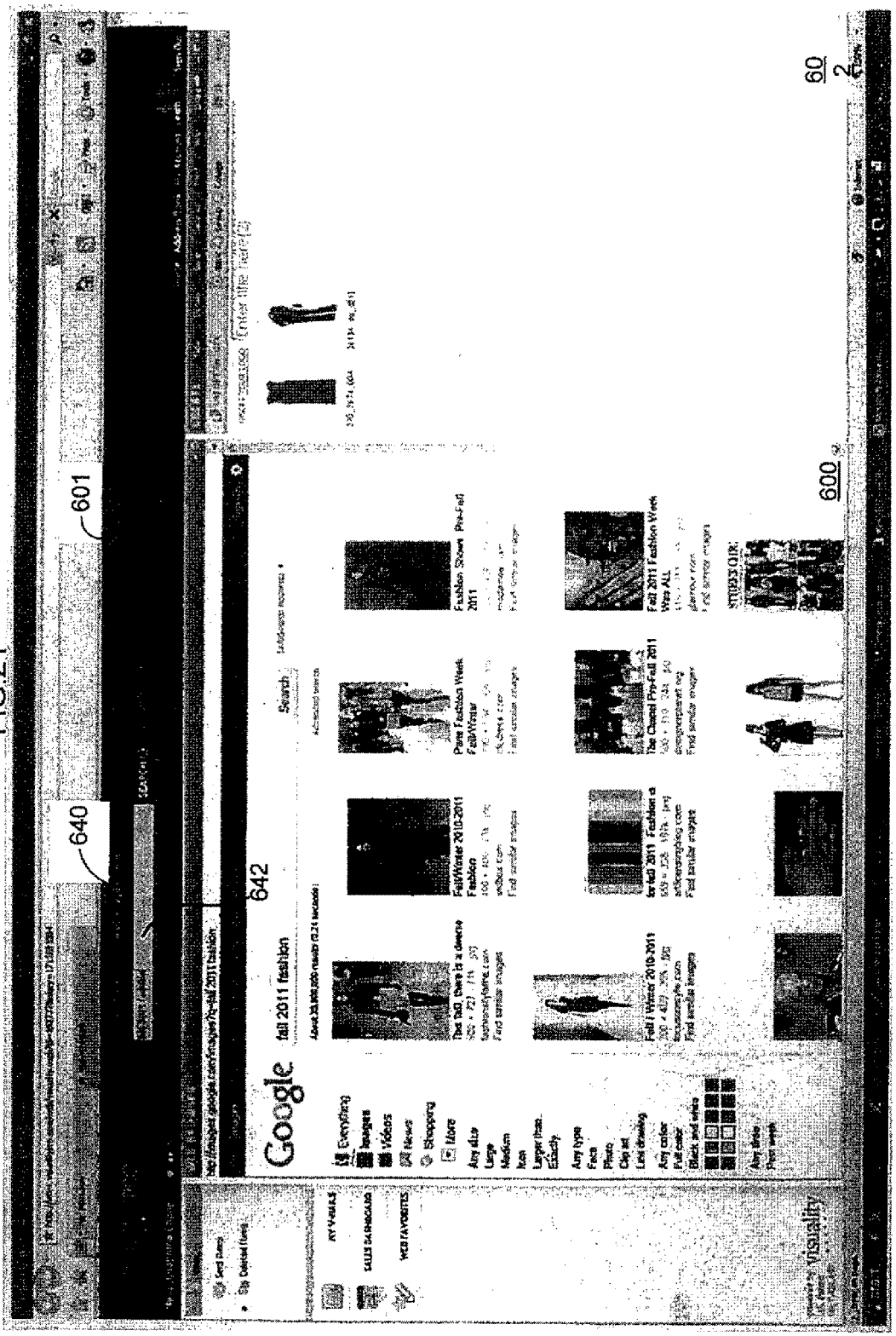
FIG. 21 is a screen shot of a VC tool including a web images tab for searching for web images according to one embodiment of the invention.

According to one embodiment of the invention, in addition to generating visual arrangements from other visual arrangements published to a user, the user may also generate visual arrangements from images obtained from the Internet. As depicted in FIG. 21, the VC tool 601 includes a web images tab 640 which may be accessed to enter a search term in a search area 642. In response to receipt of the search term, the VC tool module 20c invokes a search engine to search for images based on the entered search term. The results of the search are displayed by the VC tool module 20c in the first display area 600 of the VC tool 601. Specific images may be selected from the first display area and dragged to the second display area 602. In response to dropping an image in the second display area, the VC tool module 20c generates a new visual arrangement including the image, or adds the image to a current visual arrangement already on the works. Thus, the user of VC tool can search for images on the Internet and add those images to a visual arrangement without leaving the VC tool.

According to one embodiment of the invention, a user may also add notes for a particular product depicted in a shared image displayed in the first display area 600, without leaving the VC tool. The notes are maintained in association with the image.

Figure 22:
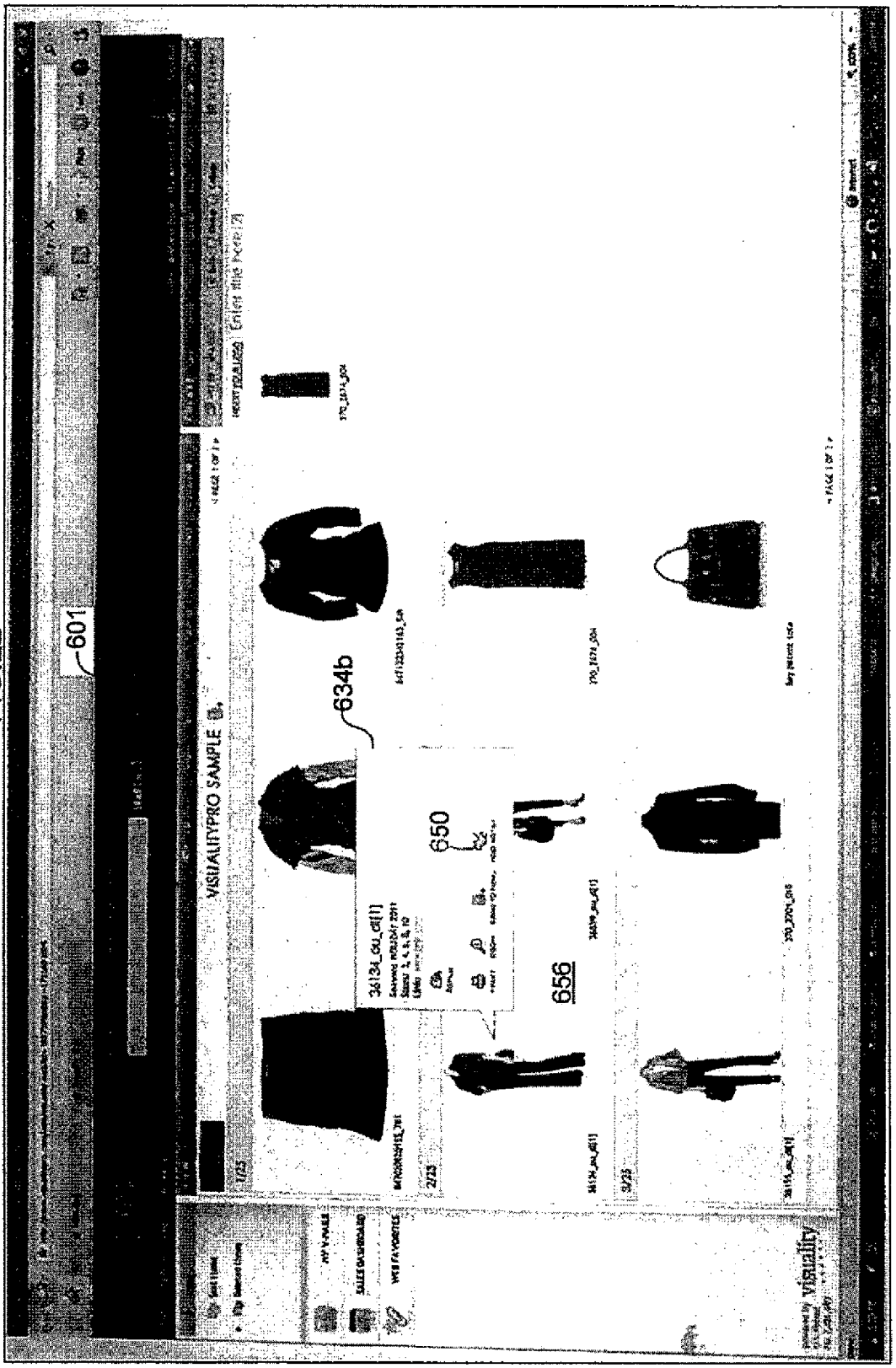
FIG. 22 is a screen shot of a VC tool showing a notes option with respect to a displayed image according to one embodiment of the invention.

FIG. 22 is a screen shot of the VC tool showing a notes option 650 with respect to a particular image 656. According to one embodiment, the notes option 650 is provided in the product information box 634b which appears when the user manipulates the user input to hover over the particular image 656. The product information box 634b may also appear upon clicking the particular image 656.

Figure 23:
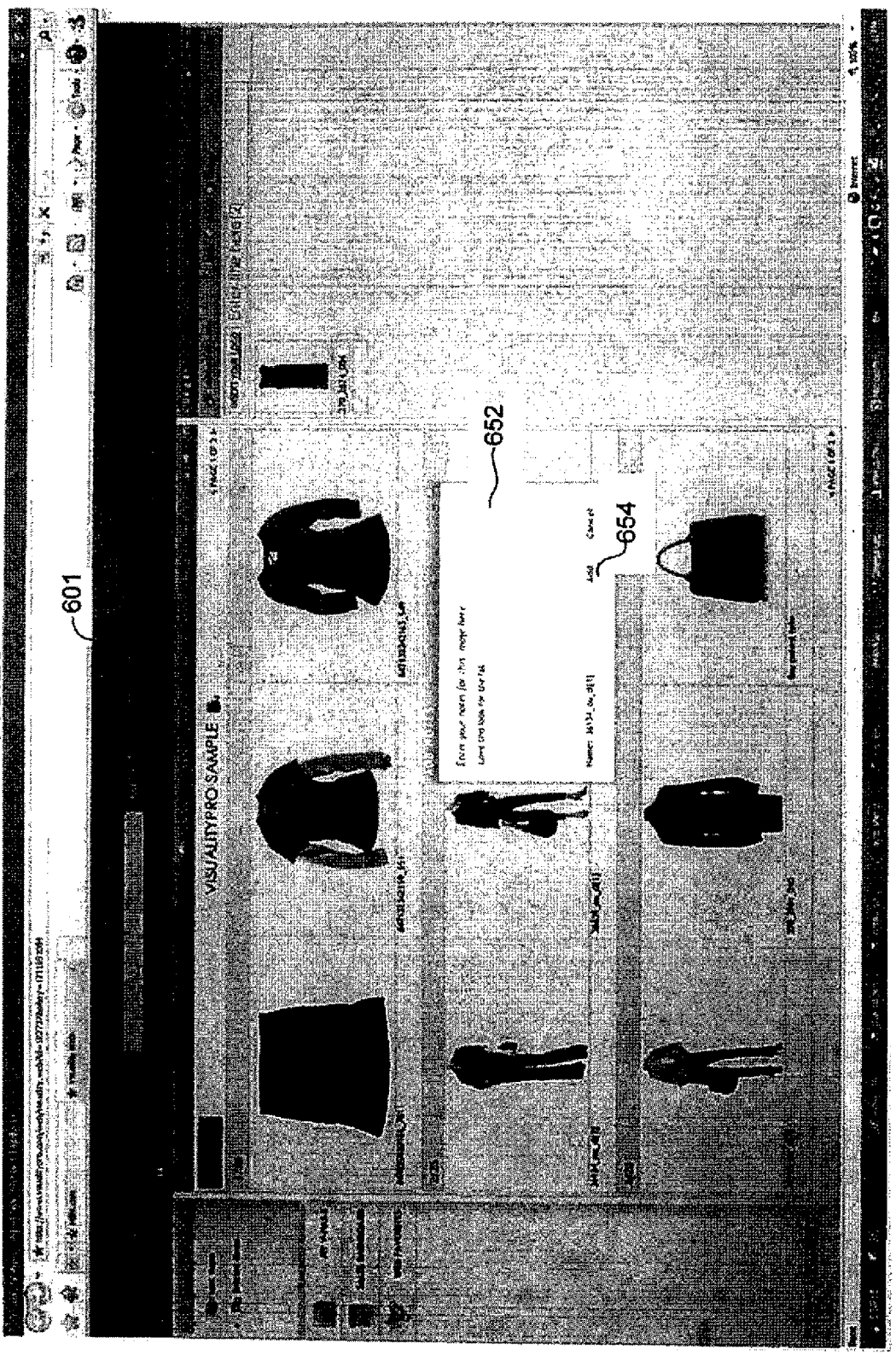
FIG. 23 is a screen shot of a VC tool displaying a notepad upon selection of a notes option according to one embodiment of the invention.

Selection of the notes option 650 causes display of a notepad 652 in a separate pop-up window as depicted in the screen shot of FIG. 23. A user may enter any desired text into the notepad 652 and select an add option 654 when he or she is finished. In response to receipt of the add option 654, the VC tool module 20c generates a copy of the image 656 and adds the copy to a new visual arrangement or a visual arrangement already in the works in the second display area 602. Thus, the user need not open a separate application if he or she wants to create and store his thoughts or observations with respect to a product depicted in a image. Also, the entered notes remain associated with the image 656 so that a user can easily identify the product to which the notes pertain.

Figure 24:
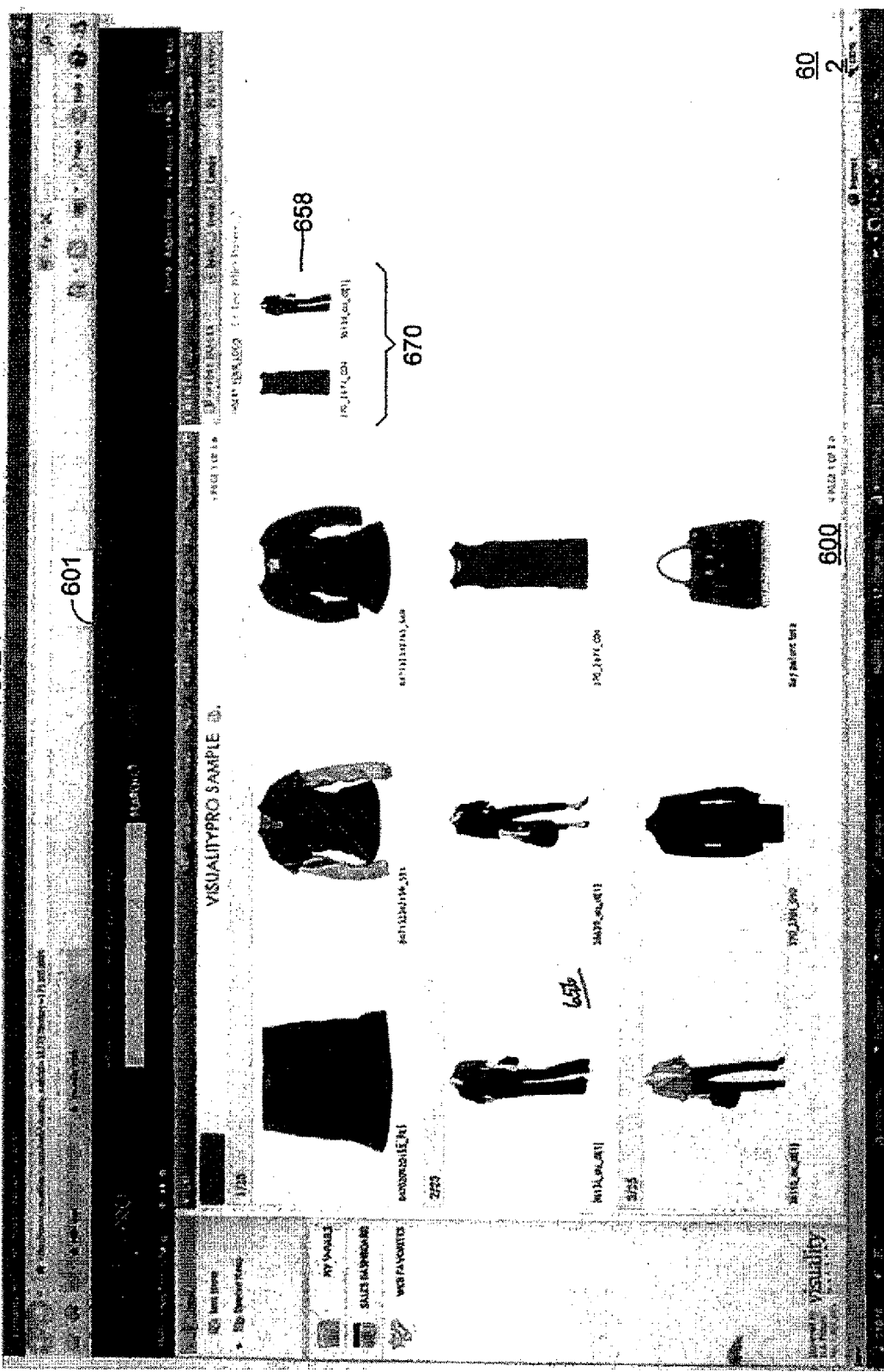
FIG. 24 is a screen shot of a VC tool showing a copied image in a second display area of the VC tool according to one embodiment of the invention.

FIG. 24 is a screen shot of the VC tool 601 showing a copied image 658 in the second display area 602. In the example depicted in FIG. 24, the copied image 658 is added to a visual arrangement 670 in the works in the second display area 602, in response to selection of the add option 654 in the notepad 652. According to one embodiment of the invention, the added notes are stored in a metadata record for the copied image 658. In this regard, the published picture metadata record stored in the published picture metadata table 510 for the image 656 is copied first, and the notes are then added to the copied metadata record. If the image was shared with any prior notes, such notes are copied when the metadata record is copied, and, the new notes added by the recipient are tacked onto the prior notes and saved.

Figure 25:
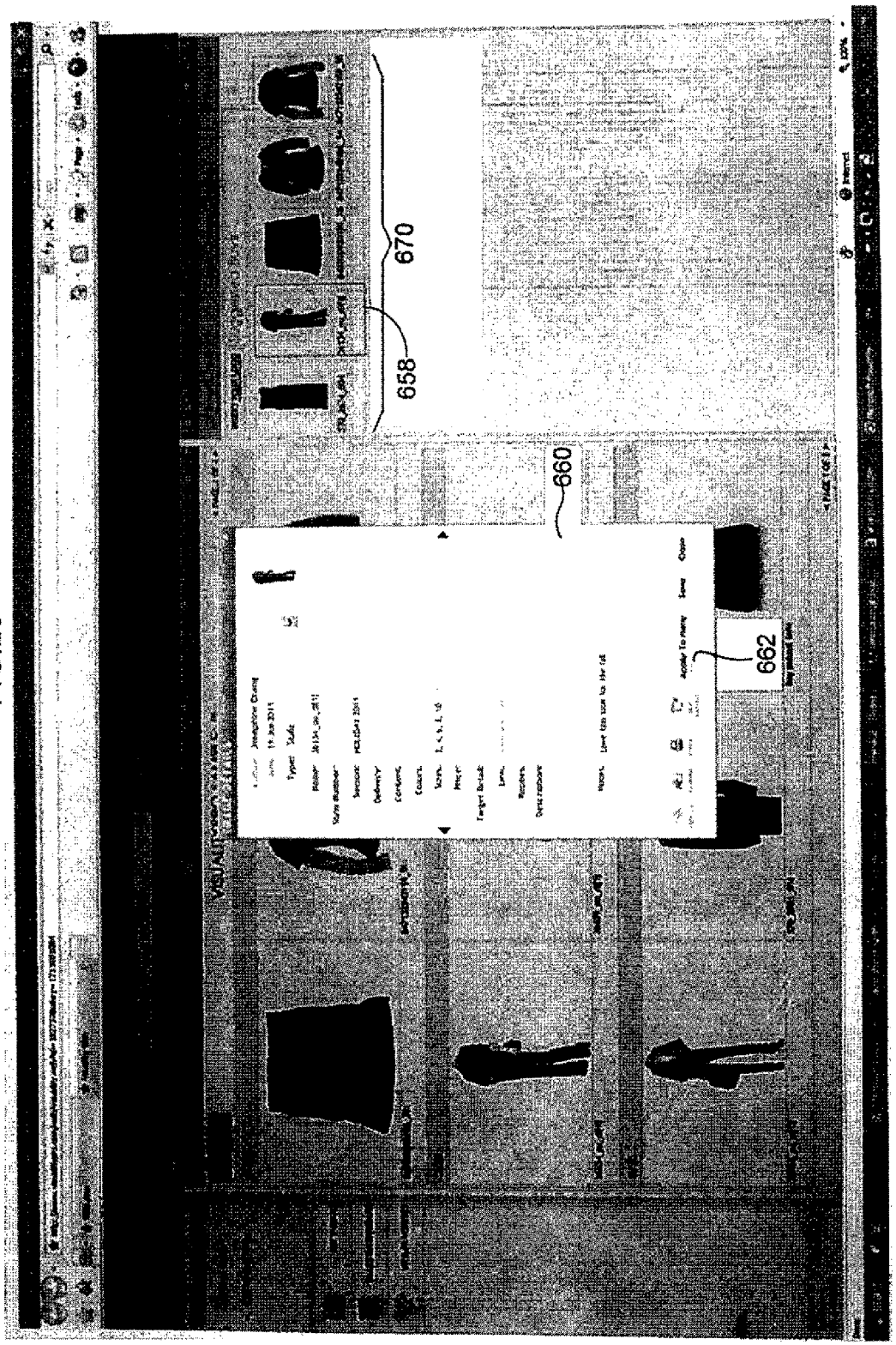
FIG. 25 is a screen shot depicting display of metadata information stored for the copied image of FIG. 24 according to one embodiment of the invention.

FIG. 25 is a screen shot depicting display of metadata information 660 stored for the copied image 658. According to one embodiment, the display of the metadata information is invoked upon selection of the image. The metadata information provides various details about the image, including, for example, the date in which the image was created, the author creating the image, and product information depicted in the image. With respect to the author and creation date, the information identifies the person creating the copy of the image, and date in which the copy was made, and not the author and creation date of the original image 656. In addition, the metadata information includes any prior notes that may have been made with respect to the image and shared with the recipient, as well as any new notes added by the recipient.

According to, one embodiment, the author of the image may make modifications, addition, and/or deletions to the metadata information 660. The author may also apply the same modifications to the other images in the current visual arrangement 670, eliminating the need to manually re-enter the same modifications to each of the other images. In this regard, the author selects an apply to many icon 662 to automatically apply the modifications to multiple images.

Figure 26:
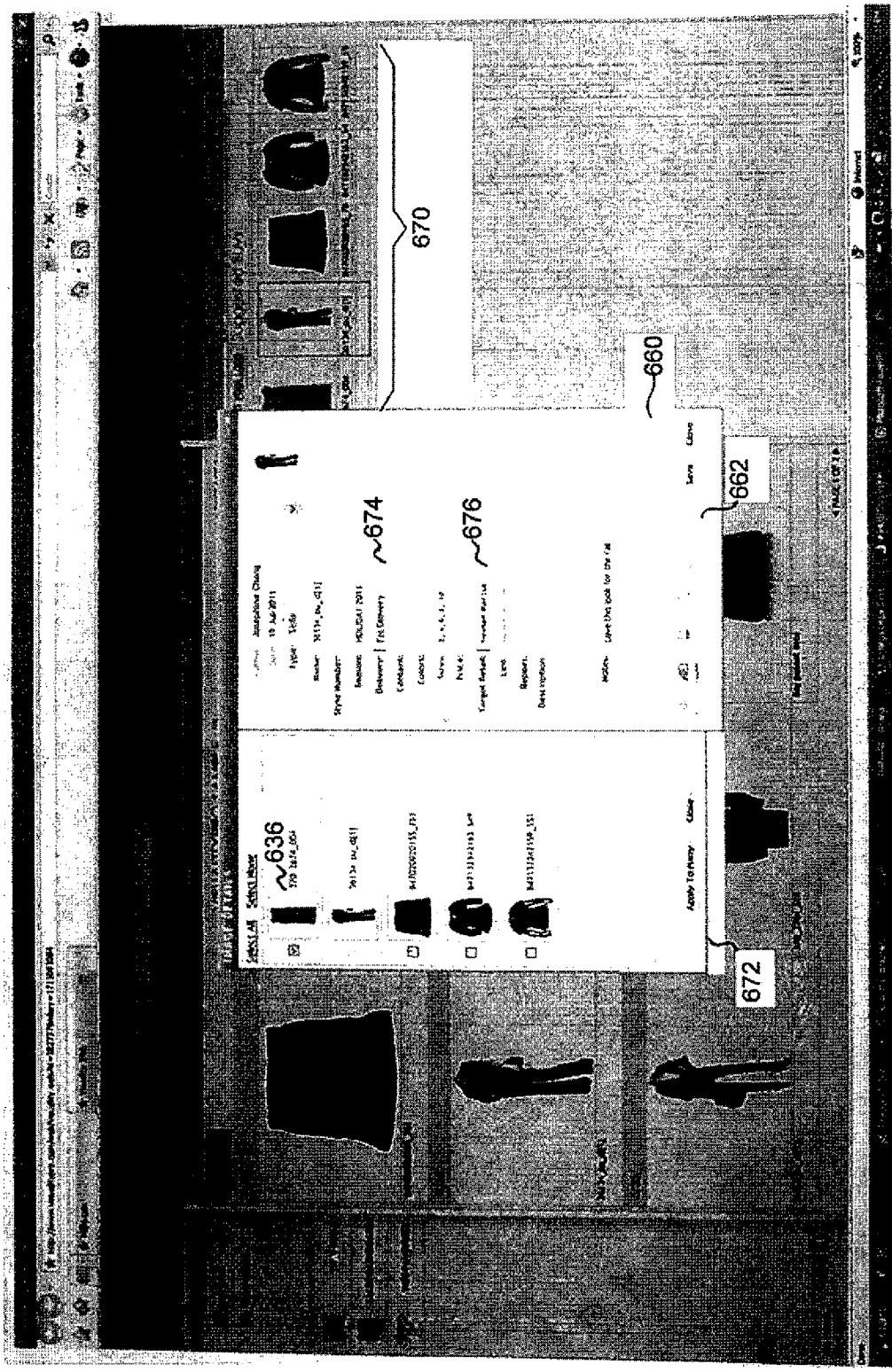
FIG. 26 is a screen shot of the metadata information of FIG. 25 including changes entered by an author according to one embodiment of the invention.

FIG. 26 is a screen shot of the metadata information 660 including two changes 674, 676 entered by the author. In the illustrated example, the changes relate to a delivery field and a target retail field. According to one embodiment, the changes are highlighted for easy identification. Selection of the apply to many icon 662 causes display of a window 672 including thumbnails of images in the current visual arrangement 670 to which the modifications to the metadata may automatically be applied. The user may select one or more images, such as, for example, image 636, and the VC tool module 20c saves the changes entered for the image 658, in the metadata record associated with the selected image 636.

Figure 27:
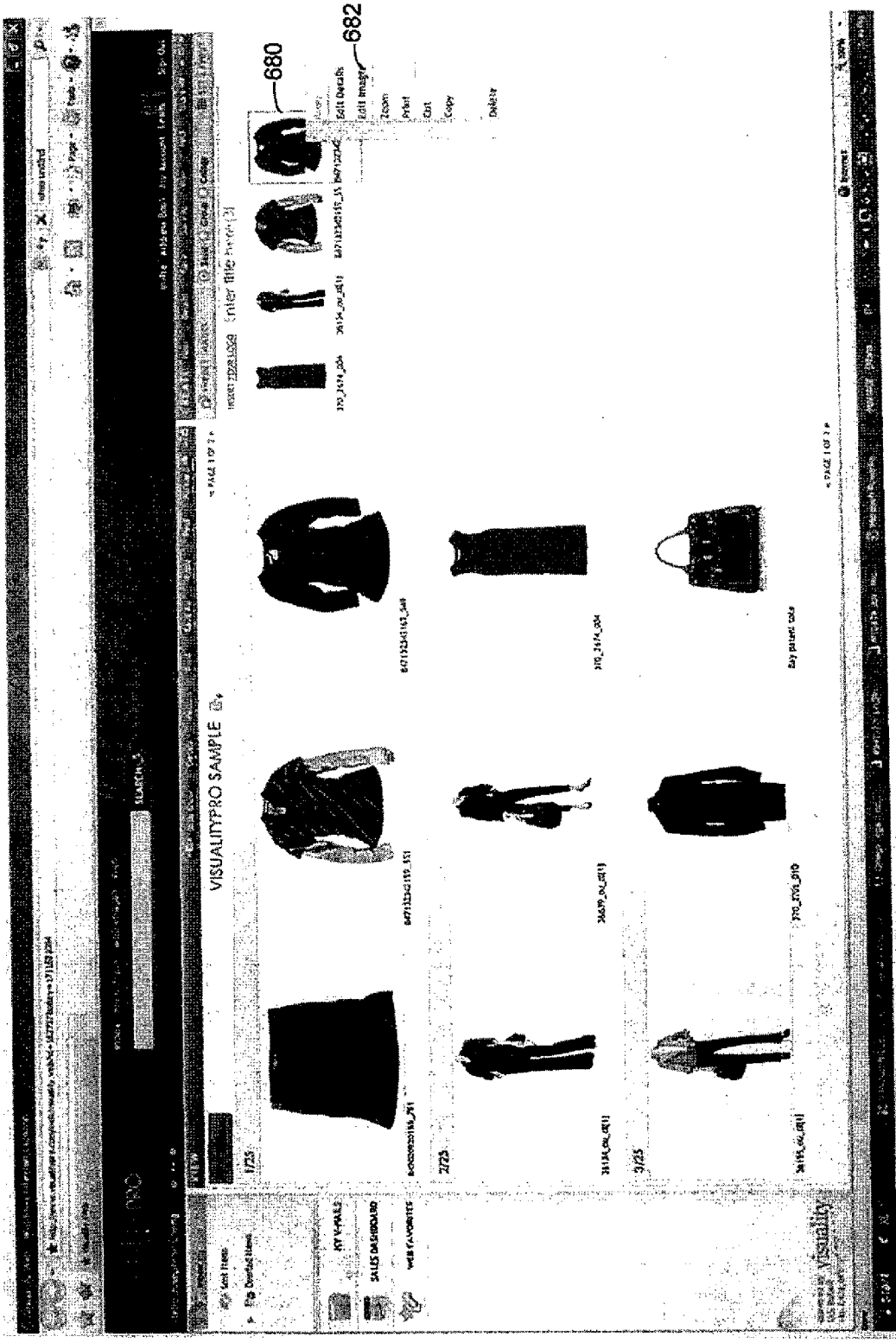
FIG. 27 is a screen shot of an edit image option according to one embodiment of the invention.
Figure 28:
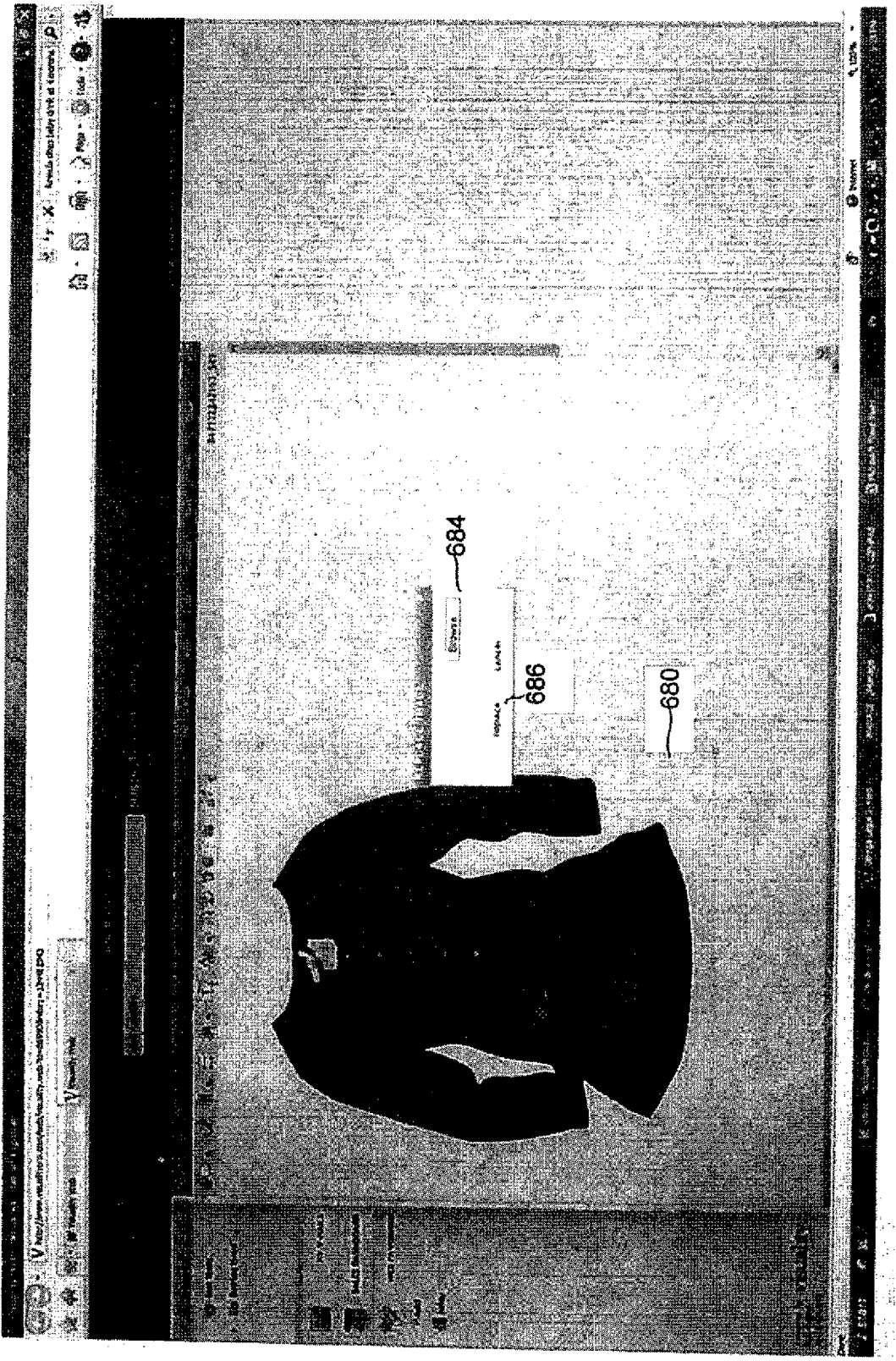
FIG. 28 is a screen shot of a VC tool displaying a replace image pop-up window in response to selection of the edit image option of FIG. 27, according to one embodiment of the invention.

According to one embodiment of the invention, the author may also swap an image in the current visual arrangement 670 with another image. In this regard, the author selects a desired image 680 and actuates an edit image option 682, as depicted in the screen shot of FIG. 27. In response to the actuation, the VC tool module 20c displays a replace image pop-up window 684 as depicted in FIG. 28, which the author may use to browse existing images and select an image that he or she would like to use to replace the current image 680. Identification of such an image and selection of a replace option 686 causes the current image 680 to be swapped with the selected image. The selected image is uploaded to the image repository and assigned a unique image ID. A saved picture record is generated for the uploaded image, and the record is stored in the saved picture table 502. The VC tool module 20c uses the image ID of the uploaded image to generate an association between the saved picture record and the picture metadata record of the image 680 that was swapped out. Thus, the swapping feature replaces an image without deleting the metadata information. This may be useful, for example, when an image of a not-yet-finalized product is temporarily used for generating the visual arrangement, and the temporary image is then replaced with a final image of the finalized product.

Figure 29:
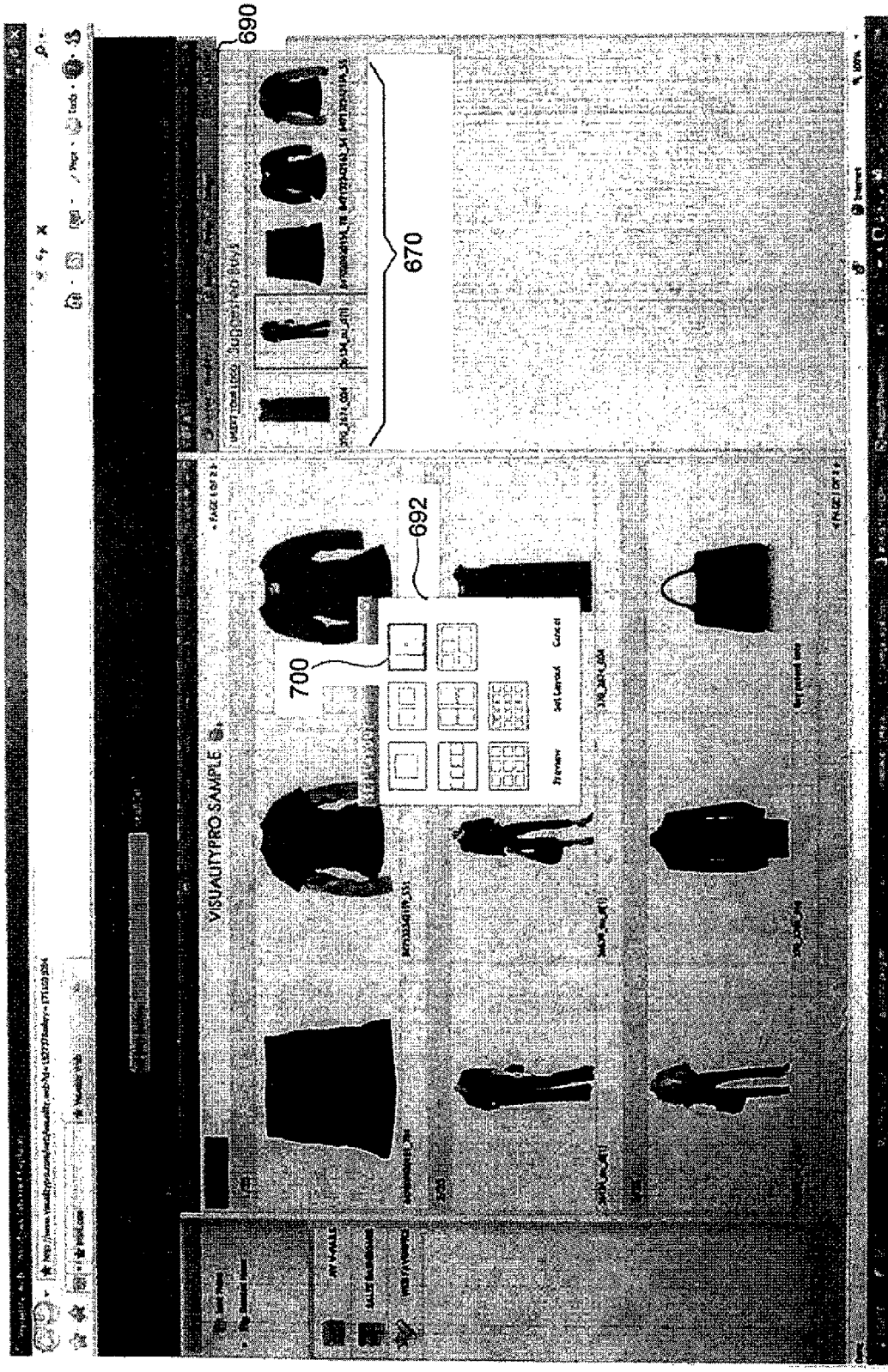
FIG. 29 is a screen shot of a VC tool displaying a set layout option according to one embodiment of the invention.

According to one embodiment of the invention, the author of the current visual arrangement 670 may identify a layout that he or she wants to use to present the images in the visual arrangement to a selected recipient. In this regard, the VC tool 601 provides a set layout option 690 as depicted in the screen shot of FIG. 29. Selection of the set layout option 690 causes the VC tool module 20c to display a layout pop-up window 692 that includes various preset layouts that the author may select. Selection of a specific layout 700 causes the VC tool module 20c to save the selected layout in association with the saved lookbook record for the current visual arrangement 670.

Figure 30:
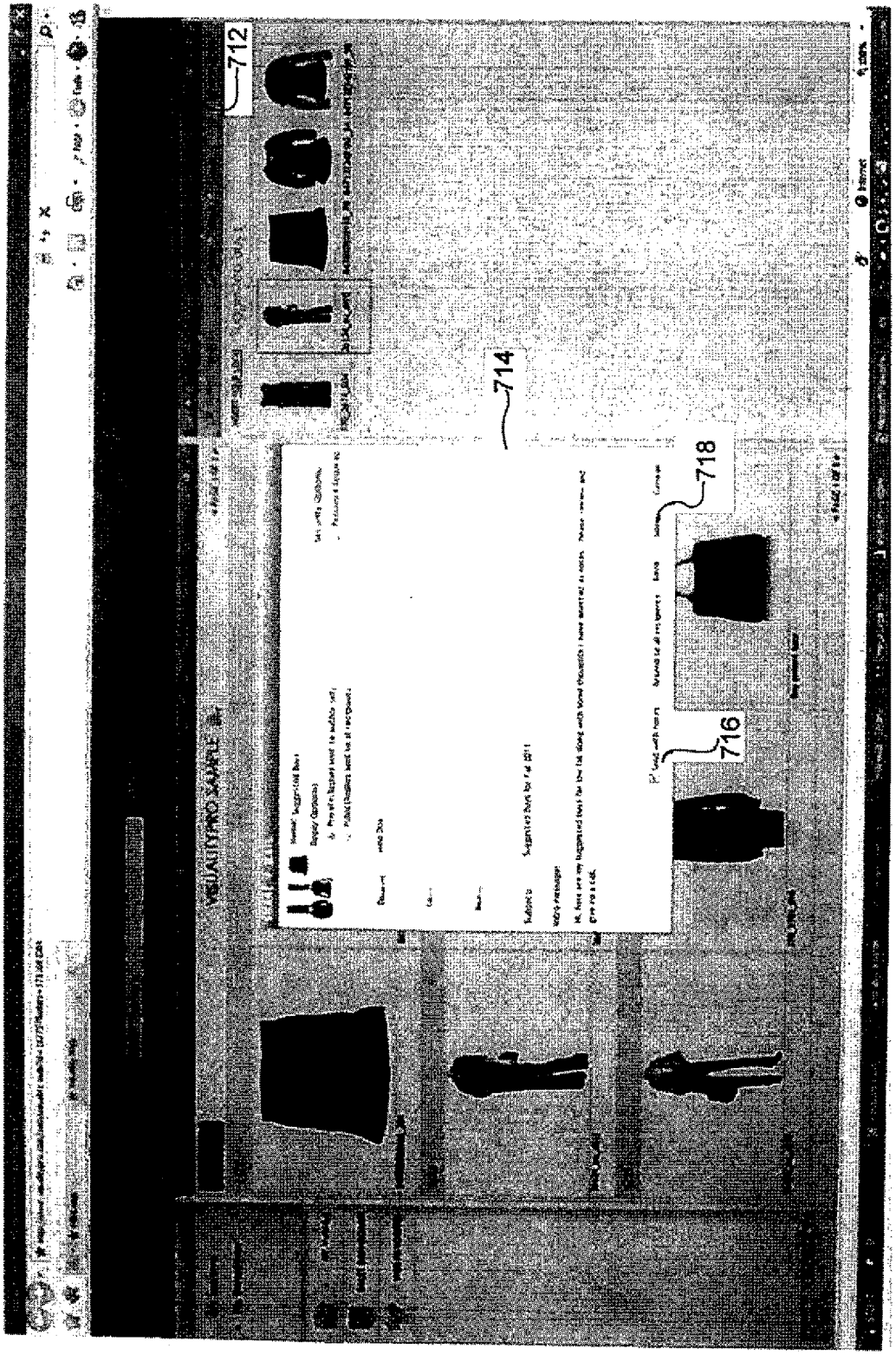
FIG. 30 is a screen shot of a VC tool displaying a pop-up window for sharing a visual arrangement in a vmail according to one embodiment of the invention.

When the author is done adding images to the current visual arrangement 670, he or she may share it with one or more recipients via vmail by selecting a share option 712 as depicted in the screen shot of FIG. 30. Selection of the share option 712 causes the VC tool module 20c to display a share pop-up window 714 prompting the author to identify the recipients of the vmail. In doing so, the author may indicate whether any comments made by the recipients will be viewed by the author only, or sent to all recipients. The author may also indicate, by selecting option 716, that the vmail is to be sent with any notes that may have been added to one or more images of the visual arrangement.

Actuation of a send button 718 causes the VC tool module 20c to generate a record in the published lookbook table for the particular visual arrangement that is shared. The VC tool module 20c also generates a vmail record in the vmail table 514 for each recipient of the lookbook. The VC tool module 20c further generates an email with a link to the visual arrangement and transmits the email to each recipient. According to one embodiment of the invention, the link identifies the published visual arrangement. The Published visual arrangement is rendered in a browser according to conventional mechanisms when this link is accessed using the browser.

Figure 31:
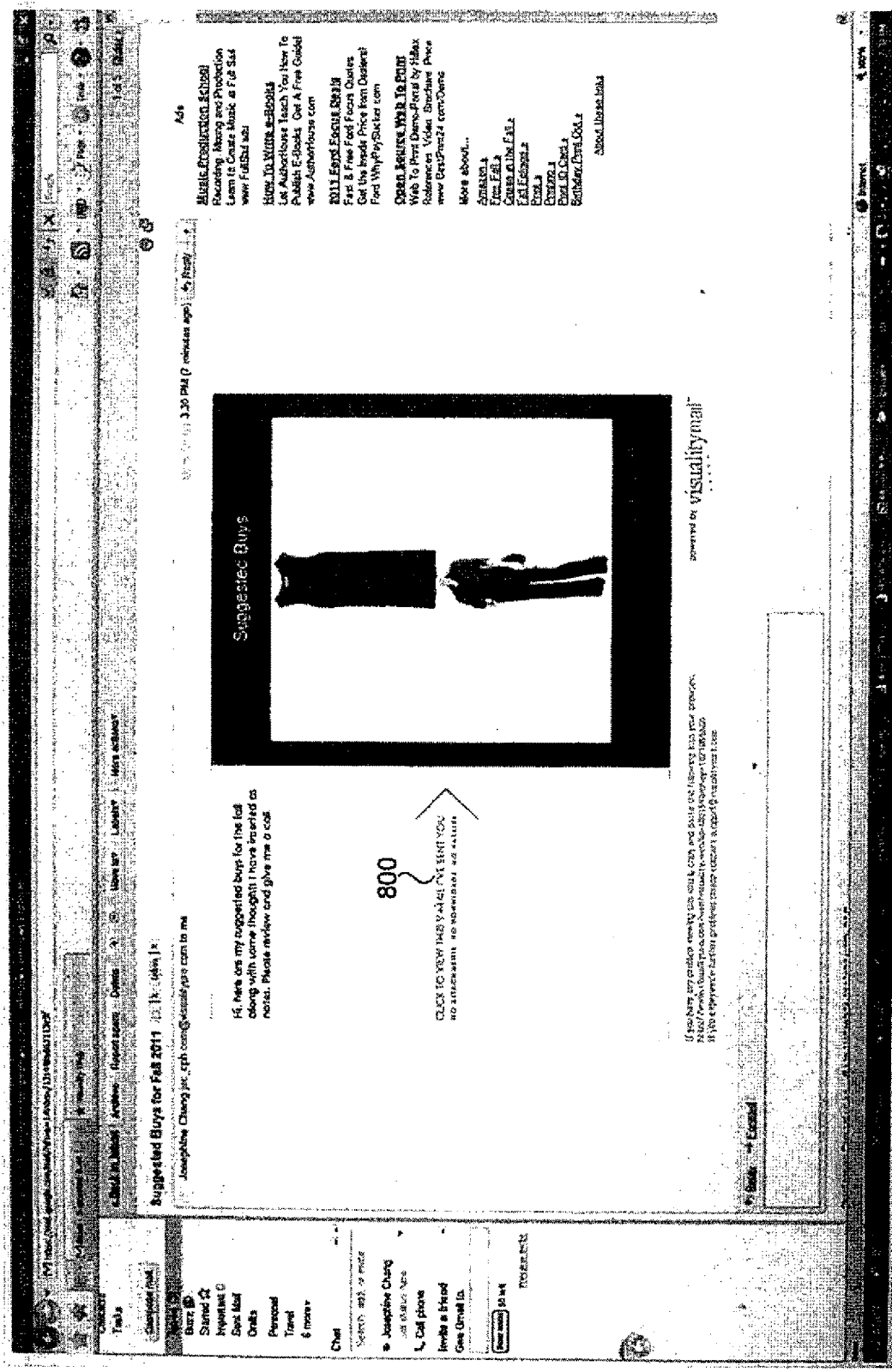
FIG. 31 is a screen shot of a vmail received by a recipient according to one embodiment of the invention.

FIG. 31 is a screen shot of a vmail received by a recipient according to one embodiment of the invention. The vmail is received by the recipient's email application, and includes a link 800 for accessing the shared visual arrangement. Selection of the link 800 by the recipient invokes the user's web browser 19 and causes the web browser to access the VC tool provided by the VC tool module 20c to display the shared visual arrangement in the first display area 600 of the VC tool. The images of the shared visual arrangement are displayed according to the display layout selected by the sender.

Figure 32:
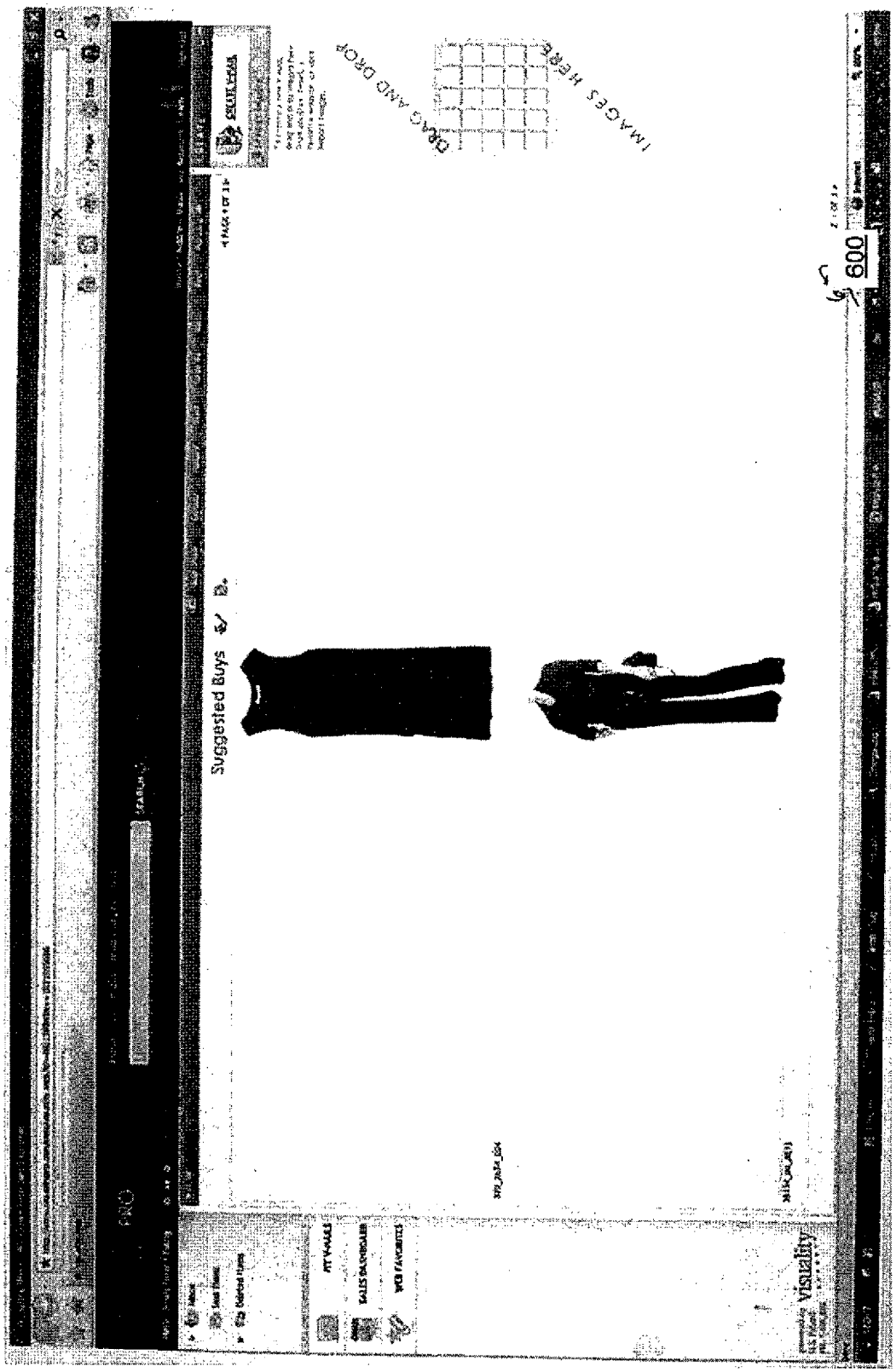
FIG. 32 is a screen shot of the visual arrangement that is displayed upon selection of a link in the vmail depicted in FIG. 31 according to one embodiment of the invention.

FIG. 32 is a screen shot of the visual arrangement that is displayed upon selection of the link 800 in the vmail depicted in FIG. 31. According to one embodiment of the invention, the VC tool module 20c controls the access to the information contained in the lookbook based on the vmail record generated for the particular recipient. For example, the recipient may not be allowed to view notes or comments associated with the lookbook.

Figure 33:
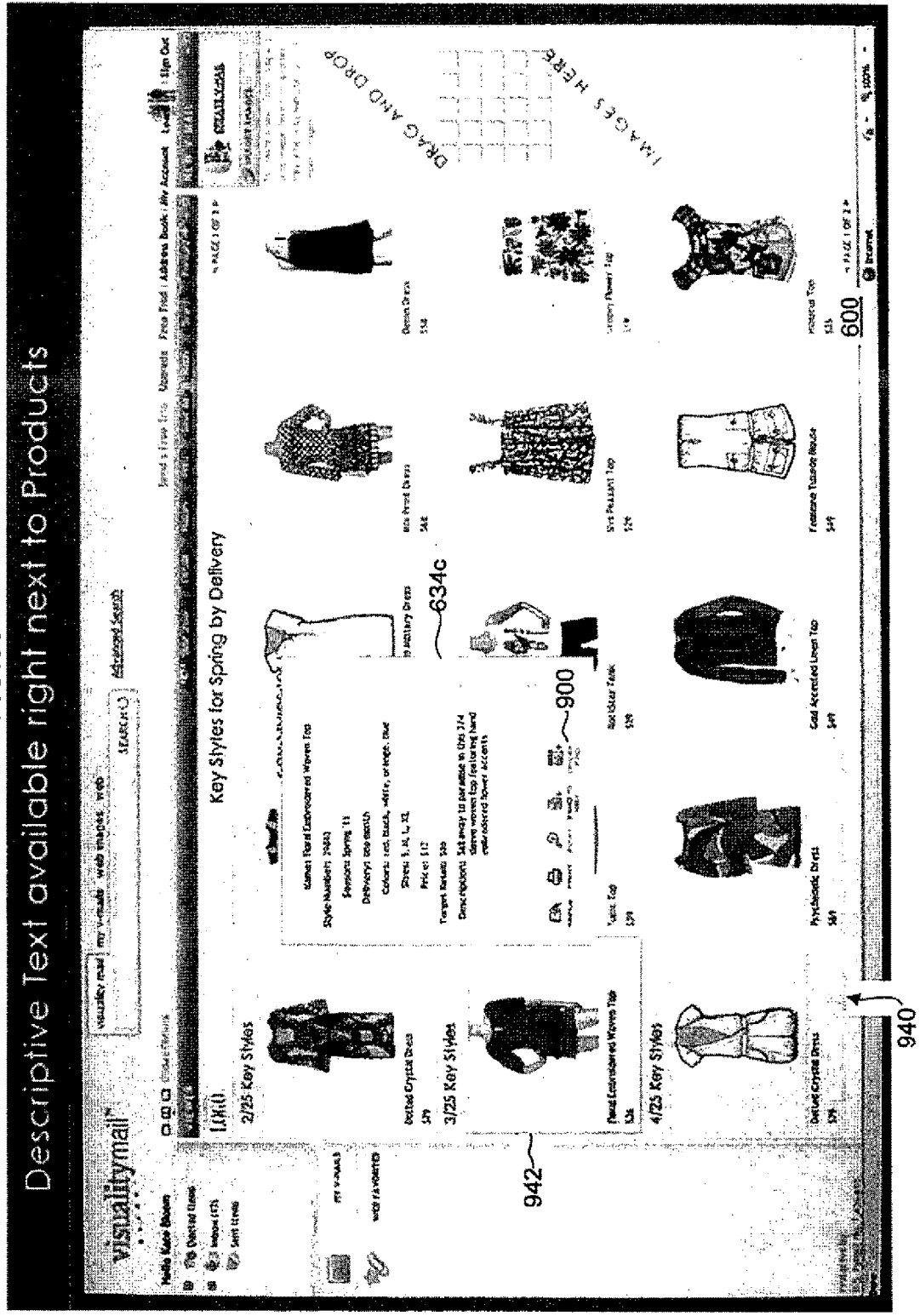
FIG. 33 is a screen shot of an exemplary visual arrangement shared with a recipient via a vmail and which displays an order option according to one embodiment of the invention.

According to one embodiment of the invention, a recipient of the vmail may place an order for one or more products depicted in a shared visual arrangement. FIG. 33 is a screen shot of an exemplary visual arrangement 940 shared with the recipient via a vmail. The images of the products contained in the visual arrangement 940 are displayed in the first display area 600 of the VC tool. Information of each product, such as, for example, product 924, is displayed in a product information box 634c next to the product as the user input device hovers over the image of the product. According to one embodiment of the invention, the product information box 634c includes an order pad option 900 which the user may actuate to place an order for the particular product 924 to which the product information box pertains.

Figure 34:
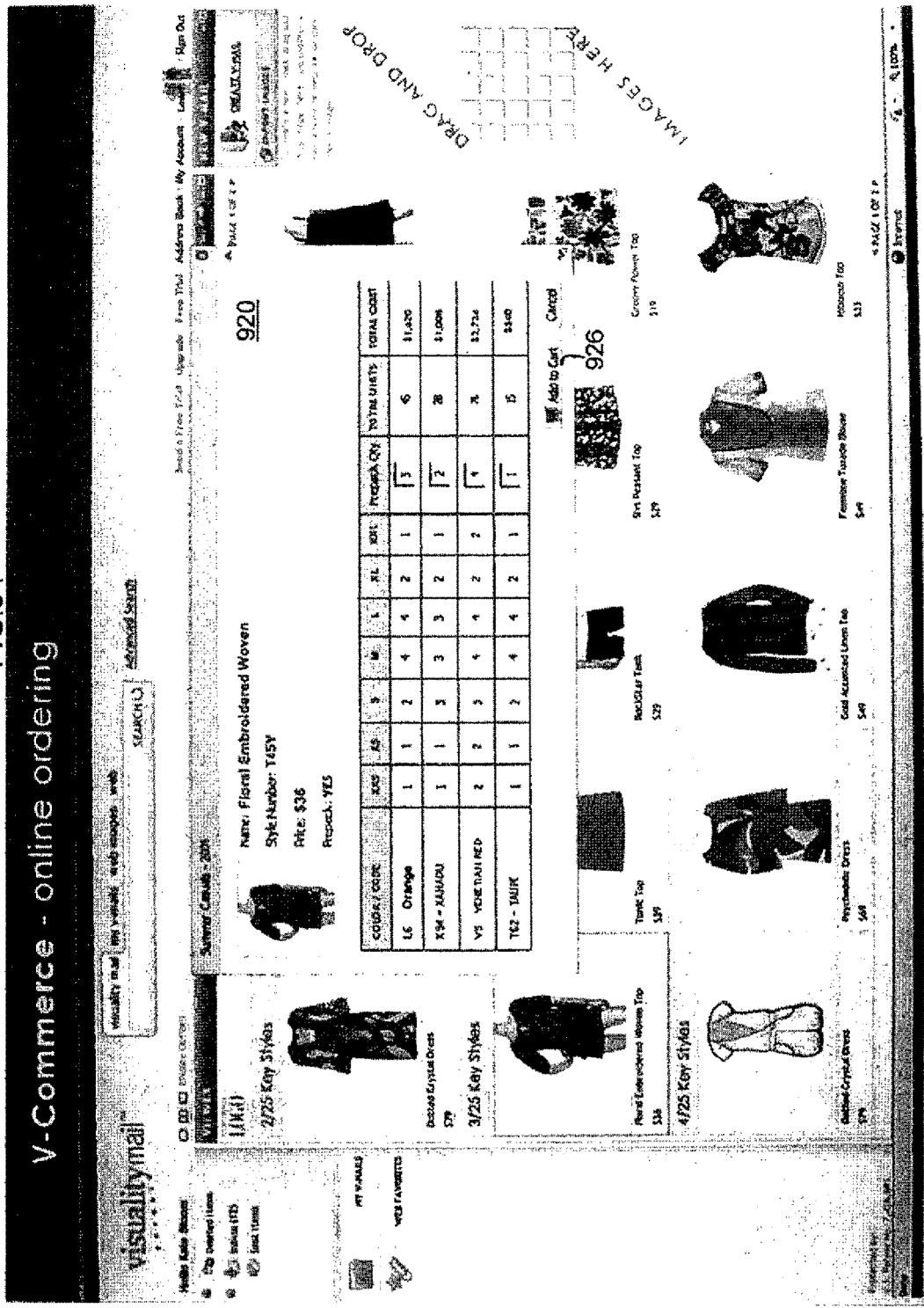
FIG. 34 is a screen shot of a VC tool displaying an order pop-up window in response to selection of the order option of FIG. 33, according to one embodiment of the invention.

Upon receipt of the selection of the order pad option 900, the VC tool module 20c invokes an order pop-up window 920, as depicted in the screen shot of FIG. 34. The order pop-up window includes a picture of the selected product 924 along with product information such as, for example, style number, price, colors, sizes, and the like, in a grid-like form. The user places an order right from the pop-up window by selecting a quantity of the various sizes and/or colors that are desired, and selects an add to cart option 926 for causing the VC tool module 20c to add the selected product in his or her shopping cart.

Figure 35:
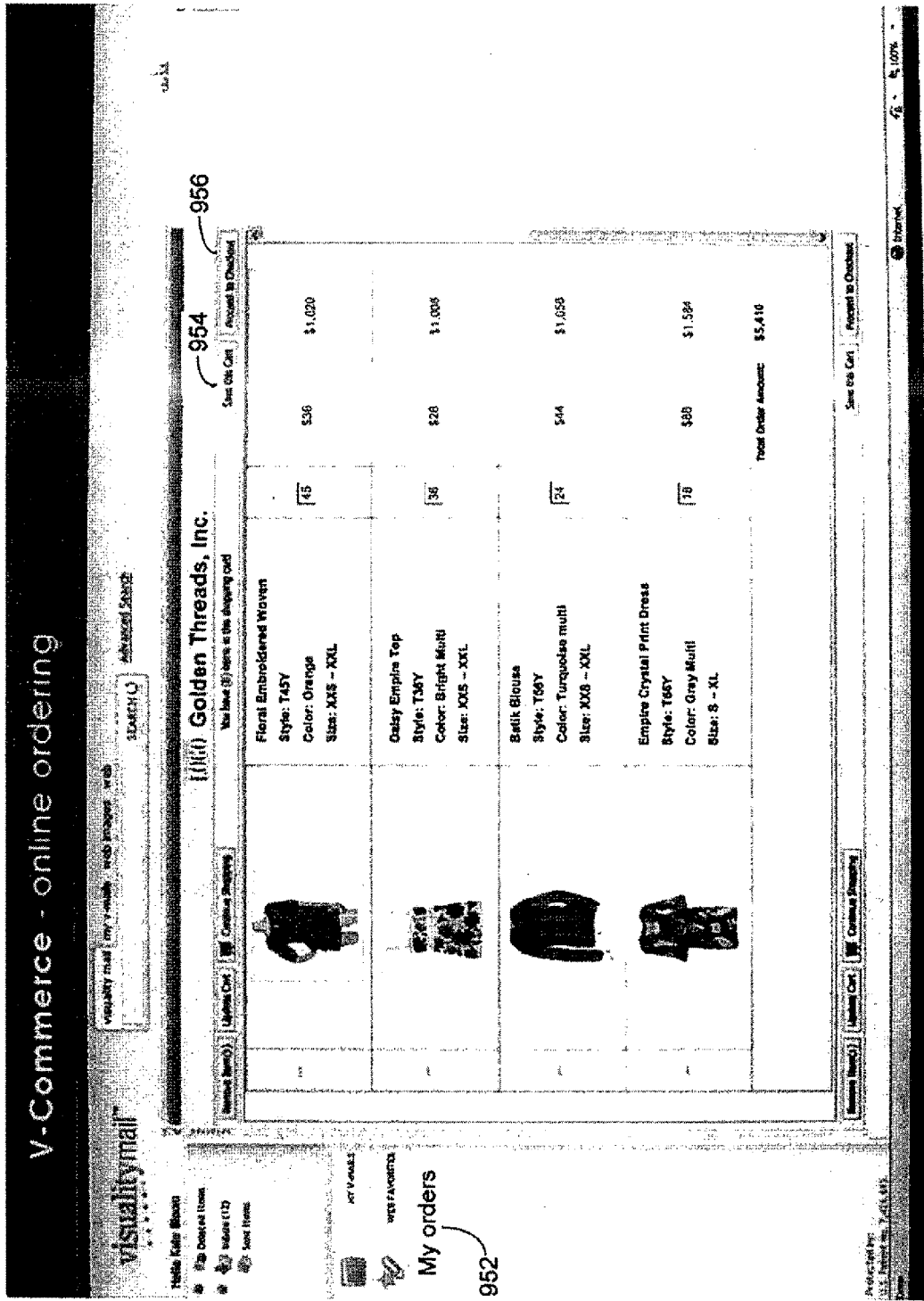
FIG. 35 is a screen shot of a user's shopping cart with images and information of all products that have been selected for purchase, according to one embodiment of the invention.

FIG. 35 is a screen shot of the user's shopping cart with images and information of all products that have been selected for purchase. The user may choose to save the items in the cart by selecting a save option 954. Selection of the save option stores the shopping cart in an order folder 952. When the user is ready to purchase the items, he or she selects a proceed to checkout option 956, which causes the VC tool module 20c to process the purchase order according to conventional online order processing mechanisms.

Figure 36:
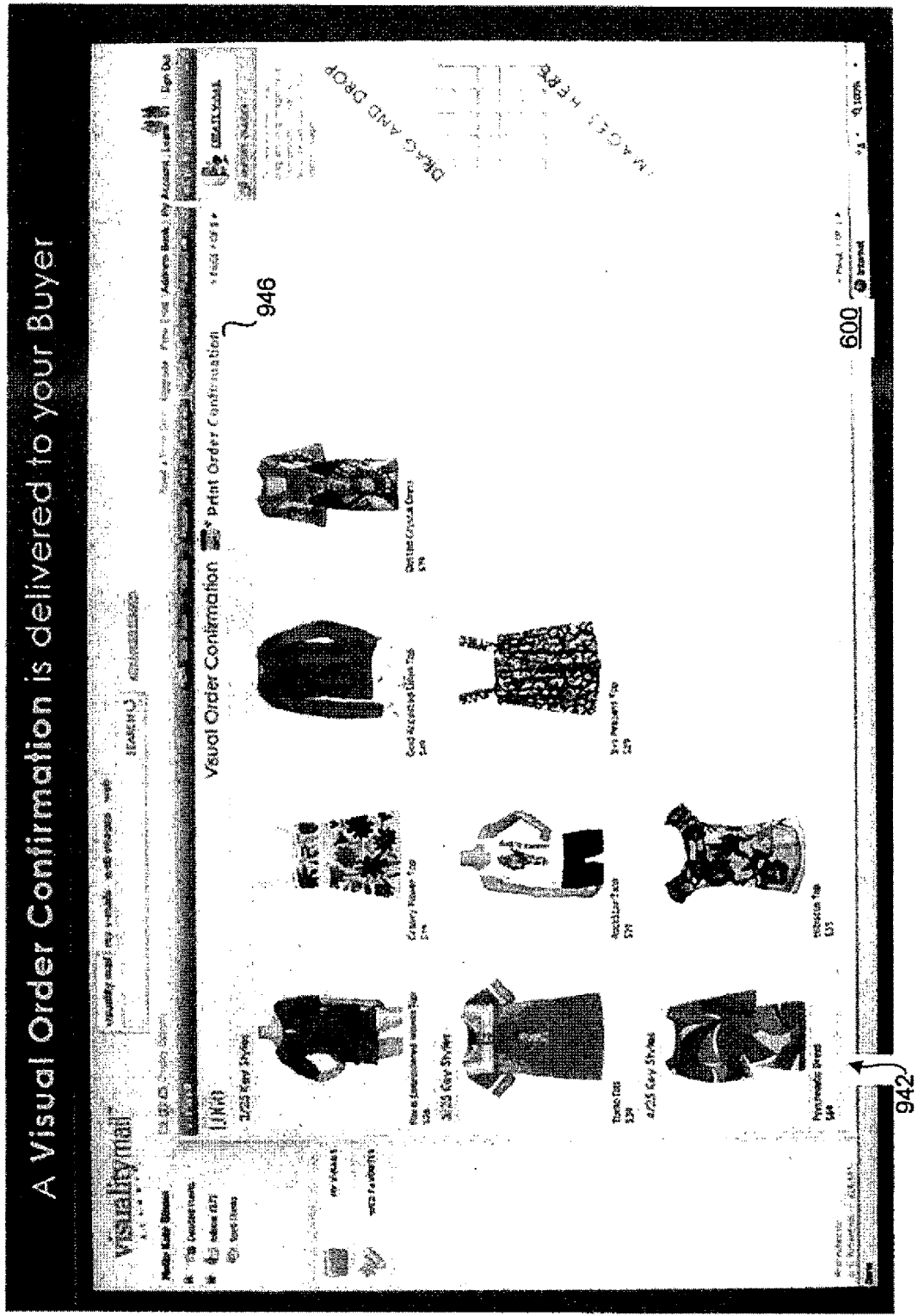
FIG. 36 is a screen shot of a VC tool providing a visual order confirmation of purchased items according to one embodiment of the invention.

According to one embodiment, the VC tool module 20c provides a visual order confirmation for the purchased items, as is depicted in the screen shot of FIG. 36. In this regard, the VC tool module 20c creates a new visual arrangement 942 containing images of the purchased products and displays the visual arrangement in the first display area 600 of the VC tool. According to one embodiment, the visual order confirmation may be shared with the buyer in a vmail. According to one embodiment, the visual arrangement 942 is displayed according to the format employed for the visual arrangement 940 (FIG. 33) from which the order was placed. That is, the visual arrangement 942 groups the products according to the grouping employed in the visual arrangement 940. In this manner, the integrity of the group/structure of the original presentation is maintained for the ordered items so that the buyer and seller may visually confirm that the right products have been selected from the right groups.

Figure 37:
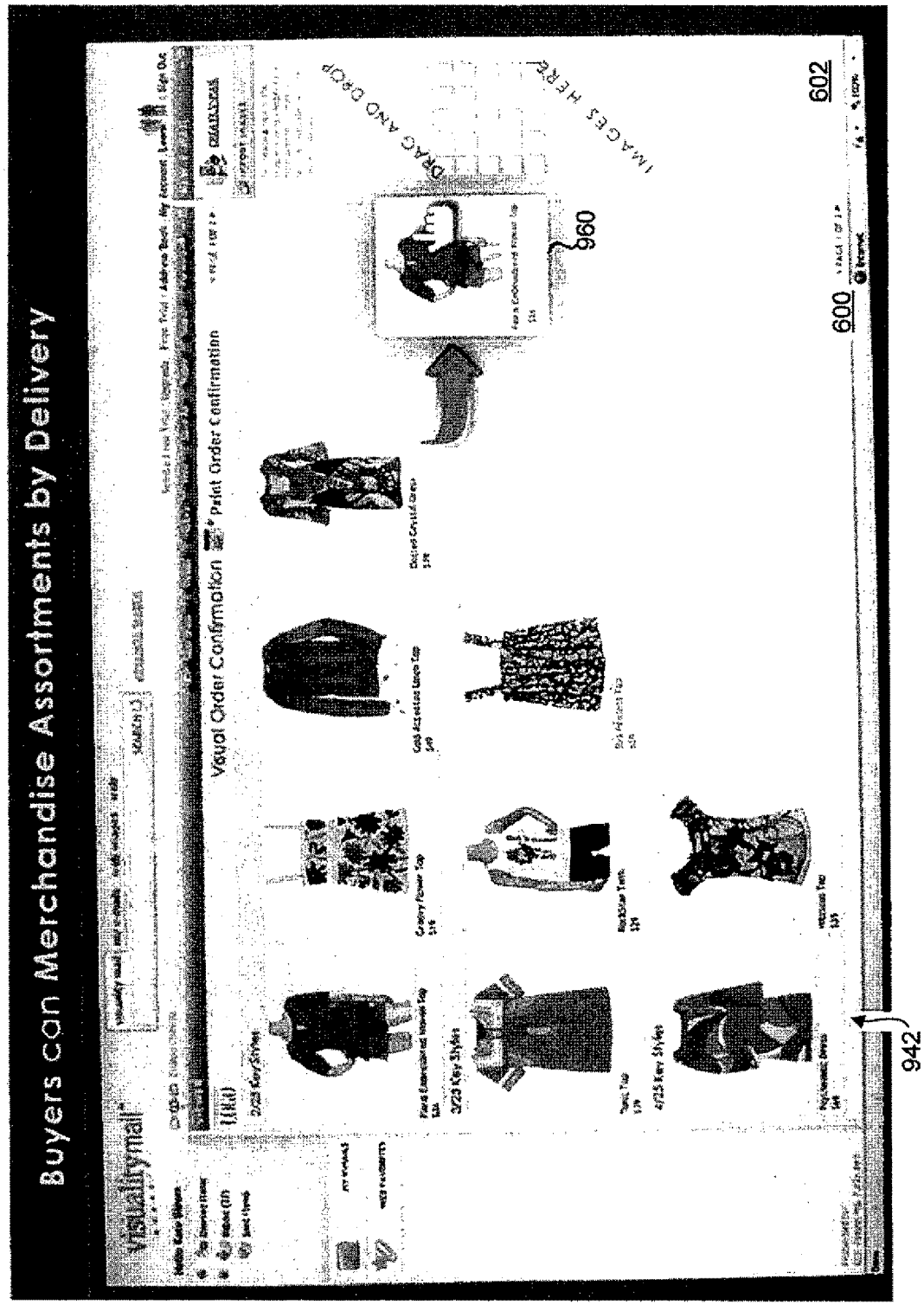
FIG. 37 is a screen shot depicting a user dragging and dropping an image displayed in the visual order confirmation of FIG. 36, into a second display area of a VC tool according to one embodiment of the invention.

The generating of a visual arrangement 942 of the purchased items also allows the buyer to manipulate the images in the visual arrangement to generate other new visual arrangements. For example, the user may drag and drop particular images 960 from the first display area 600 to the second display area 602 to generate a new visual arrangement, as is depicted in FIG. 37. The user may then reorganize the images in the new visual arrangement to change, for example, the grouping of the images.

Figure 38:
FIG. 38 is a screen shot of an order confirmation pop-up window with details on products that have been ordered along with images for the ordered products according to one embodiment of the invention.

Referring again to FIG. 36, the buyer may also print an order confirmation upon selecting a print order confirmation option 946. FIG. 38 is a screen shot of an order confirmation pop-up window 950 with details on the products that have been ordered along with images for the ordered products.

Figure 39:
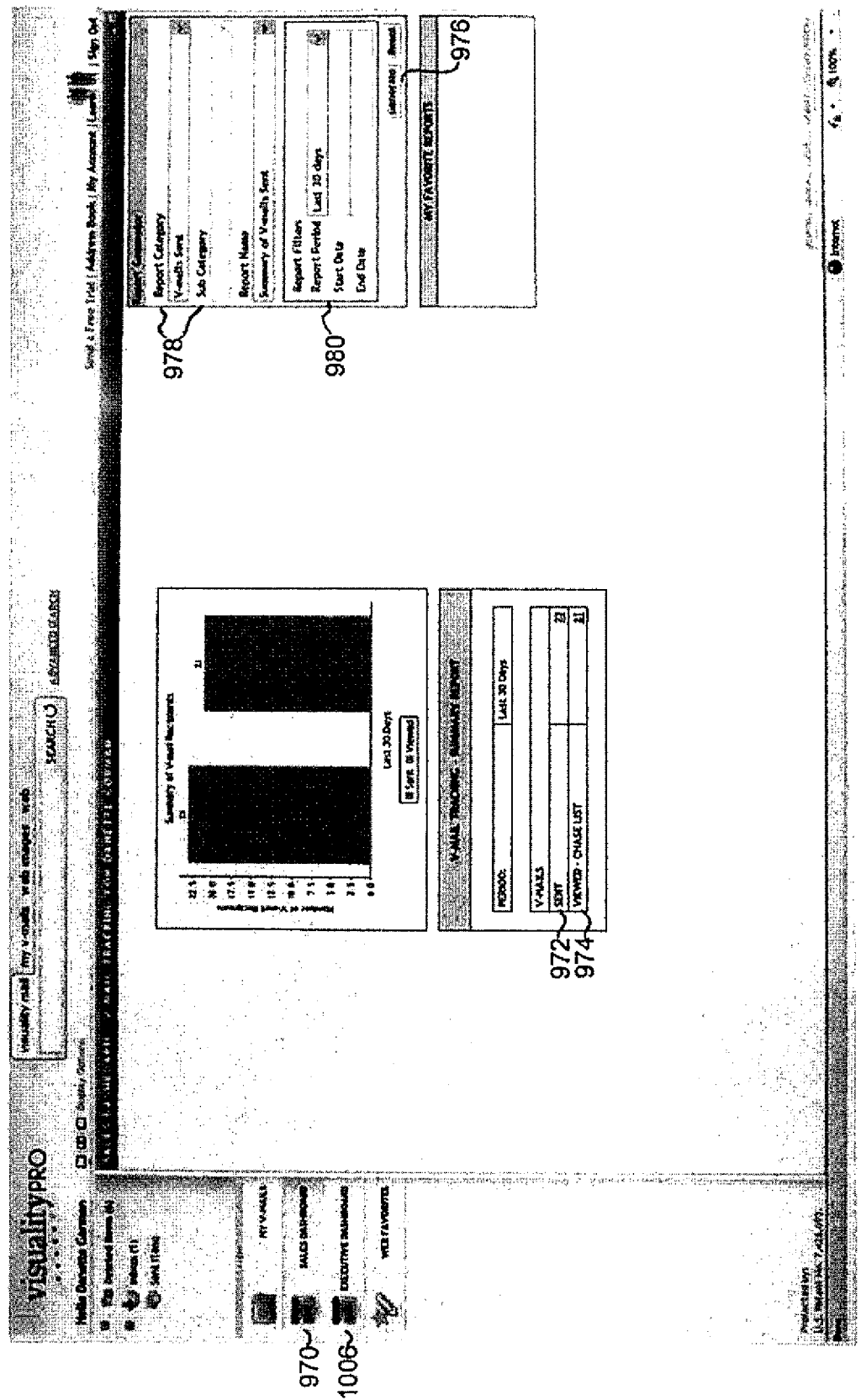
FIG. 39 is a screenshot of a VC tool allowing a user to view activities surrounding vmails according to one embodiment of the invention.

According to one embodiment of the invention, the VC tool module 20c tracks activities surrounding vmails and generates reports of such activities in response to a user command. FIG. 39 is a screenshot of the VC tool allowing a user to view such activities. In this regard, the VC tool includes a sales dashboard option 970 which, when actuated by a user, causes the VC tool module 20c to display a window prompting input of one or more categories 978 of activities for which a report may be generated, as well as time frame 978 of those activities.

Figure 40:
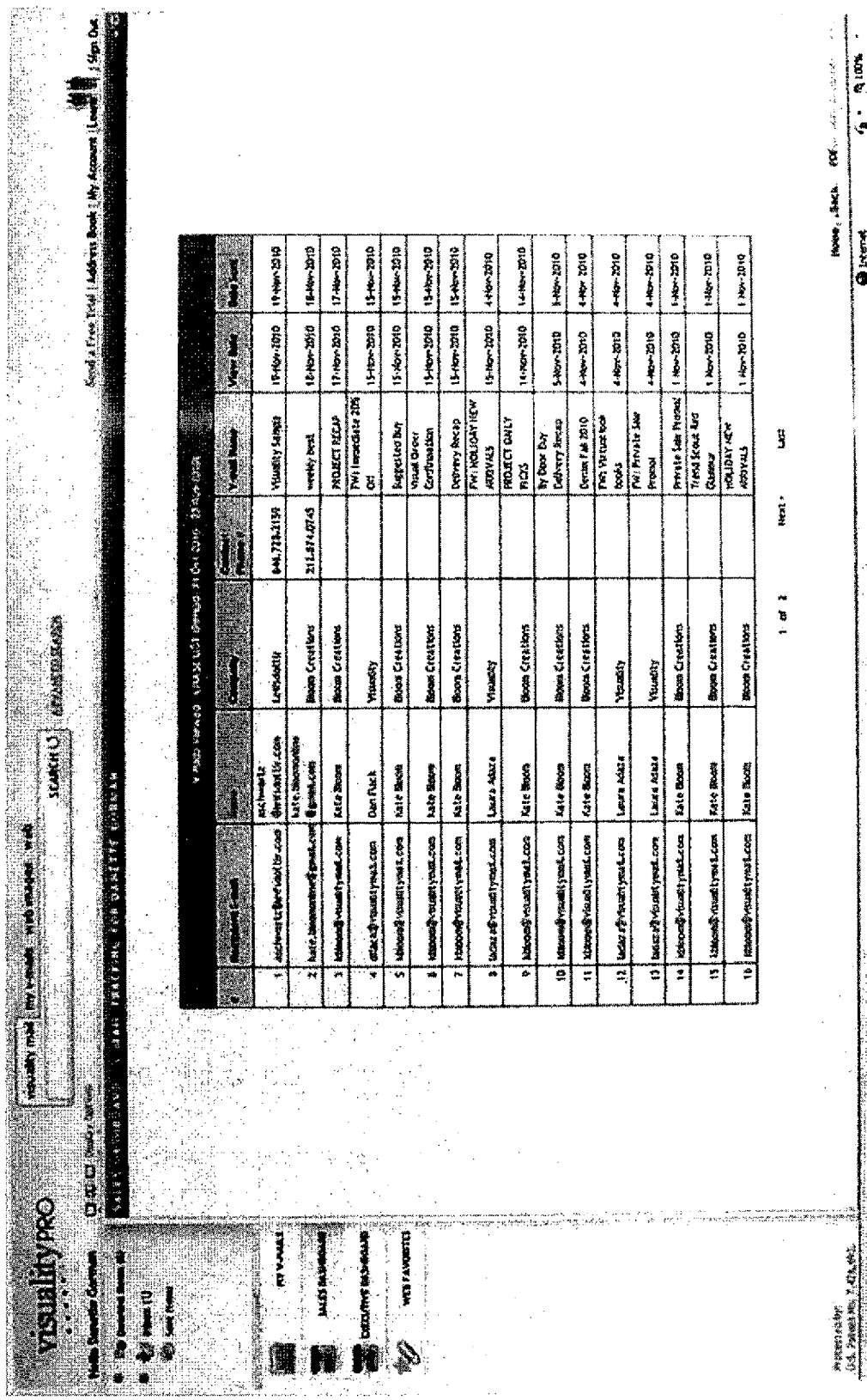
FIG. 40 is a screenshot of a VC tool allowing a user to view detailed information about activities surrounding vmails according to one embodiment of the invention.

In response to a user selection of a generate option 976, the VC tool module 20c displays a summary of the selected activities for the identified time frame, both graphically and in number format. For example, in response to a user input, the VC tool module 20c may display a total number of vmails sent 972 within the specified period of time and a total number of vmails that have been viewed 974 during that time period. The user may also view additional information about those activities as is displayed in FIG. 40. For example, the user may view detailed information about those recipients that have viewed the vmails and use this information to follow-up with the recipients.

Figure 41:
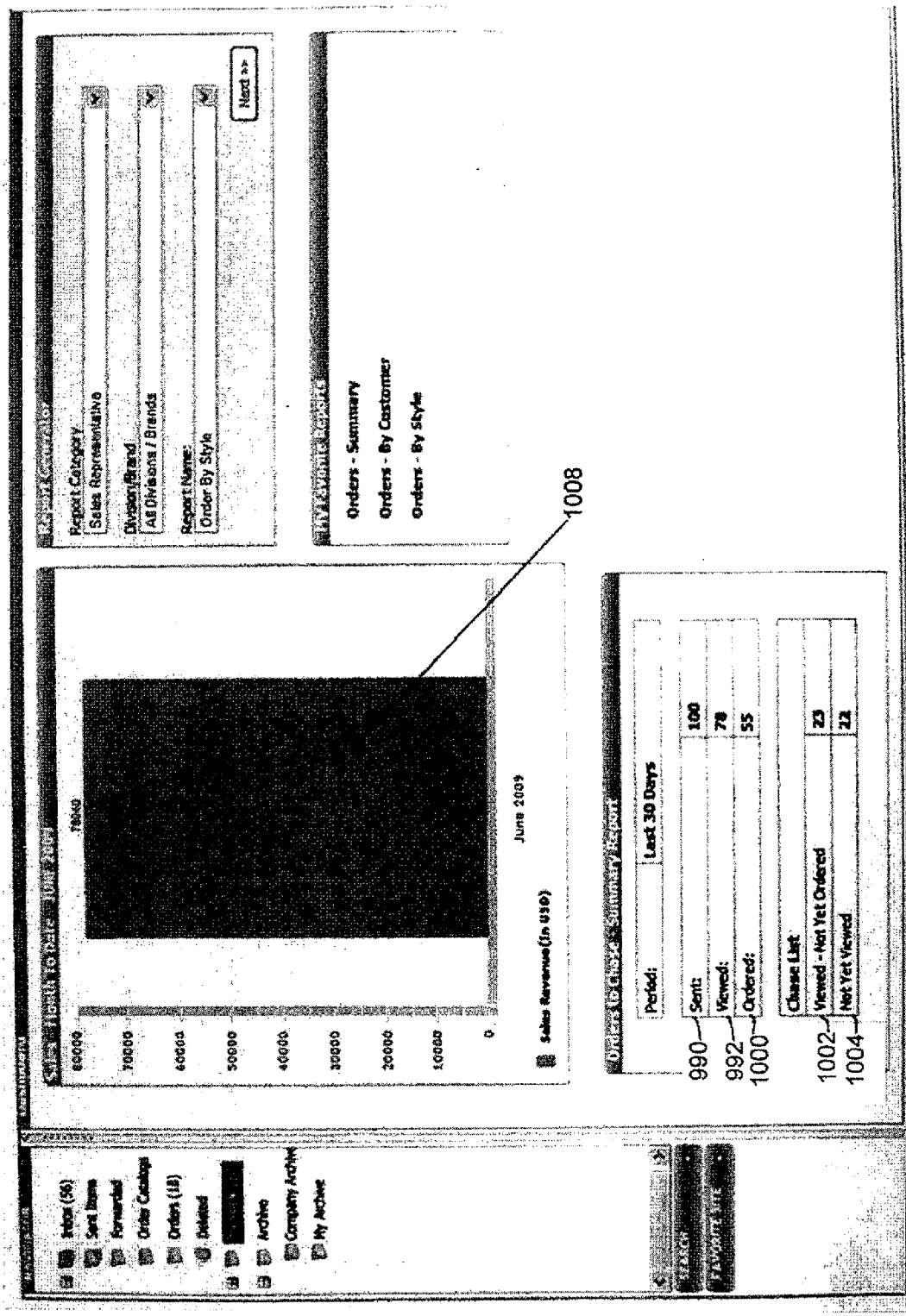
FIG. 41 is a screenshot of a VC tool displaying an executive dashboard according to one embodiment of the invention.

Referring again to FIG. 39, the VC tool also includes an executive dashboard option 1006 for an administrator which allows him or her to view activities of multiple users of the system, as is depicted in FIG. 41. For example, the VC tool module 20*c* may track for the multiple users, an aggregate number of vmails sent 990, vmails viewed 992, and a total number of purchase orders 1000 received from those vmails. The executive dashboard also provides a total number of vmails that have been viewed but for which no orders have been received 1002, and a total number of vmails that have not yet been viewed, prompting follow-up with those non-responsive recipients. The executive dashboard further includes a chart of total sales revenue 1008 across the multiple users.

Figure 42:
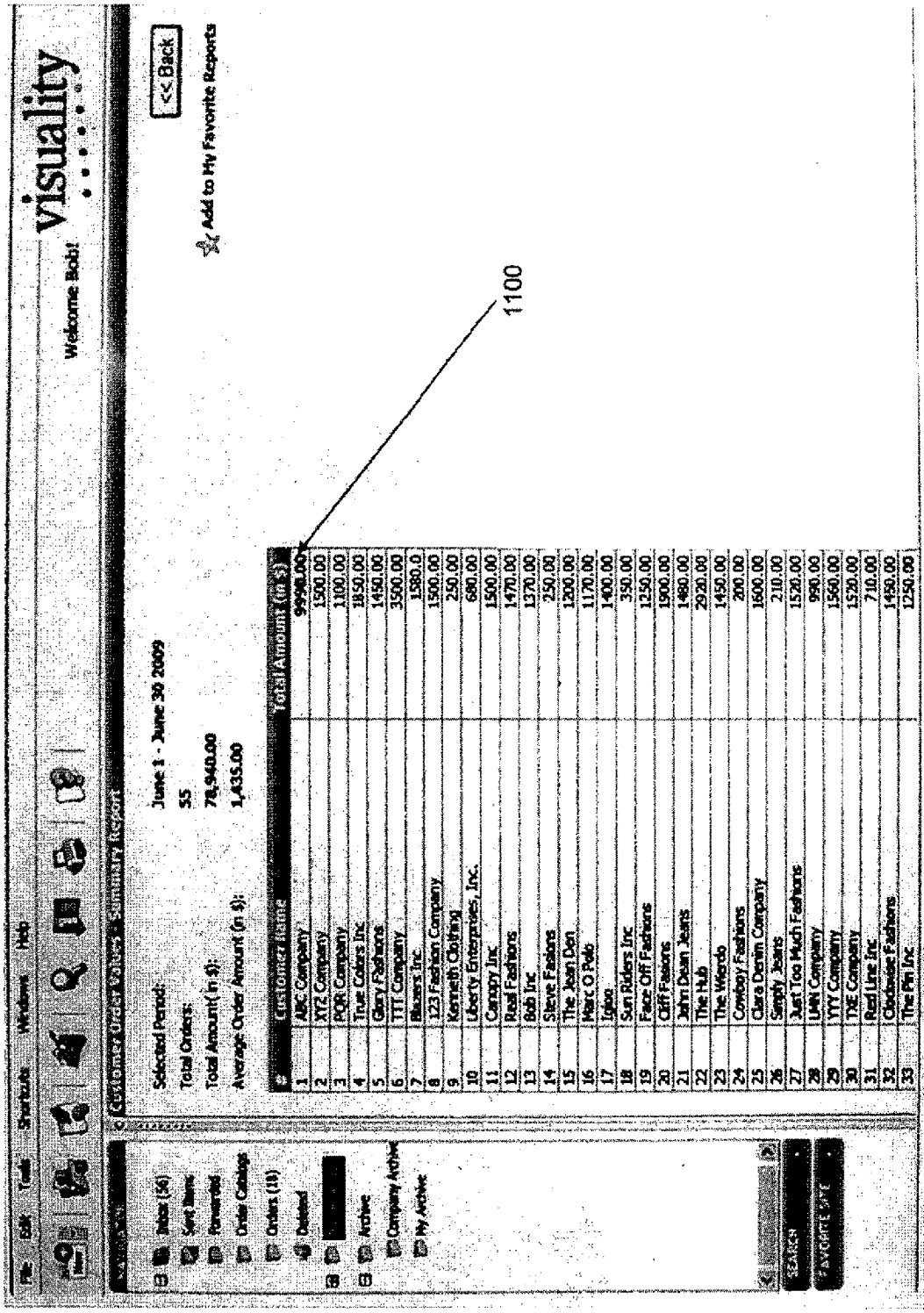
FIG. 42 is a screen shot of a breakdown of total sales revenue by customer name according to one embodiment of the invention.
Figure 43:
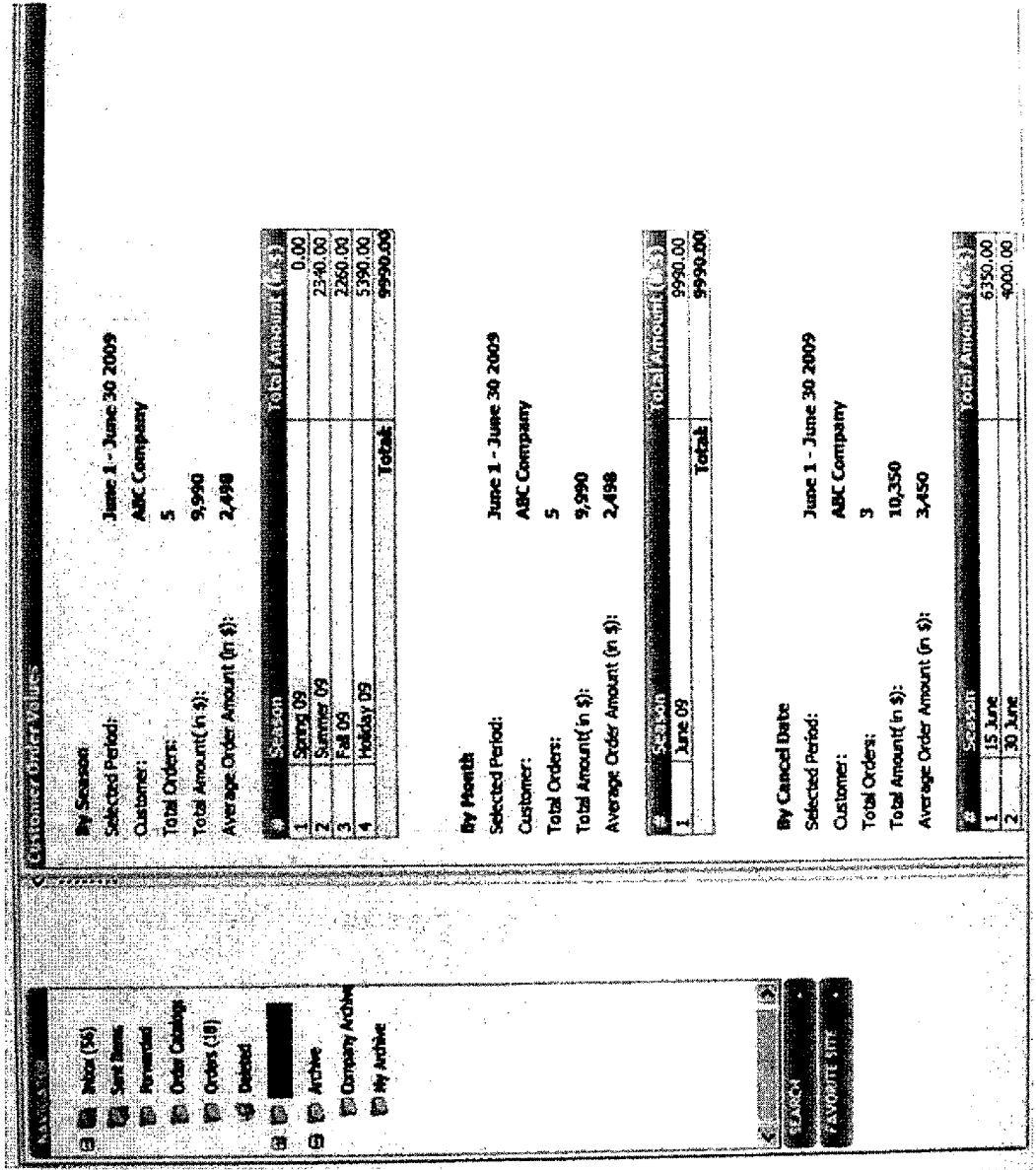
FIG. 43 is a screen shot of detailed information about a sale to a particular customer according to one embodiment of the invention.

Selection of the total sales revenue chart 1008 causes display of the breakdown of the total sales revenue by customer name as is depicted in FIG. 42. Selection of an entry pertaining to a particular customer 1100 causes display of detailed information about the sale to that customer as is depicted in FIG. 43.

Figure 44:
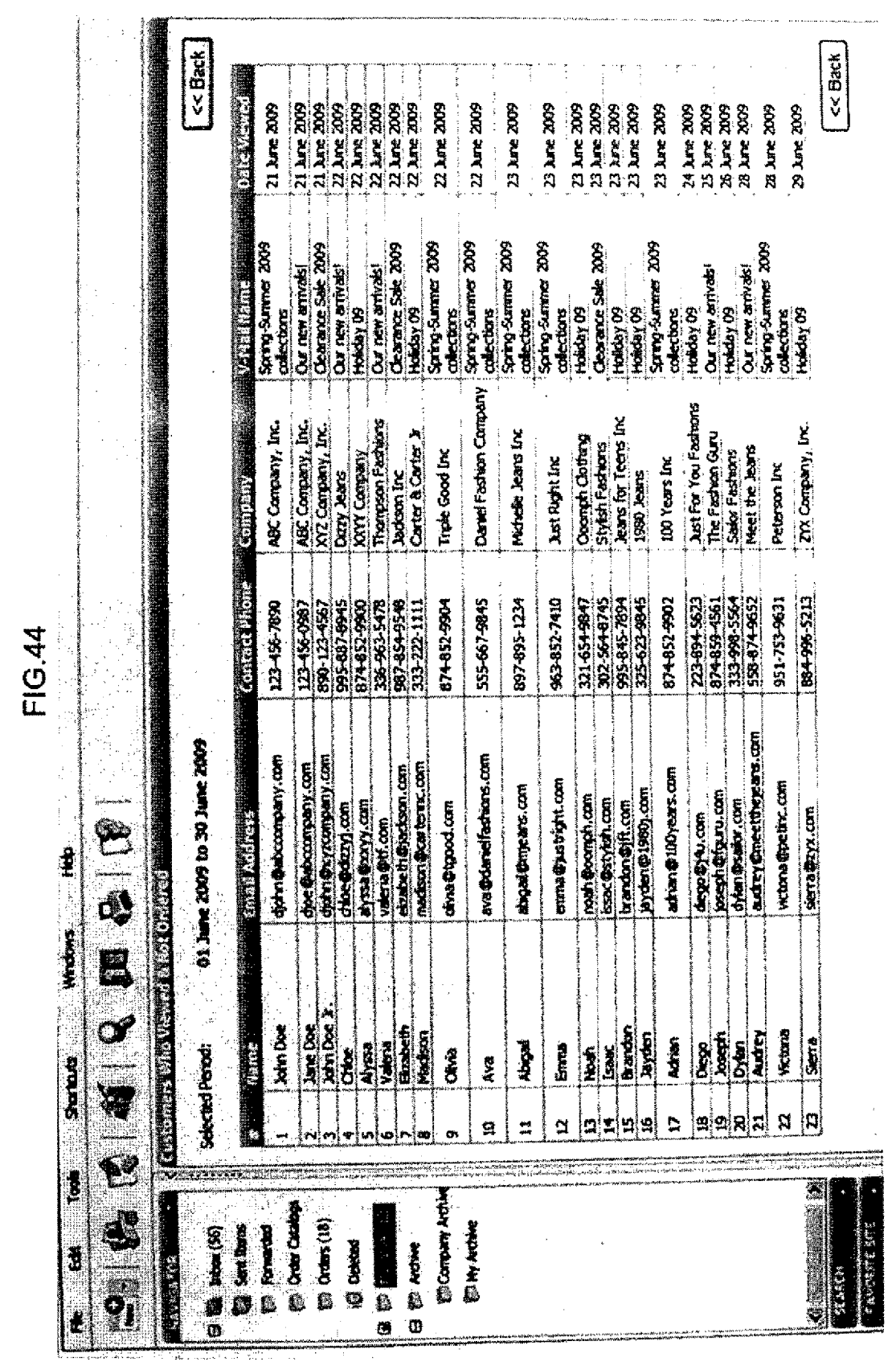

Referring again to FIG. 41, selection of the entry listing a total number of vmails that have been viewed but for which no orders have been received 1002 causes display of detailed information of such customers as is depicted in FIG. 44. Based on this information, the administrator may prompt a salesperson to follow up with those customers.

Figure 45A:
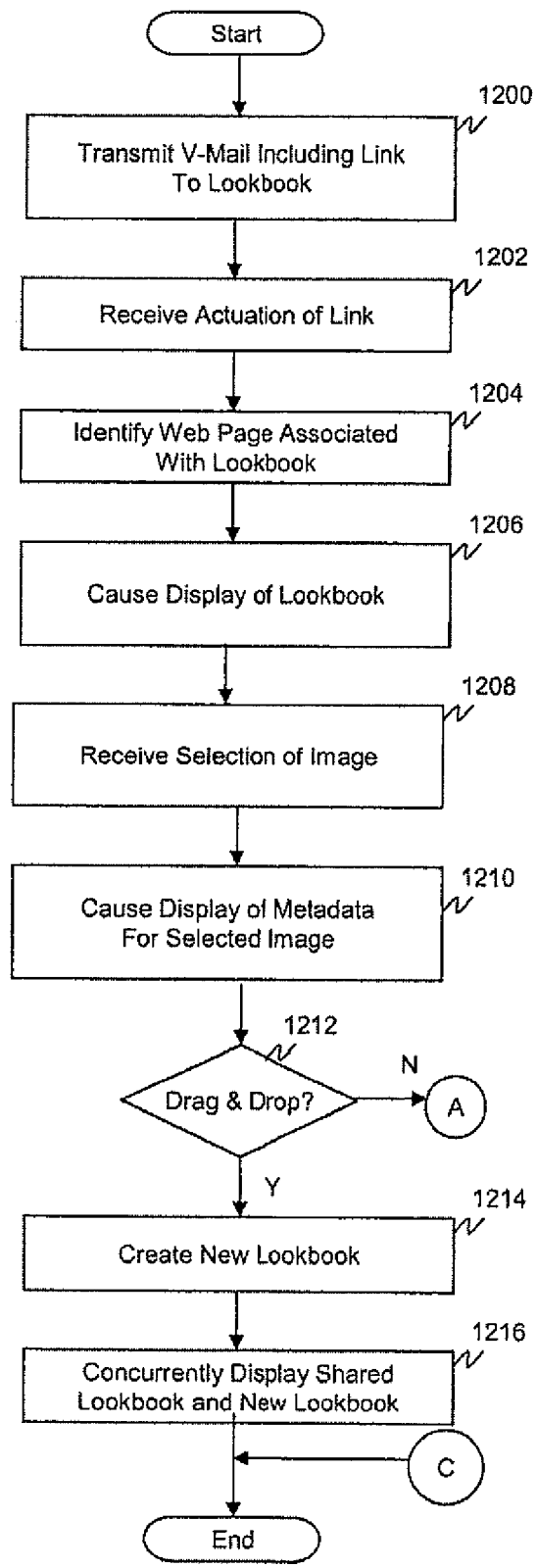
FIGS. 45A-45C are flow charts of a process for generating a new visual arrangement based on a visual arrangement published to a recipient according to one embodiment of the invention.
Figure 45B:
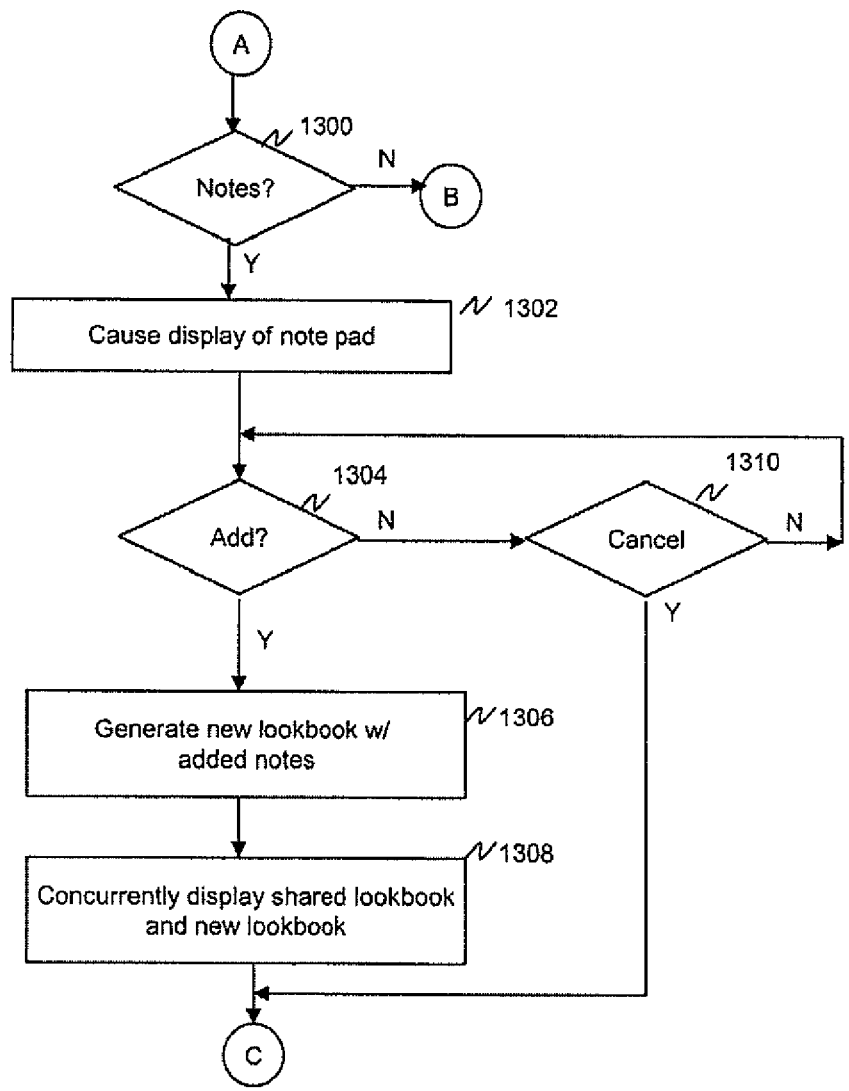
Figure 45C:
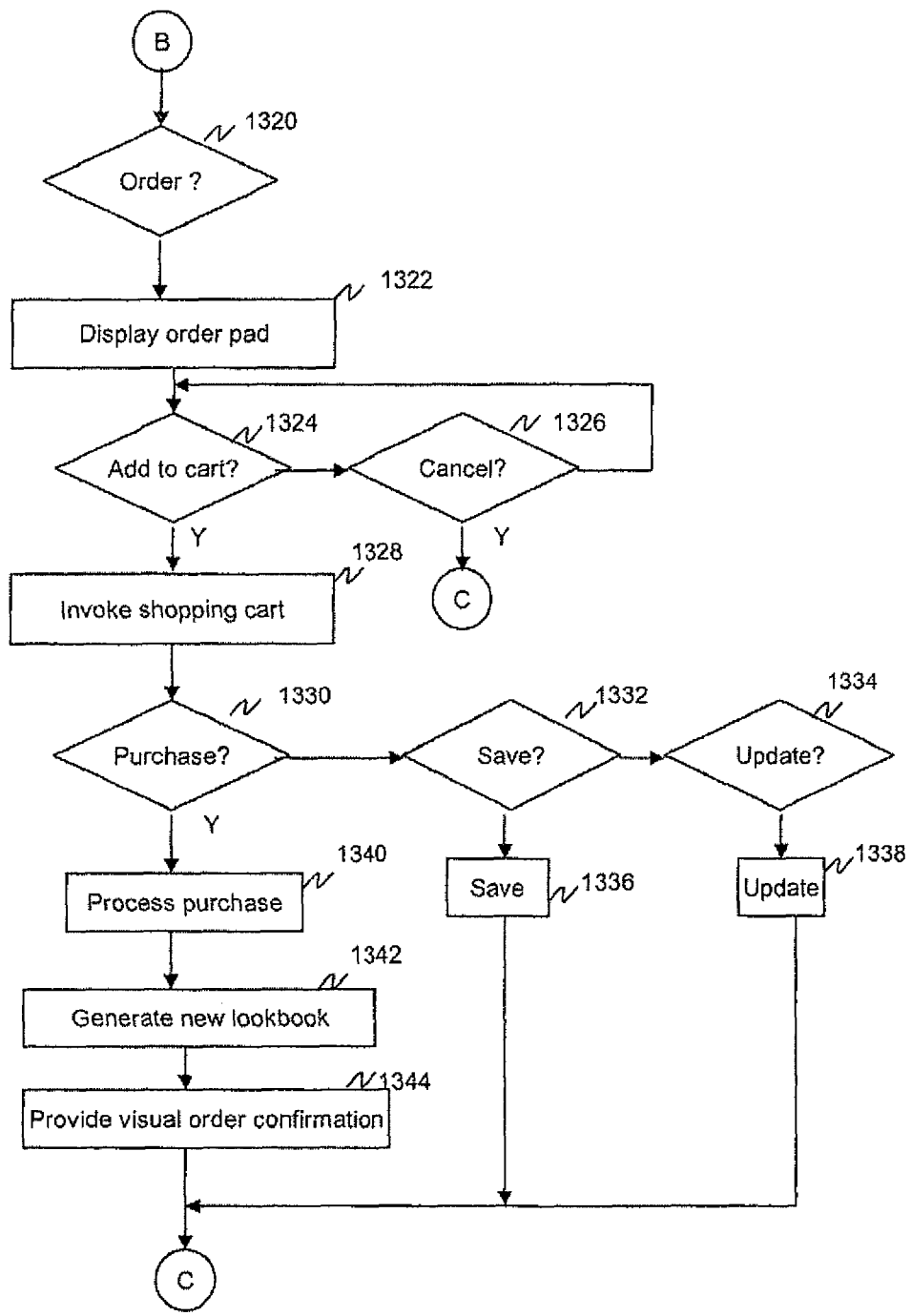

FIGS. 45A-45C are flow charts of a process for generating a new visual arrangement based on a visual arrangement published to an recipient according to one embodiment of the invention.

In step 1200, the VC tool module 20*c* transmits a vmail to a recipient with a link for accessing a visual arrangement/lookbook containing one or more images/pictures. The vmail is transmitted over the data communications network 18*a* as an email message where the link is included in the body of the email. The link may be, for example, a Uniform Resource Locator (URL) that renders a web page containing the visual arrangement. The email recipient accesses the vmail via his or her standard browser application.

In step 1202, the VC tool module 20*c* receives actuation of the link included in the email message, and in step 1204, identifies a web page associated with the visual arrangement.

In step 1206, the VC tool module 20*c* causes display of the visual arrangement on the recipient's end device 12. In this regard, the VC tool module 20*c* provides the VC tool for display by the recipient's web browser 19, and further transmits the visual arrangement to the end device 12 via the VC tool. The visual arrangement is then displayed in the first display area of the VC tool via the web browser.

The recipient manipulates his mouse or other input device to select an image from the visual arrangement displayed in the first display area. The selection may be clicking on the image, simply hovering the user's input device over the image, or any mechanism of selecting the image that may be conventional in the art.

In step 1208, the VC tool module 20*c* receives selection of the image and in step 1210, causes display of metadata stored in association with the selected image in a product information box, such as, for example, product information box 634*a* (FIG. 18) adjacent to the image. In this regard, the VC tool module identifies the picture metadata record stored in the picture metadata table 512 for the particular picture, retrieves the information stored in the metadata record, and transmits the retrieved information to the end device 12 over the data communications network.

In step 1212, the VC tool module 20*c* makes a determination is made as to whether the selected picture is dragged and dropped in the second display area 602 of the VC tool. If the answer is YES, the VC tool module 20*c* proceeds to create, in step 1214, a new visual arrangement containing the dropped image.

In step 1214, the VC tool module causes concurrent display of the new visual arrangement including the copied image in the second display area 602 of the VC tool, along with the visual arrangement which was shared via the vmail, in the first display area 600.

Referring again to step 1212, if the selected image is not dragged and dropped into the second display area 602, the VC tool module 20*c* makes a determination as to whether the recipient has selected to add notes for the selected image. This may be done, for example, by selecting a notes option such as, for example, notes option 650 (FIG. 22), from a product information box such as, for example, product information box 643*b*.

If the notes option is selected, the VC tool module 20*c* causes display of a note pad in step 1302. The note pad may be similar to the note pad 652 of FIG. 23.

In step 1304, the VC tool module 20*c* determines whether, after entering desired notes, the user selected an add option such as, for example, the add option 654 of FIG. 23. If no notes are to be added as determined in step 1310, the process exits.

If notes are to be added, the VC tool module 20*c* generates a new visual arrangement containing the selected image and any notes added with respect to that image, in step 1306. The new visual arrangement is concurrently displayed, in step 1308, in the second display area 602 of the VC tool along with a display of the visual arrangement shared with the recipient via the vmail and displayed in the first display area 600 of the VC tool.

Referring again to step 1300, if the recipient has not selected to add notes for the selected image, a determination is made in step 1320 as to whether the recipient has selected to place an online order for the product depicted in the selected image. This may be done, for example, by selecting an order option such as, for example, order option 900 (FIG. 33), from a product information box such as, for example, product information box 634*c*.

If the order option is selected, the VC tool module 20*c* causes display of an order pad in step 1322. The order pad may be similar to the order pad 920 of FIG. 34, with information on the particular product selected and a prompt for entry of desired quantities of the particular product.

In step 1324, a determination is made as to whether the product is to added to the user's shopping cart. If the product is not to be added to the shopping cart, as determined in step 1326, the process ends. However, if the product is to be added, a conventional shopping cart algorithm is invoked in step 1328 to place the ordered item into the user's shopping cart.

In step 1330, a determination is made as to whether the items in the user's shopping cart are to be purchased. If the items are not to be purchased, but the shopping cart is to be saved 1332 or updated 1334, the VC tool module 20*c* proceeds to save 1336 or update 1338 the shopping cart respectively. If, however, the items in the shopping cart are to be purchased, the VC tool module 20*c* processes the purchase according to conventional online ordering mechanisms, in step 1340.

In step 1342, the VC tool module 20*c* generates a new visual arrangement including images of the purchased items.

In step 1344, the VC tool module 20*c* provides a visual order confirmation based on the generated new visual arrangement. The visual order confirmation may be similar to the visual order confirmation of FIG. 36.

Figure 46:
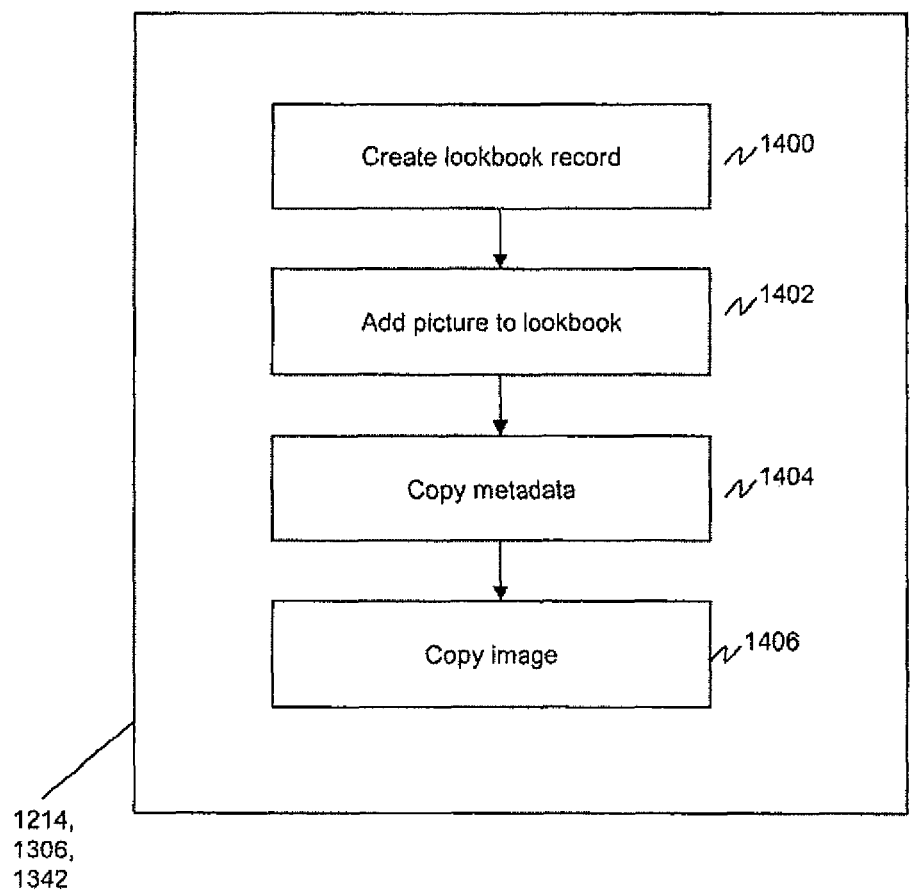
FIG. 46 is a more detailed flow chart of generating a new visual arrangement including a selected image according to one embodiment of the invention.

FIG. 46 is a more detailed flow chart of steps 1214, 1306, and 1342 for generating a new visual arrangement including a selected image according to one embodiment of the invention. In step 1400, the VC tool module 20*c* creates a new lookbook record for the new visual arrangement for storing in the saved lookbook table 504.

In step 1402, the VC tool module 20*c* adds the selected image to the visual arrangement. In this regard, the VC tool module 20*c* generates a new picture record for the selected picture and stores the picture record in the saved picture table 502.

In step 1218, the VC tool module 20*c* copies the metadata of the selected image. In this regard, the VC tool module identifies a metadata record for the dropped picture from the published picture metadata table 508, and copies and stores the values in that record in a new metadata record of a saved picture metadata table 502. If the new visual arrangement is generated in response to adding notes to the selected picture, the newly added notes are stored in a notes field of the new metadata record.

In step 1220, the VC tool module 20*c* creates a copy of the selected image and stores the copy of the image in the image repository of the central data store 28*a*. The copy of the image is assigned a new image ID, and the generated lookbook record, picture record, and metadata record, are all associated with the copy of the image based on the new image ID. The VC tool module 20*c* further associates the new visual arrangement, the copied image, and copied metadata with the vmail recipient by storing the ID corresponding to the vmail recipient into an author field of the various records.

Figure 47A:
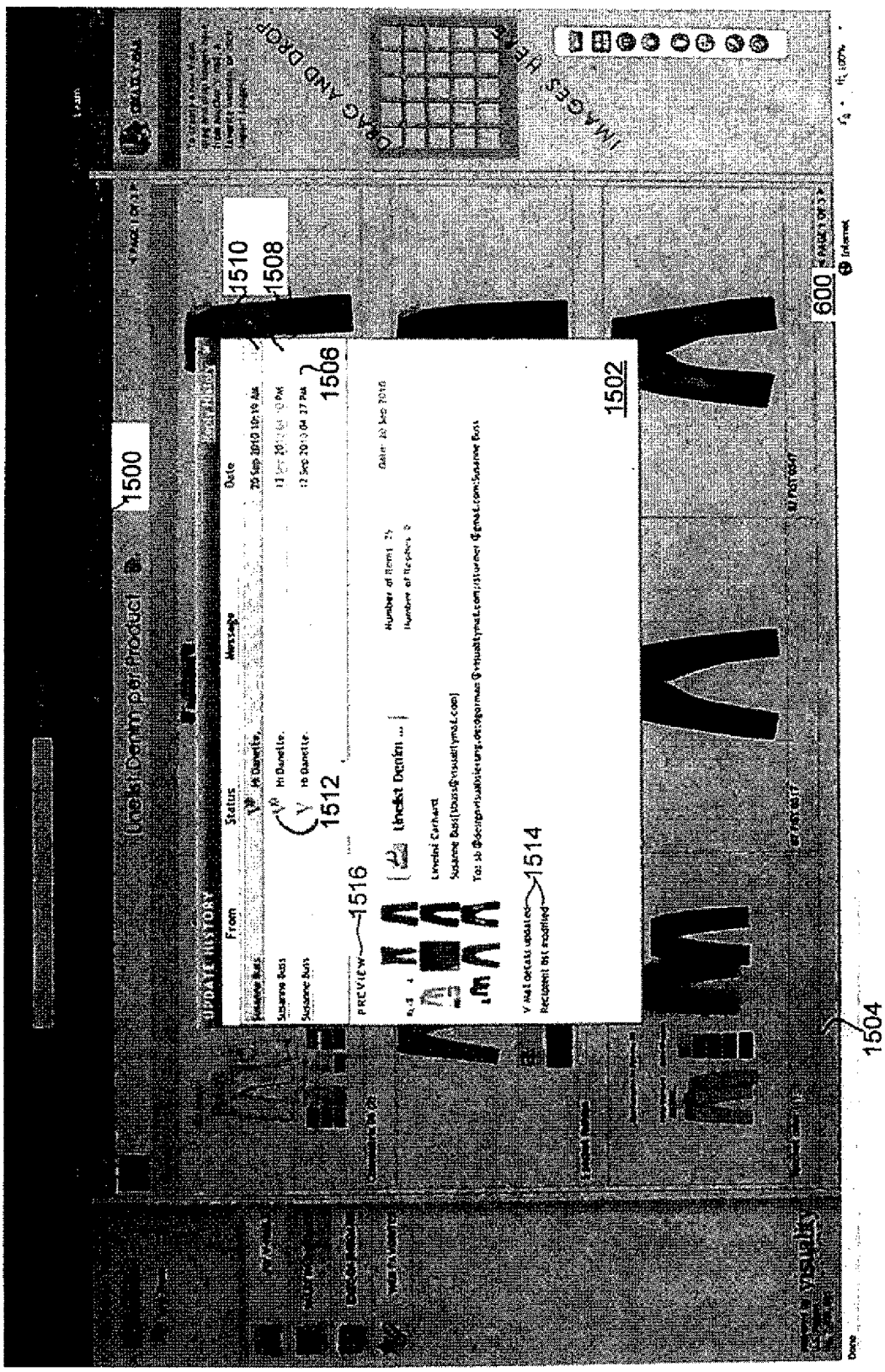
FIG. 47A is a screen shot of a VC tool providing a history pop-up window according to one embodiment of the invention.

According to one embodiment of the invention, the VC tool allows a user to view a history of updates to a shared visual arrangement. FIG. 47A is a screen shot of the VC tool providing a history option 1500 which the user may select for viewing the history of updates for a current visual arrangement 1504 displayed in the first display area 600.

Selection of the history option 1500 causes display of a history pop-up window 1502 with an entry 1506 for an original published version of the visual arrangement, as well as entries 1508, 1510 for each published revision of the visual arrangement. According to one embodiment, the entries with revisions are highlighted via, for example, an update symbol 1512.

Selection of an entry for a particular published revision of the visual arrangement, such as, for example, entry 1510, provides information on the updates that were made relative to a prior revision of the visual arrangement, such as, for example, entry 1508. A list of the changes 1514 in the selected revision of the visual arrangement relative to the prior revision are listed in a preview area 1516 of the pop-up window.

Figure 47B:
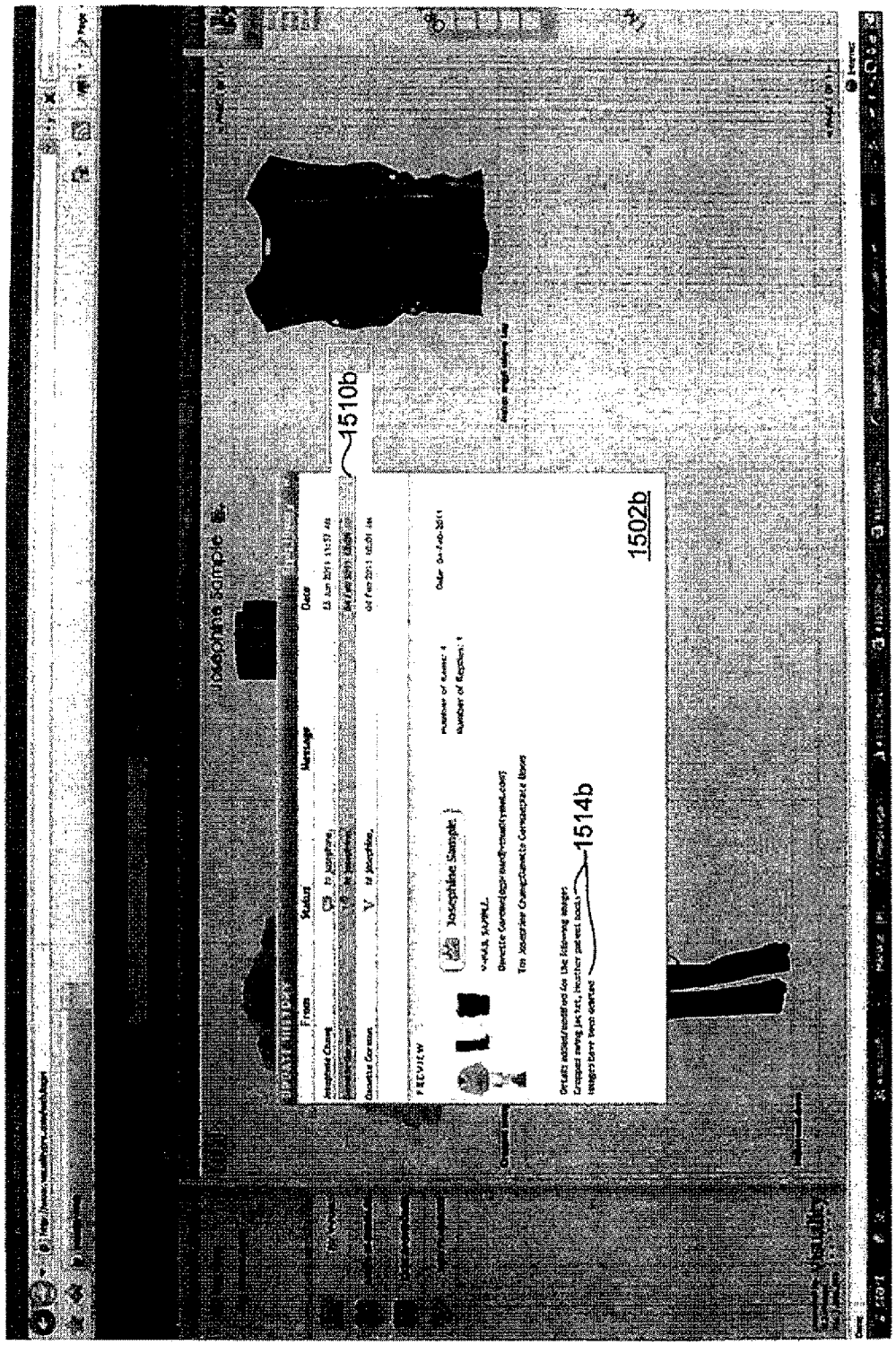
FIG. 47B is an exemplary screen shot of a VC tool providing another history pop-up window according to one embodiment of the invention.

FIG. 47B is an exemplary screen shot depicting another history pop-up window 1502*b* with details on modifications 1514*b* made to a selected revision 1510*b* of a lookbook. In this example, the details indicate that specific images have been deleted from the lookbook.

Figure 48:
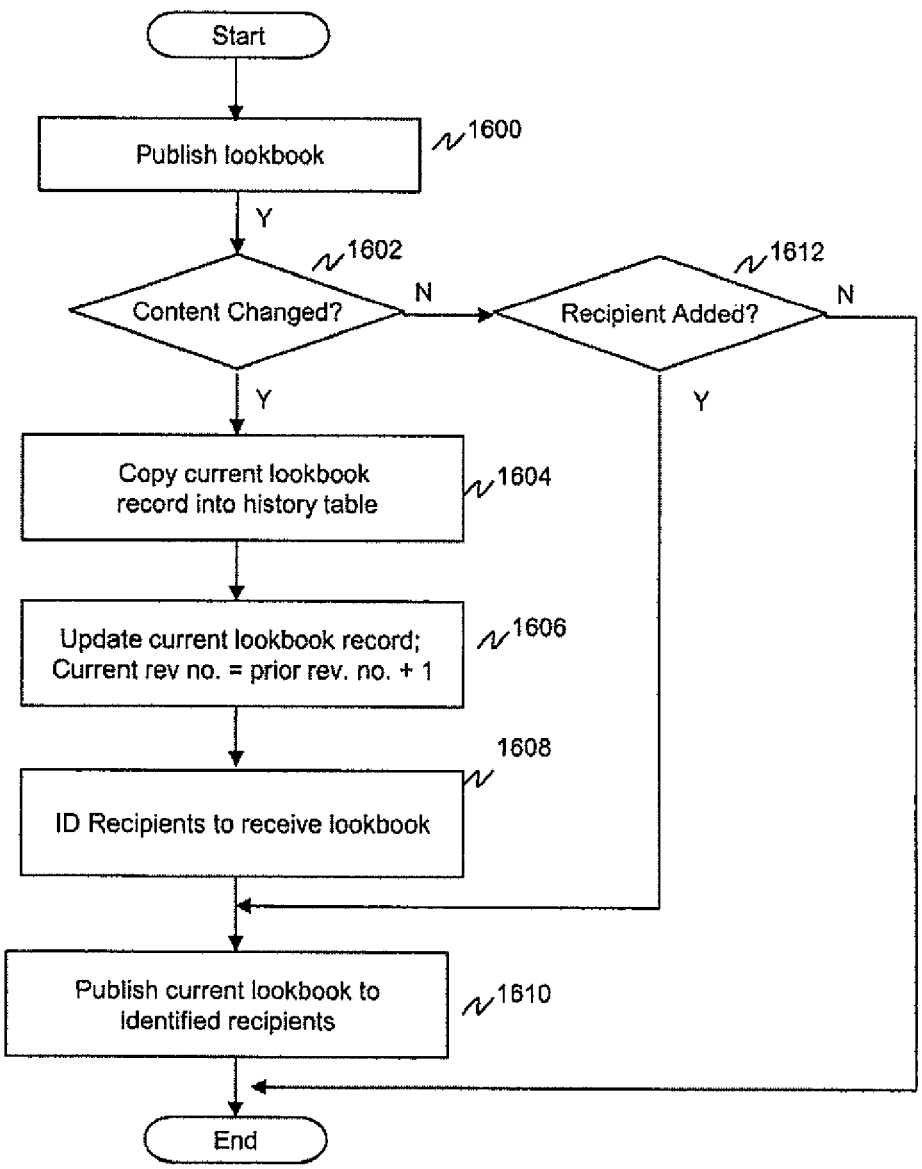
FIG. 48 is a flow diagram of a process for publishing and republishing visual arrangements according to one embodiment of the invention.

FIG. 48 is a flow diagram of a process for publishing and republishing visual arrangements according to one embodiment of the invention.

In step 1600, the VC tool module 20*c* publishes an original visual arrangement generated by an author. In this regard, the VC tool module 20*c* transmits an email to a recipient including a link for accessing the visual arrangement.

In step 1602, the VC tool module 20*c* determines whether content changes have been made to the visual arrangement. For example, an author of the visual arrangement may make changes to the visual arrangement after it has been shared with a list of recipients, including, for example, adding, deleting, or modifying images and/or adding, deleting or modifying product descriptions.

If the original visual arrangement has been changed, the VC tool module 25*c*, in step 1604, first copies the published lookbook record that is currently stored for the visual arrangement in the published lookbook table 506, and adds the copied lookbook record to a lookbook history table (not shown). All other associated records such as, for example, the metadata records and picture records are also copied to their respective history tables. According to one embodiment, the lookbook record and lookbook metadata records are always copied to the corresponding history tables whenever there is a change to a published lookbook. For the pictures associated with this published lookbook, the published picture records and published picture metadata records are copied to the corresponding history tables if there is a change to the published picture record or published picture metadata record.

After a snapshot of the existing data is preserved in the history tables, the VC tool module 25*c* proceeds to update the current published lookbook record with the relevant changes including, for example, increasing the revision number to reflect the current revision. The updated published lookbook record is then stored in the published lookbook table 504. According to one embodiment, the lookbook ID does not change when the lookbook is updated—only the revision number changes. The published picture records are also updated if the images have been updated. The published metadata records are further updated if the product descriptions have been updated.

In step 1608, the VC tool module 25*c* identifies the recipients to receive the updated visual arrangement, and in step 1610, the VC tool module publishes the updated visual arrangement to the identified recipients. In determining whether a user needs to get a copy of the updated lookbook, the VC tool module retrieves the lookbook ID and revision fields stored in the current lookbook record and compares it with the lookbook ID and revision fields of the vmail record of the user. The user gets a copy of the updated lookbook if the user does not have a record in the vmail table 514 for this lookbook. In this regard, the VC tool module 25*c* searches the vmail table 514 for a record containing the user's recipient ID as well as the lookbook ID for the updated lookbook.

The user also gets a copy of the updated lookbook if the revision field in his or her vmail table contains a lower value than the revision field in the published lookbook table for this lookbook for this user.

Referring again to step 1602, if the content of the visual arrangement has not been changed, but the lookbook needs to be republished because a new recipient has been added, as determined in step 1612, the VC tool module 20*c* proceeds to step 1608 to identify the recipient(s) who should receive the visual arrangement, and proceeds to publish the visual arrangement to the identified recipient(s). According to one embodiment of the invention, adding a new recipient does not cause a change in the revision number. Hence, adding the new recipient does not cause execution of steps 1604 and 1606.

Figure 49:
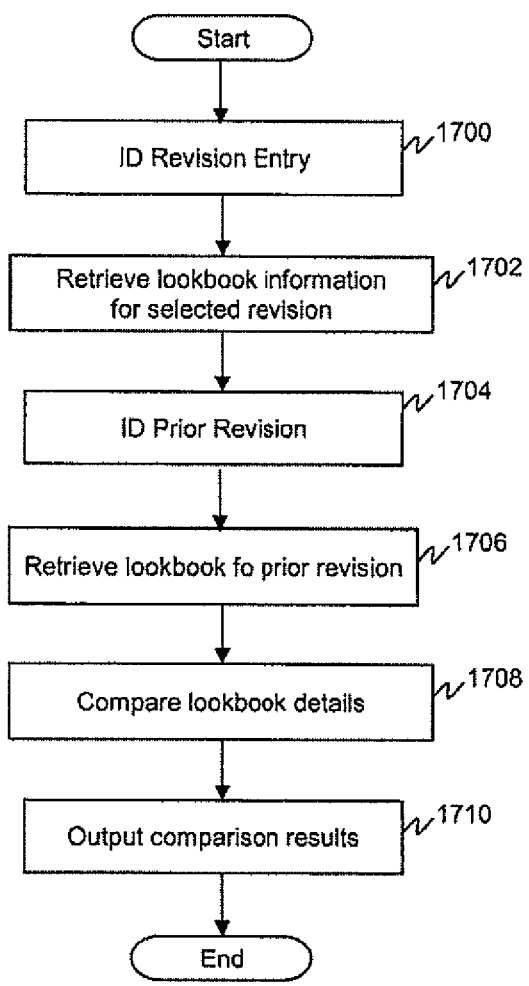
FIG. 49 is a flow diagram of a process for outputting revision information in response to selection of a particular revision entry from the history pop-up window of FIG. 47A according to one embodiment of the invention.

FIG. 49 is a flow diagram of a process for outputting revision information in response to selection of a particular revision entry from the history pop-up window 1502 (FIG. 47A) according to one embodiment of the invention. In step 1700, the VC tool module 20c identifies a selected revision entry such as, for example, entry 1510.

In step 1702, the VC tool module 20c retrieves lookbook information for the selected revision. In this regard, the VC tool module 20c retrieves the lookbook record for the selected revision from the lookbook history table.

In step 1704, the VC tool module 20c identifies a prior revision number. This may be done by decreasing the revision number for the selected revision by one.

In step 1706, the VC tool module 20c retrieves the lookbook record for the prior revision from the lookbook history table.

In step 1708, the VC tool module 20c compares details for the retrieved lookbook records and identifies differences between the two lookbooks. In doing so, the VC tool module 20c may also retrieve and compare history records of pictures and metadata associated with the retrieved lookbook records.

In step 1710, the VC tool module 20c outputs the results of the comparison. The results provide details on how the selected revision of the lookbook has changed relative to the prior revision.

It will be understood that the processes of FIGS. 45A-45C, FIG. 46, and FIGS. 48-49 may be described in terms of a software routine executed by the processor in the server 10a based on instructions stored in the server's memory. The instructions may also be stored in other non-transient computer readable media such as, for example, a CD-ROM, flash drive, or the like. A person of skill in the art should also recognize that the routine may be executed via hardware, firmware (e.g. via an ASIC), or in any combination of software, firmware, and/or hardware. Furthermore, the sequence of steps of the process is not fixed, but can be altered into any desired sequence as recognized by a person of skill in the art.

A person of skill in the art should recognize that embodiments of the present invention allow efficient communication of visual arrangements, and intuitive and simple creation of new visual arrangements based on received arrangements. For example, sales teams can simply drag and drop pictures into vmail templates and create a new visual arrangement with the dropped pictures for potential buyers. Pertinent details stay right next to pictures complete with a comments history making the experience faster and easier for buyers to see and respond to products. Buyers can also see products quickly via a simple link in an email message instead of attachments with pertinent details in full-view right next to pictures. Buyers can respond with orders and reorders right next to pictures and easily print in neatly organized formats perfect to take to a merchandise meeting. Sales teams receive visual notifications giving them immediate awareness of viewing activity and comments from their buyers. Costs are significantly reduced by eliminating wasted samples, color copies and overnight shipping expenses. Sales are also dramatically increased because the VC tool makes it easier for buyers to see and respond to products.

While certain exemplary embodiments have been described above in detail and shown in the accompanying drawings, it is to be understood that such embodiments are merely illustrative of and not restrictive of the broad invention. In particular, it should be recognized that the teachings of the invention apply to a wide variety of systems and processes. For example, the various embodiments of the present invention may be extended to systems and processes outside the fashion and lifestyle-driven industries. Furthermore, although the visual arrangements are described with respect to still images and pictures, a person of skill in the art should recognize that the visual arrangements may take the form of any multimedia presentation or arrangement conventional in the art. The comments may also not be limited to text comments, but may also extend to audio comments and the like. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims and their equivalents.

What is claimed is:

1. A computer-implemented method comprising:
providing, by a processor, a visual communications tool to a user device accessible to a user;
identifying, by the processor, in response to actuation of a first option on the visual communications tool, a visual arrangement including a plurality of images;
storing, by the processor, the visual arrangement in a data storage device;
transmitting, by the processor, a first message to a first recipient in response to actuation of a second option on the visual communications tool, wherein the first message includes a link for accessing the visual arrangement;
transmitting, by the processor, a second message to a second recipient in response to the actuation of the second option, wherein the second message includes the link for accessing the visual arrangement;
receiving, by the processor, a first actuation of the link in the first message received by the first recipient, and a second actuation of the link in the second message received by the second recipient;
in response to receiving the first and second actuations, causing, by the processor, display of the plurality of images on respectively first and second recipient devices, along with display of an input area;
receiving, by the processor, from the first and second recipients, respectively first and second inputs provided in the input area displayed on respectively the first and second recipient devices;
after receipt of the first and second inputs by the processor:
providing, by the processor, a first notification to the user for alerting the user of the first input;
causing, by the processor, display of the first input via the visual communications tool of the user device;
providing, by the processor, a second notification to the user for alerting the user of the second input;
causing, by the processor, display of the second input via the visual communications tool of the user device;
receiving a request from the first recipient to access the visual arrangement; and
in response to receipt of the first request from the first recipient, causing, by the processor, display of the first input on the first recipient device without displaying, on the first recipient device, the second input from the second recipient,
wherein the second input is tagged with particular data, wherein in response to the second input being tagged with the particular data, the processor causes the display of the first input on the first recipient device without displaying, on the first recipient device, the second input from the second recipient.

2. The method of claim 1, wherein the first and second inputs are order amounts of a product depicted in one of the plurality of images.

3. The method of claim 1, wherein the first or second input on the user device accessible to the user is on a portion of the visual communications tool separate from a portion of the visual communications tool displaying the plurality of images.

4. The method of claim 3, wherein the display of the first or second input is displayed in correlation to an identifier of one of the plurality of images.

5. The method of claim 4, wherein the identifier is at least one of a name or thumbnail image.

6. The method of claim 1 further comprising:
receiving first and second email addresses of respectively the first and second recipients; and
addressing the first and second messages respectively to the first and second email addresses.

7. The method of claim 1 further comprising in response to receiving the first or second actuations, causing, by the processor, display of metadata about a product depicted in the particular image one of the plurality of images.

8. The method of claim 1, wherein the input is correlated to the particular image one of the plurality of images based on a reference identifying one of the plurality of images.

9. The method of claim 1, wherein the first and second messages are generated via an email application.

10. The method of claim 9, wherein the email application is integrated with the visual communications tool.

11. The method of claim 1, wherein the plurality of images are displayed on a web page accessed via a web browser of the first or second recipient devices, wherein the web page is accessed upon actuation of the link in the first or second messages.

12. The method of claim 1, wherein the visual communications tool is coupled to the processor over a wide area network.

13. The method of claim 12, wherein the visual communications tool is configured to operate in an offline mode without connection to the network, wherein in response to contents of the first and second messages being generated in the offline mode, the contents of the first and second messages are stored in a local storage device of the user device accessible to the user, wherein the contents of the first and second messages are uploaded to the processor in response to detecting connection to the processor.

14. The method of claim 1 further comprising:
after receipt of the first and second inputs by the processor:
receiving a request from the second recipient to access the visual arrangement;
in response to receipt of the second request from the second recipient, causing, by the processor, display of the first and second inputs on the second recipient device.

15. The method of claim 1 further comprising:
receiving from the first and second recipients, respectively first and second modifications to the visual arrangement; and
in response to the receipt of the first request from the first recipient, causing, by the processor, display of the first and second modifications to the visual arrangement, on the first recipient device.

16. A system comprising:
a processor; and
a memory, wherein the memory includes instructions that cause the processor to:
provide a visual communications tool to a user device accessible to a user;
identify, in response to actuation of a first option on the visual communications tool, a visual arrangement including a plurality of images;
store the visual arrangement in a data storage device;
transmit a first message to a first recipient in response to actuation of a second option on the visual communications tool, wherein the first message includes a link for accessing the visual arrangement;
transmit a second message to a second recipient in response to the actuation of the second option, wherein the second message includes the link for accessing the visual arrangement;
receive a first actuation of the link in the first message received by the first recipient, and a second actuation of the link in the second message received by the second recipient;
in response to receiving the first and second actuations, cause display of the plurality of images on respectively first and second recipient devices, along with display of an input area;
receive from the first and second recipients, respectively first and second inputs provided in the input area displayed on respectively the first and second recipient devices;
after receipt of the first and second inputs:
provide a first notification to the user for alerting the user of the first input;
cause display of the first input via the visual communications tool of the user device;
provide a second notification to the user for alerting the user of the second input;
cause display of the second input via the visual communications tool of the user device;
receive a request from the first recipient to access the visual arrangement; and
in response to receipt of the first request from the first recipient, cause display of the first input on the first recipient device without displaying, on the first recipient device, the second input from the second recipient,
wherein the second input is tagged with particular data, wherein in response to the second input being tagged with the particular data, the instructions further cause the processor to display the first input on the first recipient device without displaying, on the first recipient device, the second input from the second recipient.

17. The system of claim 16, wherein the first and second inputs are order amounts of a product depicted in one of the plurality of images.

18. The system of claim 16, wherein the instructions that cause the processor to display the first or second input on the user device accessible to the user include instructions that cause the processor to display the first or second input on a portion of the visual communications tool separate from a portion of the visual communications tool displaying the plurality of images.

19. The system of claim 18, wherein the instructions that cause the processor to display the first or second input on the user device accessible to the user include instructions that cause the processor to display the first or second input in correlation to an identifier of one of the plurality of images.

20. The system of claim 19, wherein the identifier is at least one of a name or thumbnail image.

21. The system of claim 16, wherein the instructions further cause the processor to:
receive first and second email addresses of respectively the first and second recipients; and
address the first and second messages respectively to the first and second email addresses.

22. The system of claim 16, wherein the instructions further cause the processor to:
in response to receiving the first or second actuations, cause display of metadata about a product depicted in one of the plurality of images.

23. The system of claim 16, wherein the input is correlated to one of the plurality of images based on a reference identifying one of the plurality of images.

24. The system of claim 16, wherein the first and second messages are generated via an email application.

25. The system of claim 24 wherein the email application is integrated with the visual communications tool.

26. The system of claim 16, wherein the plurality of images are displayed on a web page accessed via a web browser of the first or second recipient devices, wherein the web page is accessed upon actuation of the link in the first or second messages.

27. The system of claim 16, wherein the visual communications tool is coupled to the processor over a wide area network.

28. The system of claim 27, wherein the visual communications tool is configured to operate in an offline mode without connection to the network, wherein in response to contents of the first and second messages being generated in the offline mode, the contents of the first and second messages are stored in a local storage device of the user device accessible to the user, wherein the contents of the first and second messages are uploaded to the processor in response to detecting connection to the processor.

29. The system of claim 16, wherein the instructions further cause the processor to:
after receipt of the first and second inputs:
receive a request from the second recipient to access the visual arrangement;
in response to receipt of the second request from the second recipient, cause display of the first and second inputs on the second recipient device.

30. The system of claim 16, wherein the instructions further cause the processor to:
receive from the first and second recipients, respectively first and second modifications to the visual arrangement; and
in response to the receipt of the first request from the first recipient, cause display of the first and second modifications to the visual arrangement, on the first recipient device.

* * * * *